(12) United States Patent
Fukushima et al.

(10) Patent No.: US 7,091,644 B2
(45) Date of Patent: Aug. 15, 2006

(54) SEQUENTIALLY JOINED-SEGMENT ARMATURE AND AC MACHINE USING SAME

(75) Inventors: Akira Fukushima, Kariya (JP); Atsushi Umeda, Okazaki (JP)

(73) Assignee: Denso Corporation, Kariya (JP)

( * ) Notice: Subject to any disclaimer, the term of this patent is extended or adjusted under 35 U.S.C. 154(b) by 289 days.

(21) Appl. No.: 10/665,296

(22) Filed: Sep. 22, 2003

(65) Prior Publication Data

US 2004/0061400 A1    Apr. 1, 2004

(30) Foreign Application Priority Data

| Sep. 18, 2002 | (JP) | ............................. 2002-272072 |
| Sep. 18, 2002 | (JP) | ............................. 2002-272097 |
| Sep. 18, 2002 | (JP) | ............................. 2002-272110 |
| Oct. 25, 2002 | (JP) | ............................. 2002-311588 |

(51) Int. Cl.
  *H02K 3/28* (2006.01)
  *H02K 3/00* (2006.01)

(52) U.S. Cl. .................. 310/179; 310/180; 310/206; 310/207; 310/208

(58) Field of Classification Search ........ 310/179–183, 310/201–208, 260
See application file for complete search history.

(56) References Cited

U.S. PATENT DOCUMENTS

| 3,621,311 | A | * | 11/1971 | Von Starck et al. | ........ 310/207 |
| 3,942,050 | A | * | 3/1976 | Oberretl | ....................... 310/13 |
| 4,028,572 | A | * | 6/1977 | Baltisberger | ................. 310/201 |
| 4,307,311 | A | | 12/1981 | Grozinger | |
| 4,402,129 | A | * | 9/1983 | Kreuzer et al. | ............. 310/184 |
| 6,091,169 | A | * | 7/2000 | Umeda et al. | ................. 310/62 |
| 6,144,136 | A | * | 11/2000 | Umeda et al. | ............... 310/254 |
| 6,201,332 | B1 | * | 3/2001 | Umeda et al. | ............... 310/184 |
| 6,211,594 | B1 | | 4/2001 | Umeda et al. | |
| 6,326,715 | B1 | * | 12/2001 | Asao et al. | .................. 310/180 |
| 6,414,410 | B1 | * | 7/2002 | Nakamura et al. | .......... 310/179 |
| 6,417,592 | B1 | | 7/2002 | Nakamura et al. | |
| 6,894,417 | B1 | * | 5/2005 | Cai et al. | ..................... 310/198 |
| 2002/0096963 | A1 | | 7/2002 | Masegi | |

FOREIGN PATENT DOCUMENTS

| EP | 1 107 427 A2 | 6/2001 |
| JP | 01318522 A * | 12/1989 |
| JP | A 11-155270 | 6/1999 |
| JP | A 11-164506 | 6/1999 |
| JP | 2000092766 A * | 3/2000 |
| JP | A 2001-169490 | 6/2001 |

* cited by examiner

*Primary Examiner*—Darren Schuberg
*Assistant Examiner*—Yahveh Comas
(74) *Attorney, Agent, or Firm*—Oliff & Berridge PLC

(57) ABSTRACT

A sequentially joined segment armature coil is provided which may be employed in an ac machine such as an ac motor or motor generator. The armature coil is equipped with three phase coils each of which is made up of a first and a second phase windings identical in number of turns. This structure permits the number of turns of the armature coil to be changed easily by changing a connection of the first and second phase winding between a series connection and a parallel connection or changing a connection of the phase coils between a star connection and a delta connection. The structure also enables terminal leads of the first and second phase windings of each of the phase coils to be collected and withdrawn outside the ac machine, thus facilitating ease of arrangement of the terminal leads.

54 Claims, 45 Drawing Sheets

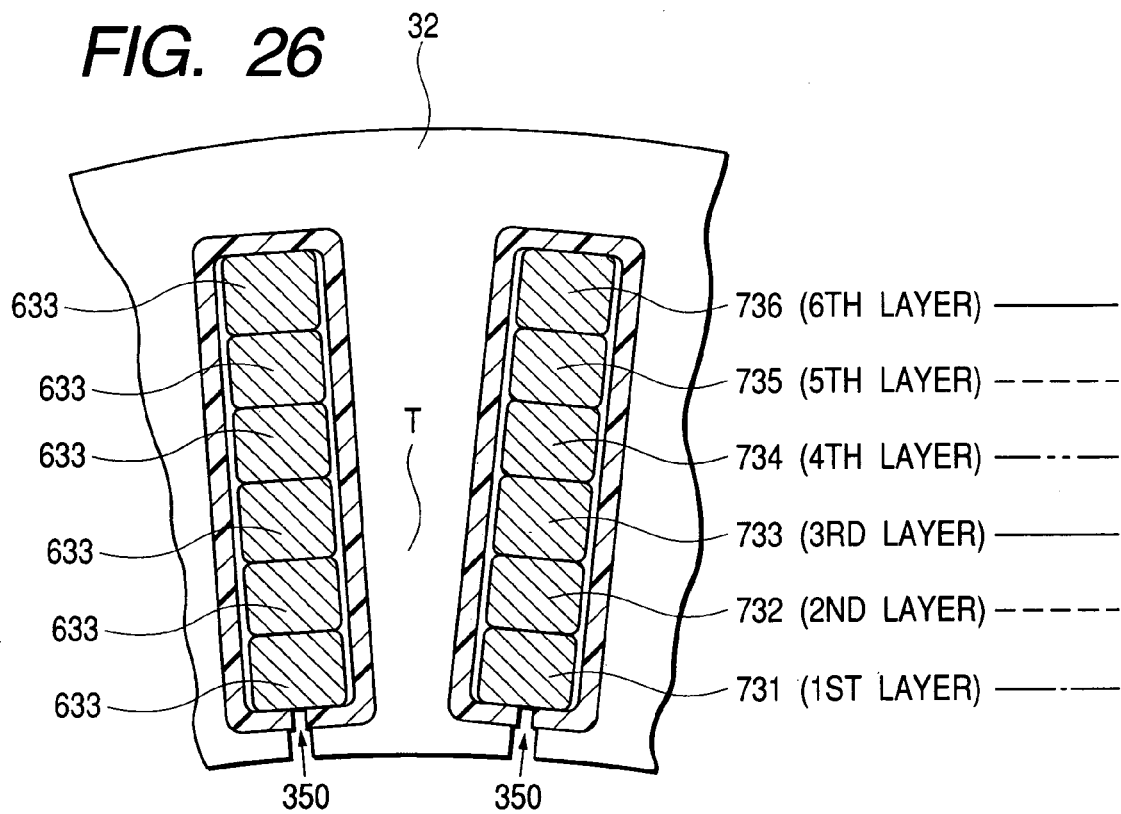
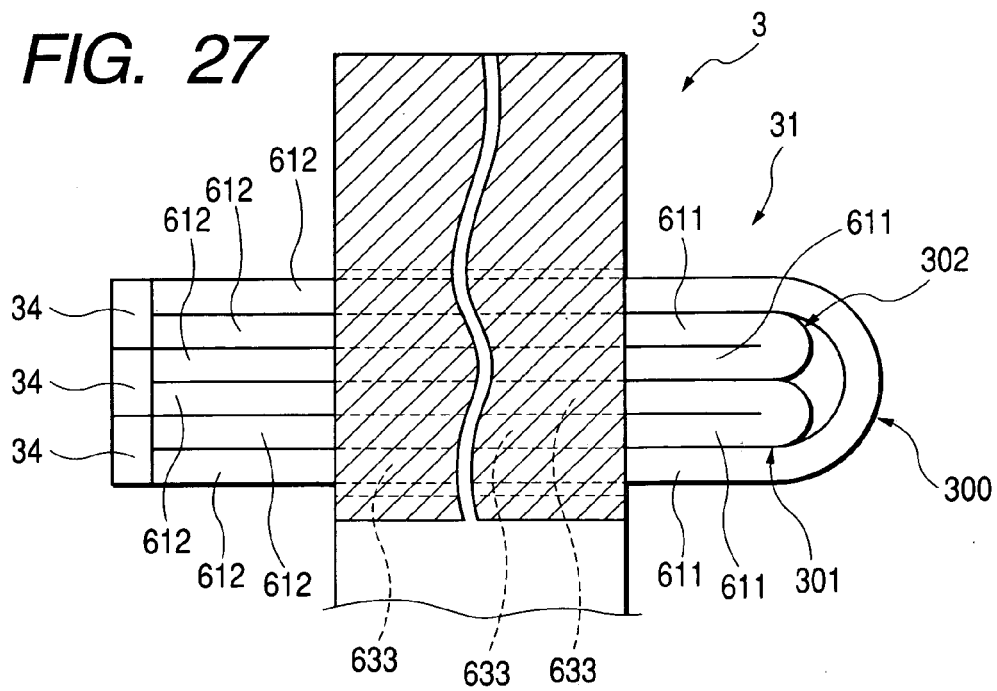

SEQUENTIALLY JOINED-SEGMENT ARMATURE AND AC MACHINE USING SAME

BACKGROUND OF THE INVENTION

1. Technical Field of the Invention

The present invention relates generally to a sequentially joined-segment armature and an ac machine using the same which may be employed as a rotary electric machine for automotive vehicles.

2. Background Art

Idle stop systems, as having been employed in automotive vehicles in recent years, are designed to perform frequent engine start-and-stop operations, therefore, use of ac motors is preferable to dc motors with brushes. However, ac motors capable being supplied with a great starting current equivalent to that use in typical dc series-wound motor will be greater in size than typical alternators, thus requiring a large amount of space within an engine compartment of the vehicles or a substantial change in engine layout, which may lead to an increase in weight of the vehicles.

As automotive ac generators, ac machines have been proposed which are equipped with a conductor segment-joined armature made up of U-shaped conductor segments which are disposed within slots formed in a stator core and joined sequentially. For instance, Japanese Patent First Publication Nos. 11-164506 and 2001-169490 disclose such a type of ac machine.

Japanese Patent First Publication No. 2001-169490 (corresponding to U.S. Pat. No. 6,417,592 B2 to Nakamura et al. assigned to the same assignee as that of this application) discloses segment-joined automotive ac generator which is equipped with U-shaped large-sized conductor segments and U-shaped small-sized conductor segments which partially extend through slots arrayed in a stator core in a circumferential direction thereof. Each of the slots has a first, a second, a third, and a fourth layer positions arrayed from inside to outside of the stator core in a radius direction thereof. The large-sized conductor segments each have legs disposed in the first and fourth layer positions of the slots. The small-sized conductor segments each have legs disposed in the second and third layer positions of the slots. A total of four turn coils, two disposed in two of the slots located across one of the slots, are so connected as to cross to joint two of the turn coils in parallel to make phase windings. Specifically, an eight conductor-in-two slot stator coil is taught to double the current permitted to be supplied to the coil without increasing poles.

Japanese Patent First Publication No. 11-164506 teaches a six conductor-in-one slot stator coil which is equipped with U-shaped large-sized conductor segments and U-shaped small-sized conductor segments which partially extend through slots arrayed in the stator core in the circumferential direction thereof. Each of the slots has a first, a second, a third, a fourth, a fifth, and a sixth layer positions arrayed from inside to outside of the stator core in the radius direction thereof. The large-sized conductor segments each have legs disposed in the first and sixth layer positions of the slots. Some of the small-sized conductor segments have legs disposed in the second and third layer position of the slots. The others have legs disposed in the fourth and fifth layer positions of the slots. This structure permits the number of turns of the stator coil to be five times greater than that disclosed in the former publication, thus providing a high-voltage stator coil.

The above described stator coils are designed to fix a wiring pattern or order of joints of the conductor segments. It is, thus, difficult to increase the turns of the stator coil without increasing rotor poles, thereby increasing a difficulty in using the rotary machine with a high-voltage battery in automotive vehicles. Further, increasing a sectional area of the conductor segments results in a difficulty in bending thereof, which increases a difficulty in use of the stator coil with a great current.

Locations where lead wires extend from the parallel-connected phase windings of each of the phase coils are greatly away from each other, thus resulting in an increase in length of the lead wires, which leads to increased resistance and inductance of the lead wires. The increase in length of the lead wires also requires a large amount of space in the rotary machine, thus resulting in an increased length of the rotary machine.

SUMMARY OF THE INVENTION

It is therefore a principal object of the invention to avoid the disadvantages of the prior art.

It is another object of the invention to provide a segment joined-armature and an ac machine using the same which are designed to allow a great current to be supplied to the coil without increasing a difficulty in wiring operations, a sectional area of conductor segments, and the length of the ac machine.

According to one aspect of the invention, there is provided a segment joined armature and an ac machine which may be employed as ac motor or motor-generator for automotive vehicles.

The segment joined armature comprises: (a) an armature core having slots, q(=integer greater than two or more) for each pole in each phase, the slots being arrayed in a circumferential direction of the armature core; and (b) an armature winding made up of m(=integer greater than three or more) phase coils. Each of the phase coils is made up of a first phase winding and a second phase winding which are identical in number of turns and extending in opposite winding directions. Each of the first and second phase windings is made up of at least one wave winding segment and lap winding segments joined alternately. Each of the wave winding segment and the lap winding segments is formed by sequentially joined-conductor segments. Each of the conductor segments includes a substantially V-shaped head portion, a pair of leg portions extending from ends of the head portion, disposed in two of the slots of the armature core located at a given interval away from each other, and a pair of joint end portions extending from ends of the leg portions. s(=integer greater than four or more) of the leg portions are arrayed within each of the slots of the armature core in a radius direction of the armature core. Each of the joint end portions of each of the conductor segments is joined to one of the joint end portions of another of the conductor segments to make each of the first and second phase windings. The wave winding segment is made up of the conductor segments having the leg portions located at an interval away from each other which is greater than or equal to one pole pitch. Each of the lap winding segments is made up of the conductor segments having the leg portions located at an interval away from each other which is less than one pole pitch. An end of the first phase winding and an end of the second phase winding are formed by two of the leg portions of the conductor segments which are disposed adjacent to each other in the radius direction within the same one of the slots of the armature core and which lead to two first terminal leads. The other end of the first phase winding and the other end of the second phase winding are formed by two of the leg portions of the conductor segments which are disposed adjacent to each other in the radius direction within the same one of the slots of the armature core and which lead to two second terminal leads.

The above structure in which each of the phase coils is made up of the first and second phase windings identical in number of turns with each other permits the number of turns of the armature winding to be changed easily by changing a connection of the first and second phase winding between a series connection and a parallel connection or changing a connection of the phase coils between a star connection and a delta connection. The structure also enables the terminal leads of the first and second phase windings of each of the phase coils to be collected and withdrawn outside the ac machine, thus facilitating ease of arrangement of the terminal leads.

In the preferred mode of the invention, four of the leg portions of the conductor segments are arrayed within each of the slots of the armature core as a first, a second, a third, and a fourth layer conductors from inside to outside the armature core in the radius direction of the armature core. Each of the first and second phase windings are broken down into a first and a second group. The first group is made up of the conductor segments having the first and fourth layer conductors separated from each other at a given slot pitch. The second group is made up of the conductor segments having the second and third layer conductors separated from each other at a given slot pitch. Tips of the joint end portions leading to the first layer conductors are joined to tips of the joint end portions leading to the second layer conductors. Tips of the joint end portions leading to the third layer conductors are joined to tips of the joint end portions leading to the fourth layer conductors. The wave winding segment is made up of the conductor segment having the tips of the joint end portions separated from each other at an approximately two pole pitch. Each of the lap winding segments is made up of the conductor segments each having the joint end portions separated from each other at an approximately zero slot pitch. The first and second layer conductors or the third and fourth layer conductors defining ends of the first and second phase windings of each of the phase coils disposed within the same one of the slots lead to paired first terminal leads, respectively. The third and fourth layer conductors or the first and second layer conductors defining other ends of the first and second phase windings of each of the phase coils disposed within the same one of the slots lead to paired second terminal leads, respectively.

The pairs of the first terminal leads of the phase coils are located at an interval away from each other which is equivalent to an electrical angle of $2\pi/m$ within an electrical angle range of approximately $2\pi(m-1)$. The pairs of the second terminal leads of the phase coils are located at an interval away from each other which is equivalent to an electrical angle of $2\pi/m$ within an electrical angle range of approximately $2\pi(m-1)$.

The pairs of the second terminal leads form neutral point joint leads which are connected at a neutral point to establish a star-connection of the phase coils.

The first terminal leads of the first and second phase windings of one of the phase coils form input/output lines of a first phase. The first terminal leads of the first and second phase windings of a second one of the phase coils form input/output lines of a second phase. The second terminal leads of the first and second phase windings of the one of the phase coils are connected to the input/output lines of the second phase. The first and second phase windings of each of the phase coils are connected in parallel to each other. The phase coils are connected in a delta form.

Each of the first and second phase windings of each of the phase coils includes a first turn coil made up of the wave winding segment and the lap winding segments to form turns around the armature core, a second turn coil made up of the wave winding segment and the lap winding segments to form turns around the armature core, and an anomaly conductor segment connecting the first and second turn coils in series. The first and second phase windings of each of the phase coils extend in opposite winding directions and are identical electromagnetically with each other.

The anomaly conductor segments of each of the phase coils are disposed adjacent to each other within two of the slots separated from each other at a slot pitch shorter than the slot pitch of the wave winding segment and the lap winding segments by at least one slot pitch.

Locations of interfaces between the first and second terminal leads of each of the phase coils and the conductor segments are defined across the V-shaped head portion of the anomaly conductor segment in a circumferential direction of the armature core.

Each of the first and second phase windings are broken down into a first and a second group. The first group is made up of the conductor segments having the first and fourth layer conductors separated from each other at a given slot pitch which is shorter than a pole pitch by one slot pitch or more. The second group is made up of the conductor segments having the second and third layer conductors separated from each other at a given slot pitch which is shorter than the pole pitch by one slot pitch or more. Tips of the joint end portions leading to the first layer conductors are joined to tips of the joint end portions leading to the second layer conductors. Tips of the joint end portions leading to the third layer conductors are joined to tips of the joint end portions leading to the fourth layer conductors. Each of the first and second phase windings includes a first turn coil, a second turn coil, and an anomaly conductor segment. The first turn coil is made up of the wave winding segment(s) formed by the conductor segment having tips of the joint end portions separated from each other at approximately two pole pitch and the lap winding segment formed by the conductor segments each having tips of the joint end portions separated from each other at approximately one slot pitch. The wave winding segment(s) and the lap winding segments are connected alternately to make turns. The second turn coil made up of the wave winding segment(s) and the lap winding segments connected alternately to make turns extend in the same winding direction as that of the first turn coil. The anomaly conductor segment has legs disposed in two of the slots separated from each other at a pitch different from that of the wave winding segment and the lap winding segments to connect the first turn coil and the second turn coil in series. The first and second phase windings of each of the phase coils are identical with each other electromagnetically and extend in opposite winding directions.

The anomaly conductor segments of each of the phase coils are disposed adjacent to each other within two of the slots separated from each other at a pitch shorter than the pitch of the wave winding segment and the lap winding segments by at least one slot pitch.

The first and second layer conductors or the third and fourth layer conductors defining ends of the first and second phase windings of each of the phase coils disposed within the same one of the slots lead to paired first terminal leads, respectively. The third and fourth layer conductors or the first and second layer conductors defining other ends of the first and second phase windings of each of the phase coils disposed within the same one of the slots lead to paired second terminal leads, respectively. The first terminal leads form input/output lines. The second terminal leads form neutral point joint leads are connected at a neutral point to make a star-connection of the phase coils.

The first terminal leads of the first and second phase windings of one of the phase coils form input/output lines of a first phase. The first terminal leads of the first and second phase windings of a second one of the phase coils form input/output lines of a second phase. The second terminal leads of the first and second phase windings of the one of the phase coils are connected to the input/output lines of the second phase. The first and second phase windings of each of the phase coils are connected in parallel to each other. The phase coils are connected in a delta form.

Locations of interfaces between the first and second terminal leads of each of the phase coils and the conductor segments are defined across the V-shaped head portion of the anomaly conductor segment in the circumferential direction of the armature winding.

Each of the phase coils has a bridging conductor segment extending over the anomaly conductor segment to establish a series connection of the first and second phase windings. The bridging conductor segment includes leg portions disposed within the slots which are defined by the first and third layer conductors or the second and fourth layer conductors. The leg portions of the bridging conductor segment form a trailing one of the leg portions of the conductor segments of the first phase winding and a leading one of the leg portions of the conductor segments of the second phase winding. The leg portions of each of the bridging conductor segments are disposed within two of the slots which are the same as those within which the leg portions of the first and second phase windings of a corresponding one of the phase coils leading to the first and second terminal leads are disposed.

Each of the first and second phase windings may include a first turn coil, a second turn coil, and an anomaly conductor segment. The first turn coil includes first lap winding segments, second lap winding segments, and the wave winding segments which are joined alternately to make turns. The first lap winding segments are made up of ones of the lap winding segments formed by the conductor segments having the joint end portions separated at a joint pitch of approximately ½ slot pitch and the second and third layer conductors separated at a first slot pitch shorter than the pole pitch by one slot pitch or more. The second lap winding segments are made up of ones of the lap winding segments formed by the conductor segments having the joint end portions separated at a joint pitch of approximately ½ slot pitch and the fourth and fifth layer conductors separated at the first slot pitch, and the wave winding segments having the joint end portions separated at a joint pitch that is identical with two pole pitches minus sum of the joint pitches of the first and second lap winding segments and the first and sixth layer conductors separated at the first slot pitch. The second turn coil is made up of winding segments identical with the first lap winding segments and winding segments identical with the second lap winding segments which are connected alternately to make turns oriented in the same winding direction as that of the first turn coil. The anomaly conductor segment has leg portions disposed within two of the slots separated at a slot pitch different from the first slot pitch to establish a series connection of the first and second turn coils. The first and second phase windings of each of the phase coils are identical with each other electromagnetically and extend in opposite winding directions.

The first and second layer conductors disposed adjacent to each other within a same one of the slots belong to the first and second phase windings connected in parallel, respectively. The fifth and sixth layer conductors disposed adjacent to each other within a same one of the slots belong to the first and second phase windings connected in parallel, respectively.

The first and second layer conductors disposed adjacent to each other within a preselected one of the slots lead to an end of each of the phase coils. The fifth and sixth layer conductors disposed adjacent to each other within a preselected one of the slots lead to the other end of each of the phase coils. The phase coils are connected to make a star connection winding.

The first and second layer conductors disposed adjacent to each other within a preselected one of the slots may lead to an end of each of the phase coils. The fifth and sixth layer conductors disposed adjacent to each other within a preselected one of the slots may lead to the other end of each of the phase coils. The phase coils are connected to make a delta connection winding.

Each of the phase coils may have a bridging conductor segment extending over the anomaly conductor segment to establish a series connection of the first and second phase windings thereof. The bridging conductor segment includes the leg portions one of which is disposed within the slot in which the leg portion of one of the conductor segments leading to one of a pair of terminal leads of the each of the phase coils and forms a leading one of the leg portions of one of the first and second phase windings, and other of which is disposed within the slot in which the leg portion of one of the conductor segments leading to the other of the pair of terminal leads of the each of the phase coils and forms a trailing one of the leg portions of the one of the first and second phase windings. The tip portions of the leg portions of each of the bridging conductor segments are bent in the same circumferential direction of the armature winding.

The leg portions of the anomaly conductor segment of the first phase winding may be disposed, respectively, within two of the slots in which the leg portions of the anomaly conductor segment of the second phase winding are disposed A leg pitch of the leg portions of the anomaly conductor segment of the first phase winding is identical with that of the second phase winding.

A pair of terminal leads are provided which define ends of each of the phase coils which extends from an outside location in the slot within which the anomaly conductor segment is disposed.

Each of the slots may alternatively have 6n(=integer) of the leg portions of the conductor segments disposed.

The armature may further include a first terminal lead pair and a second terminal lead pair. The first terminal lead pair is made up of terminal leads forming ends of the first and second phase windings of each of the phase coils and leading to the first and second layer conductors disposed within one of the slots, respectively. The second terminal lead pair is made up of terminal leads forming the other ends of the first and second phase windings of each of the phase coils and leading to the fifth and sixth layer conductors disposed within one of the slots, respectively. m is an odd number greater or equal to three. The first terminal lead pairs of the phase coils is located at an interval away from each other which is equivalent to an electrical angle of $2\pi$. The first terminal lead pairs of the phase coils form a first group, the second terminal lead pairs of the phase coils form a second group. A first angular range occupied by the first group overlap with a second angular range occupied by the second group. Each of the first and second angular ranges is an electrical angle of $2\pi(m-1)/m$. Portions of the first terminal lead pair extending from the conductor segments are shifted from those of the second terminal lead pair by one slot pitch or more.

One of the terminal leads of the first terminal lead pair and one of the terminal leads of the second terminal lead pair may be connected at a neutral point. The other terminal lead of the first terminal lead pair and the other terminal lead of the second terminal lead pair may be connected to phase terminals, respectively. The phase coils are star-connected to make the armature winding.

The neutral point is located at an interval away from a junction of each of the first and second terminal lead pairs to the phase terminal by one slot pitch or more and defined intermediate between the junctions of the first and second terminal lead pairs in the circumferential direction of the armature core.

Ones of the terminal leads of the first and second terminal lead pairs which extend from the first layer conductors may be connected together to define a first neutral point. Ones of the terminal leads of the first and second terminal lead pairs which extend from the second layer conductors may be connected together to define a second neutral point. The first and second neutral points are separated from each other by given slot pitches in the circumferential direction of the armature core.

Ones of the terminal leads of the first terminal lead pairs and ones of the terminal leads of the second terminal lead pairs may be connected sequentially and lead to phase terminals. The first and second phase windings of each of the phase coils may be connected in parallel. The phase coils may be joined together to establish a delta-connection to make the armature winding.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 26 is an enlarged partial view which shows arrays of conductor segments within slots of a stator core, as illustrated in FIG. 25;

FIG. 27 is a partially sectional view which shows a large-sized conductor segment and two small-sized conductor segments as used in the stator coil of FIG. 25;

DESCRIPTION OF THE PREFERRED EMBODIMENTS

Figure 1:
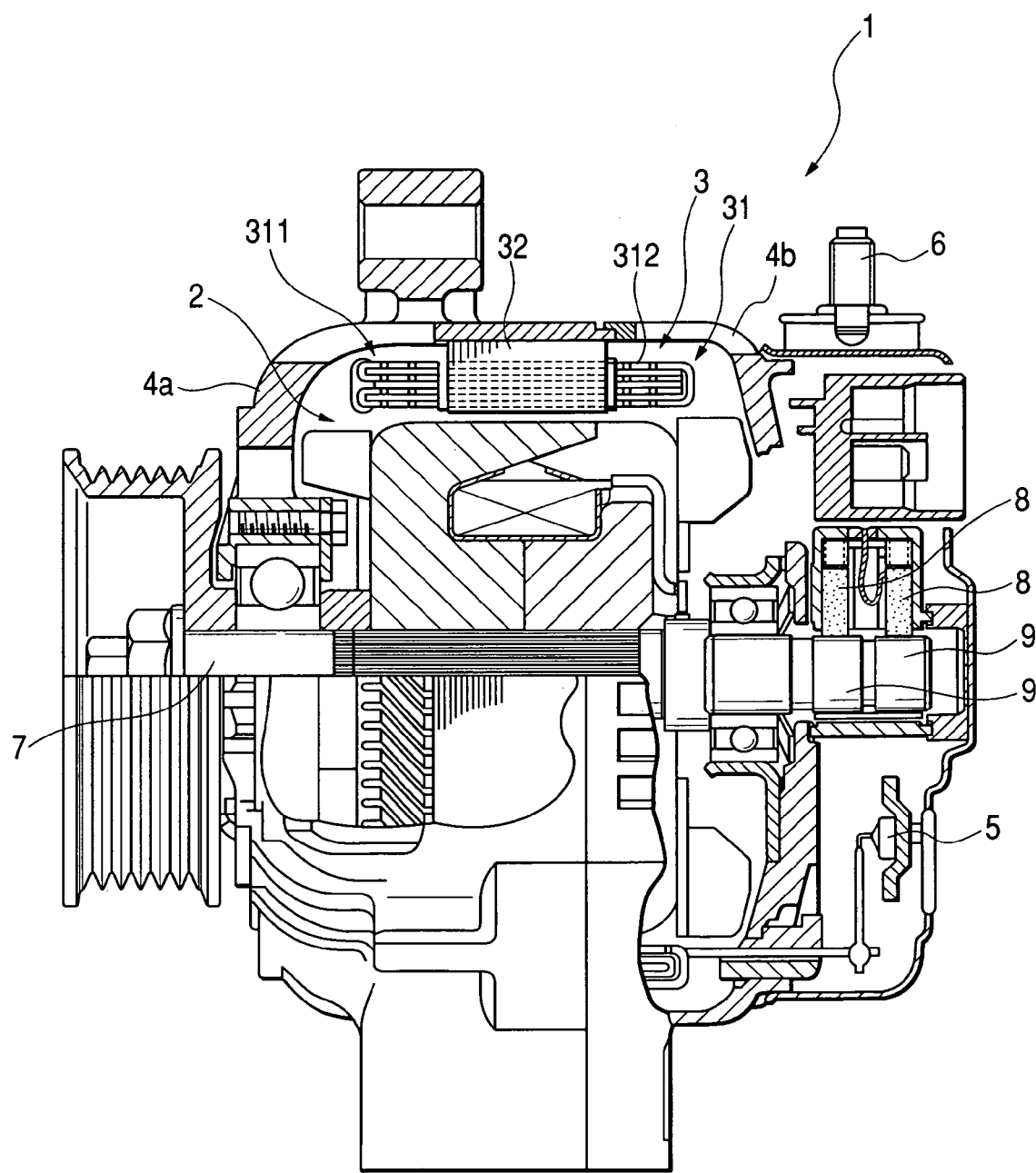
FIG. 1 is a partially longitudinal sectional view which shows an ac machine equipped with a stator coil according to the first embodiment of the invention.

Referring to the drawings, wherein like reference numbers refer to like parts in several views, particularly to FIG. 1, there is shown an ac machine 1 which may be used as an ac motor or an ac motor generator for automotive vehicles according to the invention.

The ac machine 1 is of a known structure which consists essentially of a rotor 2, housings 4a and 4b, a rectifier 5, an output terminal 6, a rotary shaft 7, brushes 8, and slip rings 9. The stator 3 is made up of a stator coil (i.e., an armature winding) 31, and a stator core 32. The stator core 32 is retained by the housings 4a and 4b in parallel to the rotary shaft 7. The stator coil 31 is wound in slots 350, as illustrated in FIG. 3, formed in the stator core 32. The rotor 2 is of a rundel pole type and installed on the rotary shaft 7 supported rotatably by the housings 4a and 4b through bearings. The rotor 2 is disposed within the stator core 32. The stator coil 31 is implemented by a three-phase armature winding made by passing conductor segment sets 330, as clearly shown in FIG. 2, through the slots 350, as shown in FIG. 3, formed in the stator core 32 through insulating sheets 340 from one side of the stator core 32 and joining adjacent two of the conductor segment sets 330 on the other side of the stator core 32. This type of stator coil is well known in the art.

The stator coil 31 is, as described above, made up of the sequentially joined conductor segment sets 330 disposed partially within the slots 350 formed in the stator core 32. Each of the conductor segment sets 330 will be described in detail below with reference to FIG. 2.

The conductor segment set 330 is made up of a large-size conductor segment 331 and a small-sized conductor segment 332 each of which consists of a substantially V-shaped head (will also be referred to as a V-shaped coil end), a pair of legs extending from the head into the slot 350 (will also be referred to as a slot-inserted portion below), and a pair of ends extending from the legs outside the stator core 32 (will also be referred to as a joint coil end below). Such a stator coil structure is well known in, for example, U.S. Pat. Nos. 6,201,332 B1, 6,249,956 B1, and 6,404,091 B1, all assigned to the same assignee as that of this application, disclosure of which is incorporated therein by reference. Each of the large-sized conductor segment 331 and the small-sized conductor segment 332 will also be referred generally to as a conductor segment 33.

The heads or V-shaped coil ends of the conductor segment sets 330 are arrayed in the form of a ring on one side of the stator core 32 to form a first coil end 312, as shown in FIG. 1. The joint coil ends are arrayed in the form of a ring on the other side of the stator core 32 to form a second coil end 311.

Each of the conductor segment sets 330 is, as described above, made up of the large-sized conductor segment 331 and the small-sized conductor segment 332. The large-sized conductor segment 331, as can be seen in FIG. 2, surrounds or extends over the small-sized conductor segment 332.

The large-sized conductor segment 331 consists of the head portion 331c (i.e., the V-shaped coil end), the slot-inserted portions 331a and 331b, and the end portions 331f and 331g (i.e., the joint coil ends). The end portions 331f and 331g are welded at tips 331d and 331e which will also be referred to as welds below. The slot-inserted portion 331a will also be referred to as a first layer conductor portion, and the slot-inserted portion 331b will also be referred to as a fourth layer conductor portion below.

The small-sized conductor segment 332 consists of the head portion 332c, the slot-inserted portions 332a and 332b, and the end portions 332f and 332g. The end portions 332f and 332g are welded at tips 332d and 332e which will also be referred to as welds below. The slot-inserted portion 332a will also be referred to as a second layer conductor portion, and the slot-inserted portion 332b will be referred to as a third layer conductor portion below.

Figure 2:
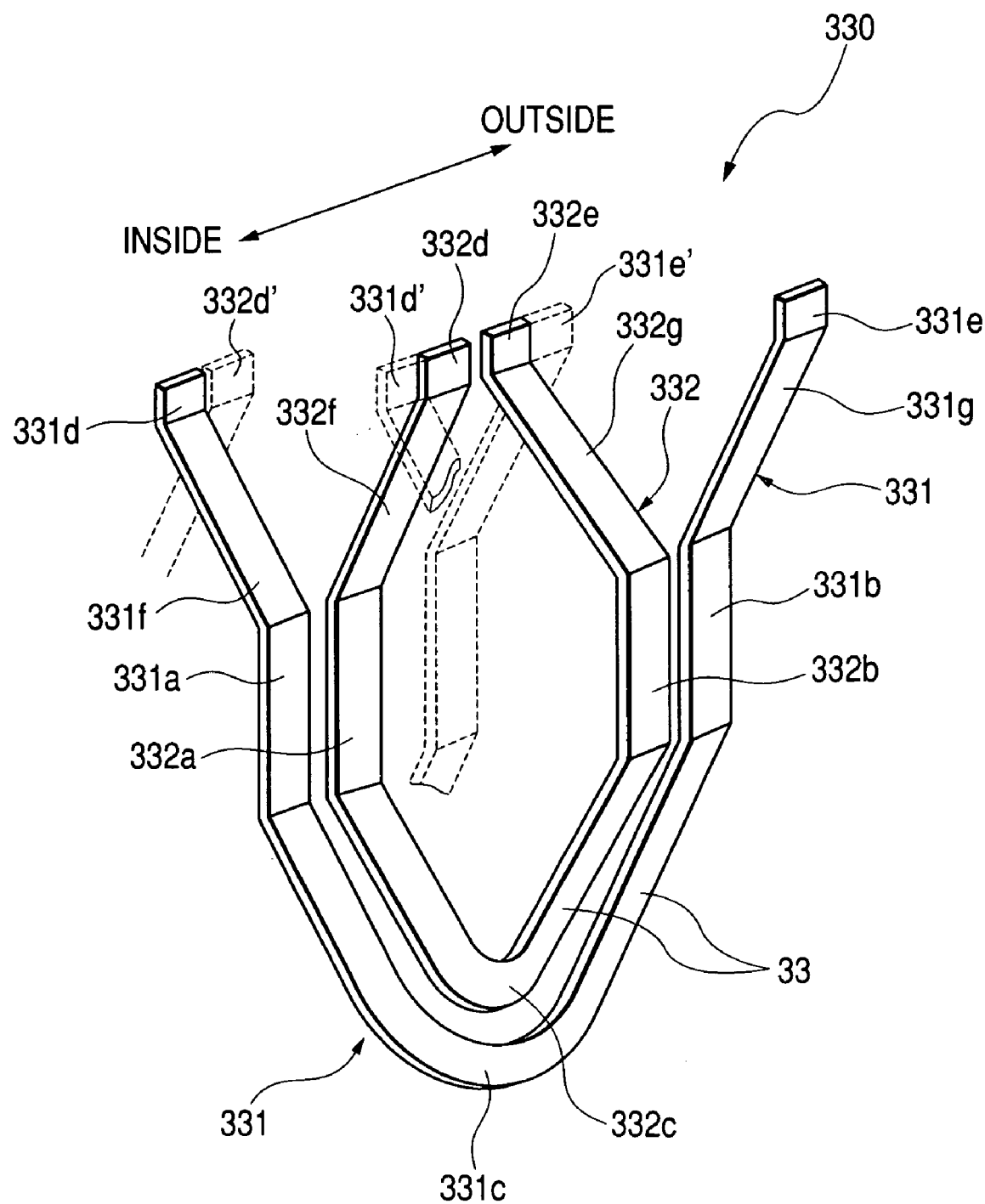
FIG. 2 is a perspective view of a set of a small-sized conductor segment and a large-sized conductor segment extending over the small-sized conductor segment of a stator coil.
Figure 3:
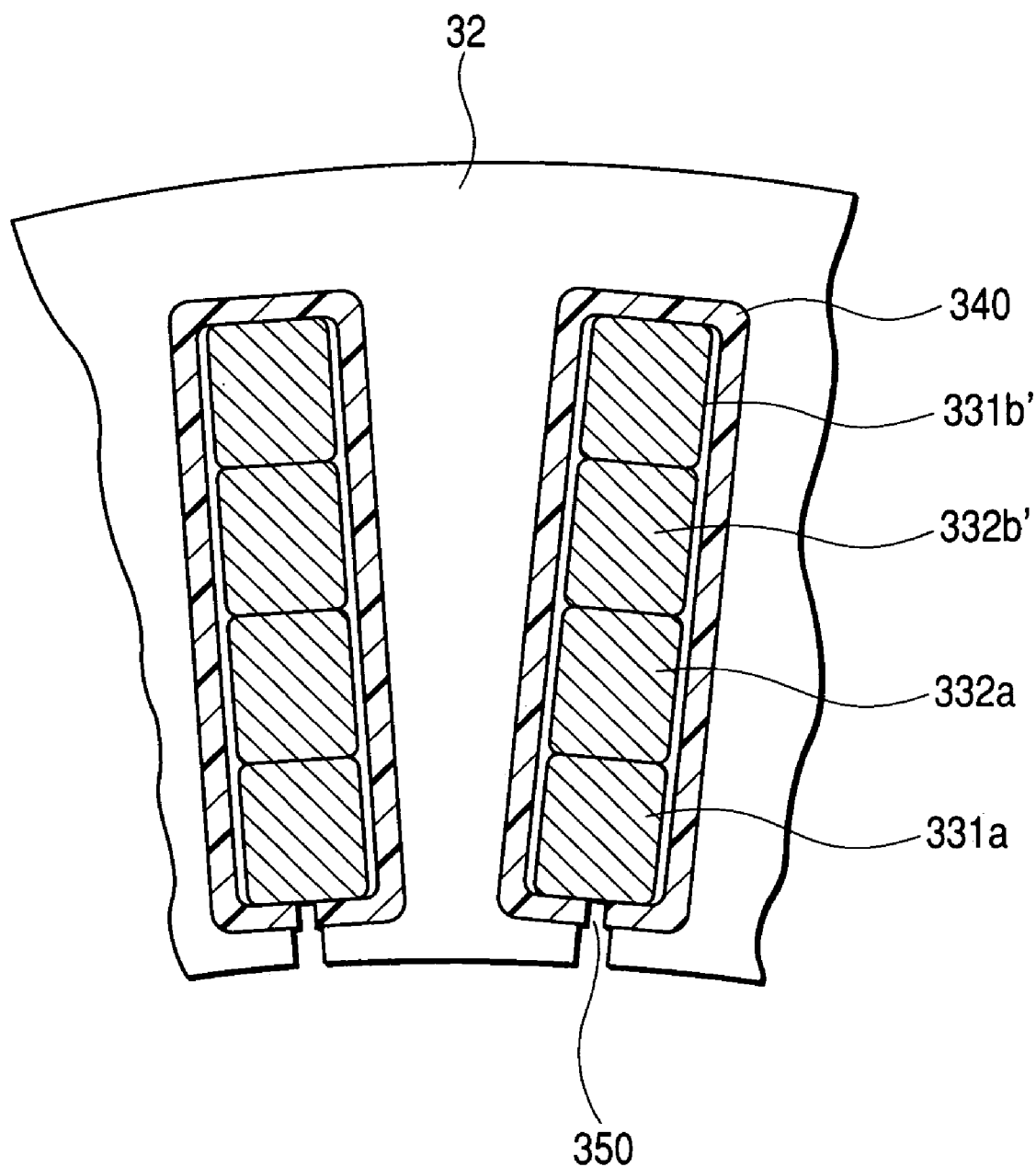
FIG. 3 is an enlarged partial view which shows arrays of conductor segments within slots of a stator core.

In FIG. 2, each reference number with a dash (') denotes the same portion as that referred to by a like reference number with no dash. In the illustrated example, the tips 331d and 332d' located adjacent each other in the radius direction of the stator core 32 are welded together. Similarly, the tips 332d and 331d' and the tips 332e and 331e' are welded together.

In the example as illustrated in FIG. 2, the first layer conductor portion 331a and the second layer conductor portion 332a are placed within one of the slots 350, while the fourth layer conductor portion 331b and the third layer conductor portion 332b of the same conductor segment set 33 are placed within another slot 350 spaced at given magnetic pole pitches. The head portion 332c of the small-sized conductor segment 332 is surrounded by the head portion 331c of the large-size conductor segment 331.

The stator core 32 has, as clearly shown in FIG. 3, the slots 350 having a length extending in the radius direction thereof. Within each of the slots 35, the four slot-inserted portions 331a, 332a, 332', and 331b' are arrayed in line or aligned in the radius direction of the stator core 32. In the following discussion, the four slot-inserted portions 331a, 332a, 332b', and 331b placed in each of the slots 350 will also be referred to as a first layer conductor portion to a fourth layer conductor portion, respectively, from inside to outside of the stator core 32. The locations of the first to fourth layer conductor portions in each of the slots 350 will also be referred to below as a first layer position to a fourth layer position, respectively. In the illustrated example, the slot-inserted portions 331b' and 332b' belong to one of the conductor segment sets 330 which is different from the conductor segment sets 330 having the slot-inserted portions 331a and 332a.

The structure of the stator coil 31 made of three phase windings (will also be referred to as a U-phase coil, a V-phase coil, and a W-phase coil below) will be described below with reference to FIGS. 4 and 5.

Figure 4:
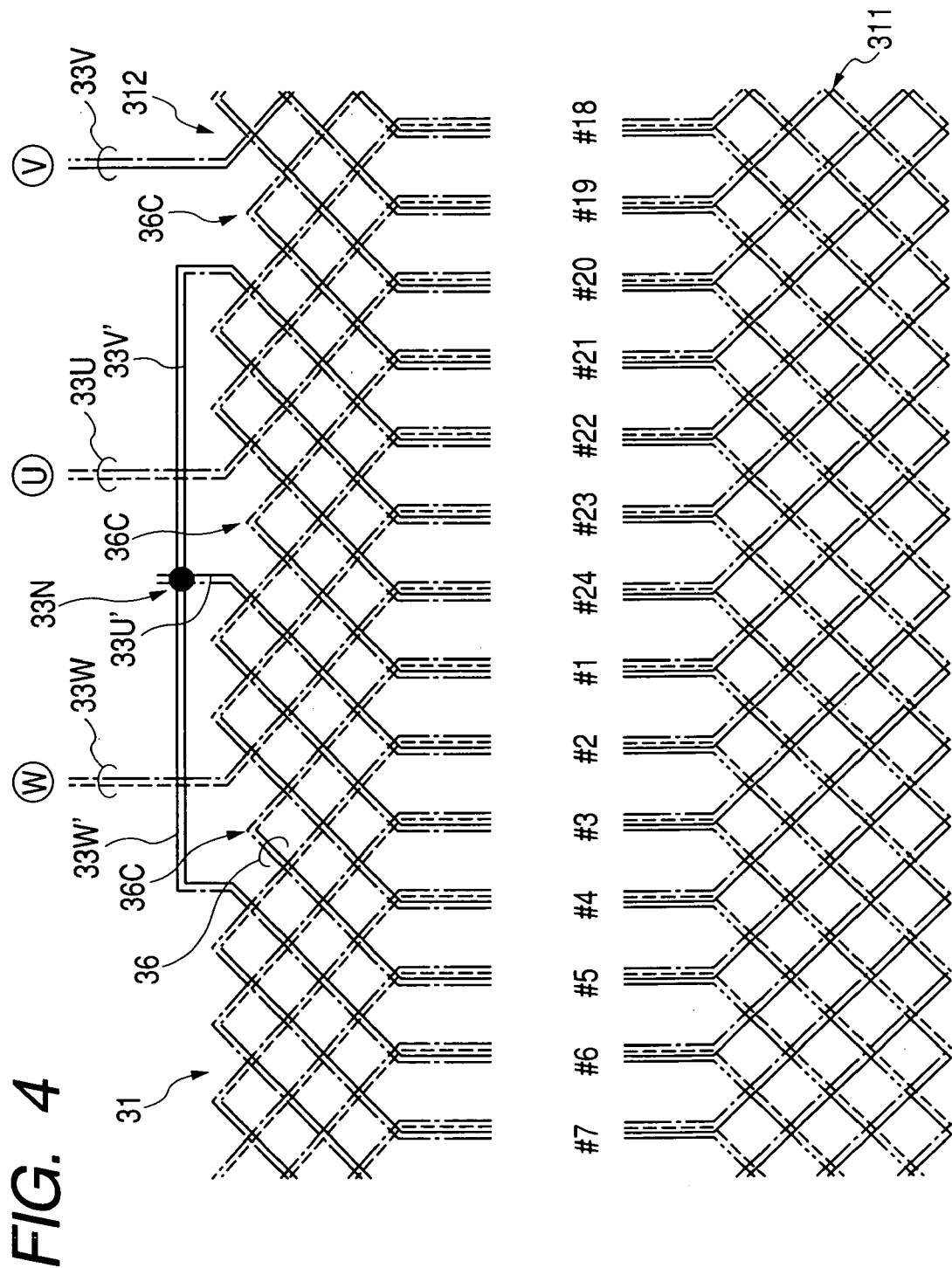
FIGS. 4 and 5 are developments which illustrate a stator coil in the first embodiment.
Figure 5:
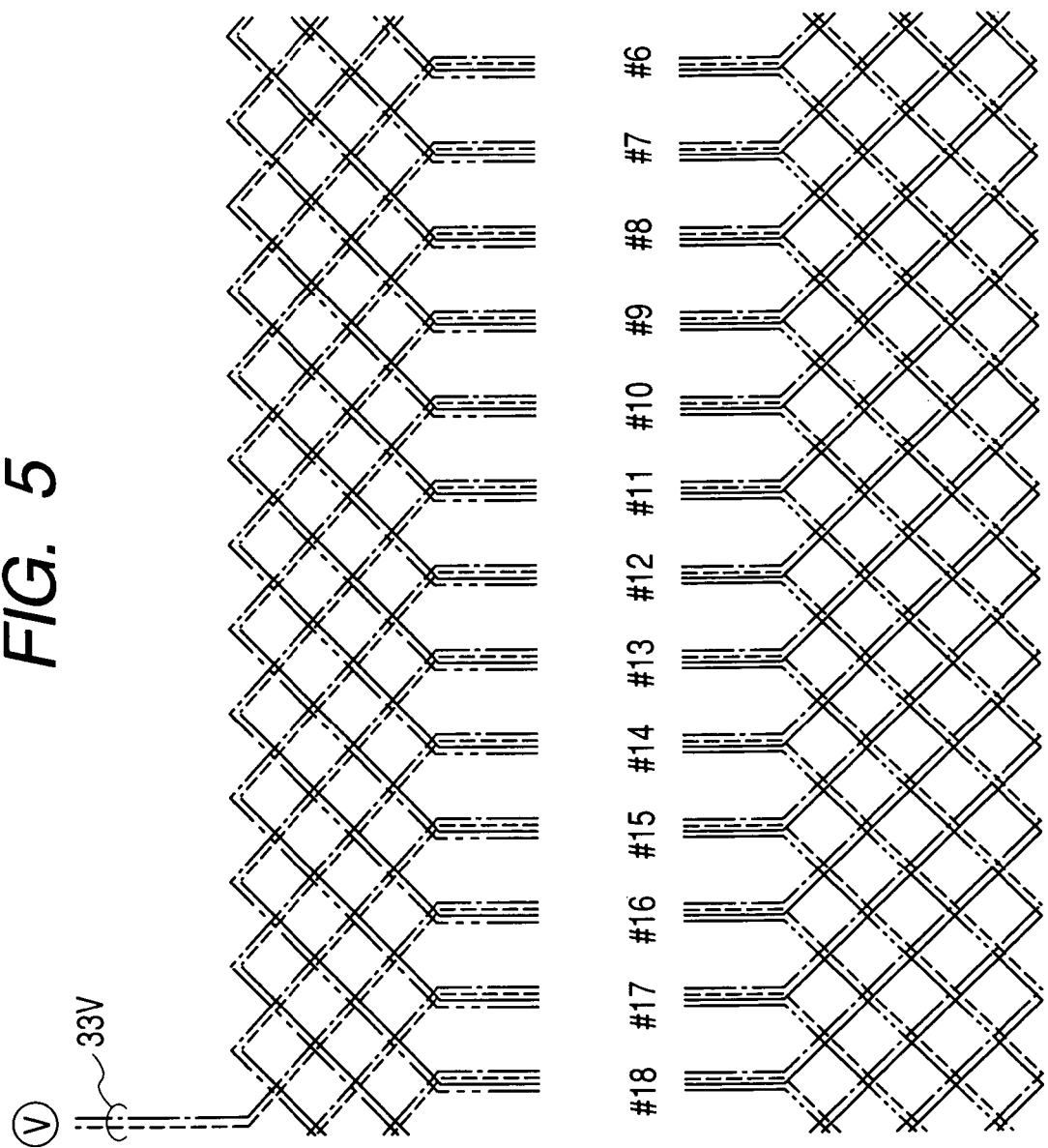

FIGS. 4 and 5 are developments each partially illustrating the stator coil 31 formed by a three-phase star-connected winding. The slot-inserted portion located at the first layer position within each of the slots 350 (i.e., the first layer conductor portion), the head portion, and the joint coil end of the conductor segment 33 are indicated by an alternate long and short dash line. The slot-inserted portion located at the second layer position within each of the slots 350 (i.e., the second layer conductor portion), the head portion, and the joint coil end extending therefrom are indicated by a broken line. The slot-inserted portion located at the third layer position within each of the slots 350 (i.e., the third layer conductor portion), the head portion, and the joint coil end extending therefrom are indicated by a solid line. The slot-inserted portion located at the fourth layer position within each of the slots 350 (i.e., the fourth layer conductor portion), the head portion, and the joint coil end extending therefrom are indicated by an alternate long and two short dashes line.

For the brevity of illustration, the stator coil 31 is designed to have four poles, but the poles may be increased further. The number of layers within each of the slots 350 may be more than four to increase an output of the ac machine 1.

Figure 6:
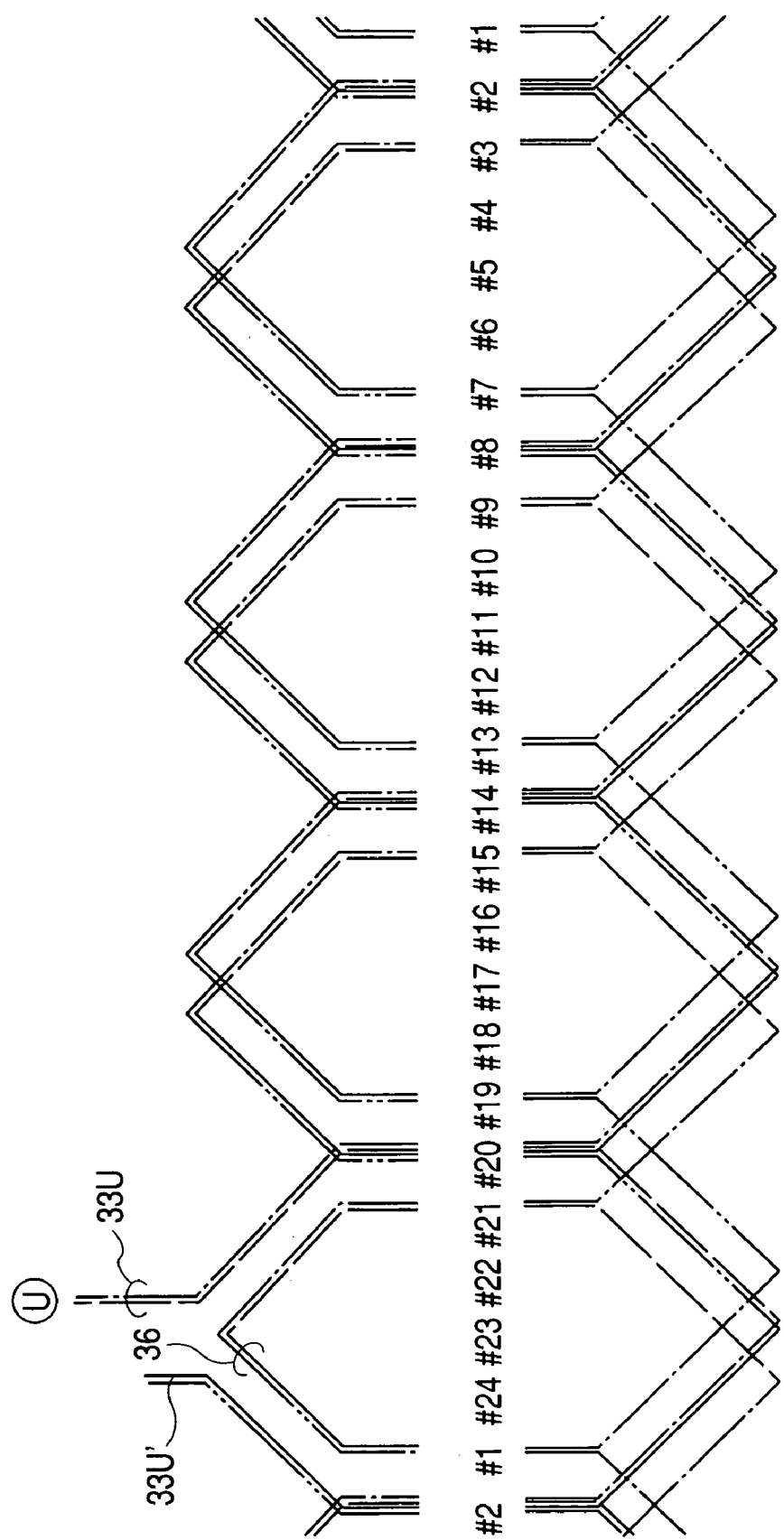
FIG. 6 is a development which shows a U-phase coil of a stator coil.
Figure 7:
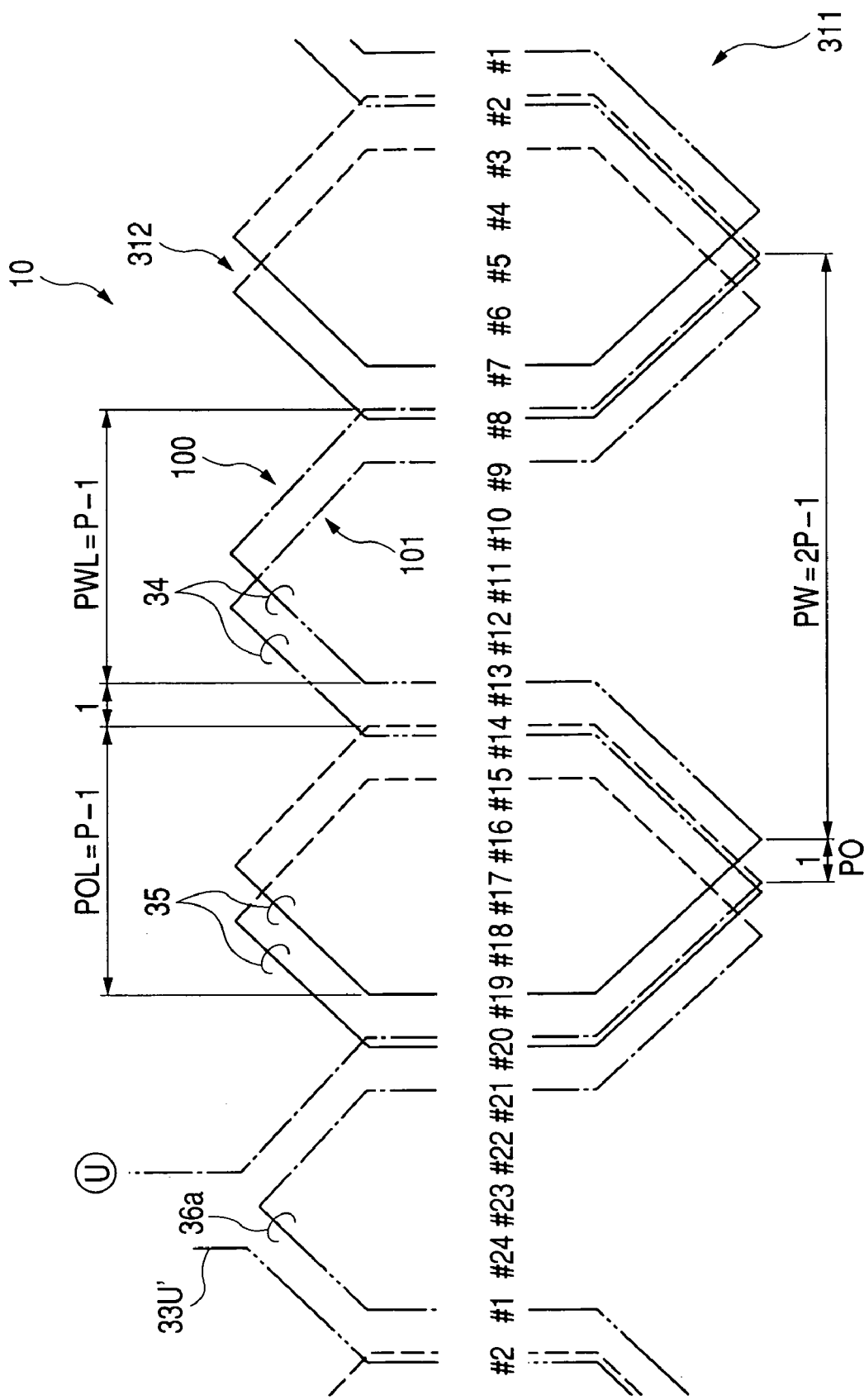
FIG. 7 is a development which shows a first phase winding of the U-phase coil as illustrated in FIG. 6.
Figure 8:
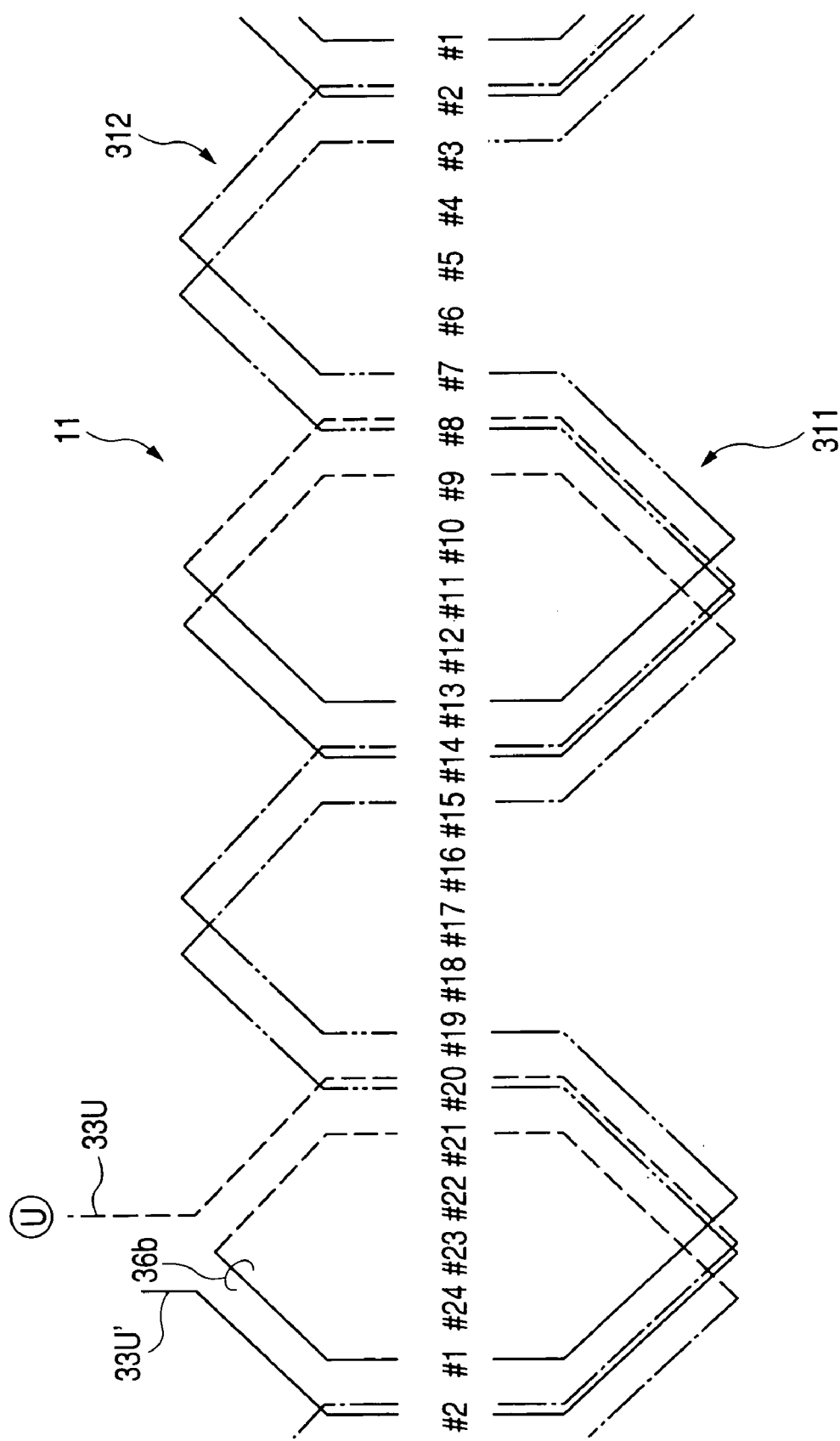
FIG. 8 is a development which shows a second phase winding of the U-phase coil as illustrated in FIG. 6.

The U-phase, V-phase, and W-phase coils are identical in structure except for circumferential locations in the stator core 32, and the following discussion will refer only to the U-phase coil for the brevity of disclosure. FIG. 6 illustrates the U-phase coil made up of first and second phase windings 10 and 11. FIG. 7 illustrates the first phase winding 10 of the U-phase coil. FIG. 8 illustrates the second phase winding of the U-phase coil. The first and second phase windings 10 and 11 are joined, as shown in FIG. 4, in parallel, and explanation thereof in detail will be omitted here.

The first and second phase windings 10 and 11 each include a wave winding segment 34 and lap winding segments 35 which are joined alternately.

The wave winding segments 34 are provided by the large-sized conductor segments 331 forming a wave winding coil and each include the first layer conductor portion, as indicated by the alternate long and short dash line, and the fourth layer conductor portion, as indicated by the alternate long and two short dashes line. Each of the wave winding segments 34 is formed by the large-sized conductor segment 331 with the joint coil ends projecting from the slots 350 in opposite circumferential directions. If a pole-to-pole pitch (will also be referred to as a pole pitch below) is identical with P slot-to-slot pitches (will also be referred to as a slot pitch below, P=6 in this embodiment), the welds of the joint coil ends of the large-sized conductor segment 331 is separated from each other at a pitch PW equal to (2P−1) slot pitches.

The lap winding segments 35 are provided by the small-sized conductor segments 332 forming a lap winding coil and each include the second layer conductor portion, as indicated by the broken line, and the third layer conductor portion, as indicated by the slid line. Each of the lap winding segments 35 is formed by the small-sized conductor segment 332 with the joint coil ends projecting from the slots 350 in approaching circumferential directions. The welds of the joint coil ends of the small-sized conductor segment 332 is separated from each other at a pitch PO equal to one slot pitch. Therefore, a total of the weld-to-weld pitches of each of the wave winding segments 34 and an adjacent one of the lap winding segments 35 will be two pole pitches (=2P slot pitches).

An interval between the slot-inserted portions of each of the wave winding segments 34, that is, a leg-to-leg pitch (i.e., a back pitch) PWL of the large-size conductor segment 331 is identical with P−1 slot pitches (i.e., an interval between the five slots 350). Similarly, an interval between the slot-inserted portions of each of the lap winding segments 35, that is, a leg-to-leg pitch (i.e., a back pitch) POL of the small-size conductor segment 332 is identical with P−1 slot pitches. This permits the length of the joint coil ends to be decreased, thereby realizing a fractional-pitch winding.

The first phase winding 10 is, as can be seen in FIG. 7, made up of a first turn coil 100 which includes the lap winding segments 35 and the wave winding segment 34 joined between the lap winding segments 35 to form turns, a second turn coil 101 which is made up of the lap winding segments 35 and the wave winding segment 34 joined between the lap winding segments 35 to form turns and has the same winding direction as that of the first turn coil 100, and a U-shaped anomaly conductor segment 36a connecting a trailing end of the first turn coil 100 and a leading end of the second turn coil 101 in series. The leg-to-leg pitch (i.e., a back pitch) of the anomaly conductor segment 36a is shorter than those of the wave winding segments 34 and the lap winding segments 35 by one slot pitch (i.e., the interval between the slots 350) or more.

The second phase winding 11 is, as can be seen in FIG. 8, equivalent electromagnetically to the first phase winding 10 and geometrically symmetrical with respect to the first phase winding 10. The second phase winding 11 has a winding direction opposite to that of the first phase winding 10. The second phase winding 11 has a U-shaped anomaly conductor segment 36b identical in structure with the anomaly conductor segment 36a of the first phase winding 10. The anomaly conductor segments 36a and 36b will also be referred generally to as an anomaly conductor segment set 36. The anomaly conductor segments 36a and 36b may alternatively have the back pitch longer than those of the wave winding segments 34 and the lap winding segments 35 by one slot pitch or more.

The first phase winding 10 and the second phase winding 11 are joined in parallel to form the U-phase coil of the three-phase star-connected stator coil 31. The U-phase coil has, as shown in FIG. 4, a pair of terminal leads 33U which are joined to leading ones of the first layer conductor portions and the second layer conductor portions of the first and second phase windings 10 and 11 disposed within the same slot 350, respectively. Similarly the V-phase coil and the W-phase coil have pairs of terminal leads 33V and 33W which are joined to leading ones of the first layer conductor portions and the second layer conductor portions of the first and second phase windings 10 and 11 disposed within the same slot 350, respectively. The terminal leads 33U, 33V, and 33W (i.e., interfaces between themselves and the joint coil ends of the conductor segments 33) are separated from each other at four slot pitches.

The U-phase coil also has a pair of neutral point joint leads 33U' which are connected to trailing ones of the third layer conductor portions and the fourth layer conductor portions of the first and second phase windings 10 and 11 disposed within the same slot 350, respectively. Similarly, the V-phase and W-phase coils also have pairs of neutral point joint leads 33V' and 33W' which are connected to trailing ones of the third layer conductor portions and the fourth layer conductor portions of the first and second phase windings 10 and 11 disposed within the same slot 350, respectively. The neutral point joint leads 33U', 33V', and 33W' (i.e., interfaces between themselves and the joint coil ends of the conductor segments 33) are separated from each other at four slot pitches. The neutral point joint leads 33V' and 33W', as clearly shown in FIG. 4, extend in a circumferential direction of the stator coil 31 without lapping over another and connect to the neutral point 33N from which the terminal leads 33U' extend. This forms the three-phase star-connection armature winding (i.e., the stator coil 31)

with the three phase coils each made up of the first and second phase windings 10 and 11 joined in parallel.

The above arrangements of the terminal leads 33U, 33V, 33W, 33U', 33V', and 33W' result in ease of drawing and shaping thereof, thereby simplifying production process of the stator coil 31.

The terminal leads 33U, 33V, and 33W may alternatively be connected to the third and forth layer conductor portions of the first and second phase windings 10 and 11 disposed within the same slot. 350, respectively. The terminal leads 33U', 33V', and 33W' may alternatively be connected to the first and third layer conductor portions of the first and second phase windings 10 and 11 disposed in the same slot 350, respectively.

The anomaly conductor segment 36a of the first phase winding 10 and the anomaly conductor segment 36b of the second phase winding 11 are, as described above, identical in back pitch with each other and disposed in the same slot 350, therefore, they may be formed by preparing a large conductor segment like the large-sized conductor segment 331 and a small conductor segment like the small-sized conductor segment 332 as an anomaly conductor segment set and spreading (bending) and shaping the anomaly conductor segment set in a single process. This permits the anomaly conductor segments 36a and 26b to be inserted into the same slot 350 simultaneously, thus resulting in simplified manufacturing processes of the stator coil 31.

The heads 36c of the anomaly conductor segment sets 36 are, as clearly shown in FIG. 4, disposed within gaps between the terminal leads 33U and 33U', between 33V and 33V', and between 33W and 33W' in the circumferential direction of the stator coil 31, thus permitting the terminal leads 33U, 33V, 33W, 33U', 33V', and 33W' to be collected within a desired range without physically interfering with the anomaly conductor segment sets 36.

As apparent from the above discussion, the terminal leads 33U, 33V, and 33W of the stator coil 31 extend from the m slots 350 which are located at an interval of 2π/m away from each other and lie within an angular range of 2π(m−1)/m where m is the number of phases and three (3) in this embodiment). Similarly, the neutral point joint leads 33U', 33V', and 33W' extend from the m slots 350 which are located at an interval of 2π/m away from each other and lie within an angular range of 2π(m−1)/m. This permits, as can be seen from FIG. 4, the terminal leads 33U, 33V, 33W, 33U', 33V', and 33W' extending outside the first coil end 312 to be arranged systematically in the circumferential direction of the stator coil 31 and collected within a desired range. A central one of the pairs of the neutral point joint leads 33U', 33V', and 33W', that is, the pair of terminal leads 33U', as described above, extends from the neutral point 33N, thereby allowing the neutral point joint leads 33V' and 33W' to be identical in length and configuration with each other. This facilitates ease of production of the stator coil 31.

The structure of the stator coil 31 also permits the length of portions of the terminal leads 33U to 33W' extending in the circumferential direction to be decreased as compared with conventional structures, thus resulting in a decrease in electric resistance thereof.

The back pitches of the wave winding segments 34 and the lap winding segments 35 are shorter than the pole pitch P by one slot pitch, thus resulting in decreased interval between the coil ends, which results in decreases in winding resistance and leaking inductance. This serves to decrease the amount of heat dissipating from the generator 7 and improve an output of the generator 7.

The structure in which the wave winding segment(s) 34 and the lap winding segments 35 are joined alternately permits the second coil end 311 to be made in a full-pitch winding fashion, thereby alleviating the problem, as underlying conventional automotive generator made of fractional pitch distributed windings, that one of the coil ends are undesirably long. This results in a decrease in electric resistance of the stator coil 31.

Figure 9:
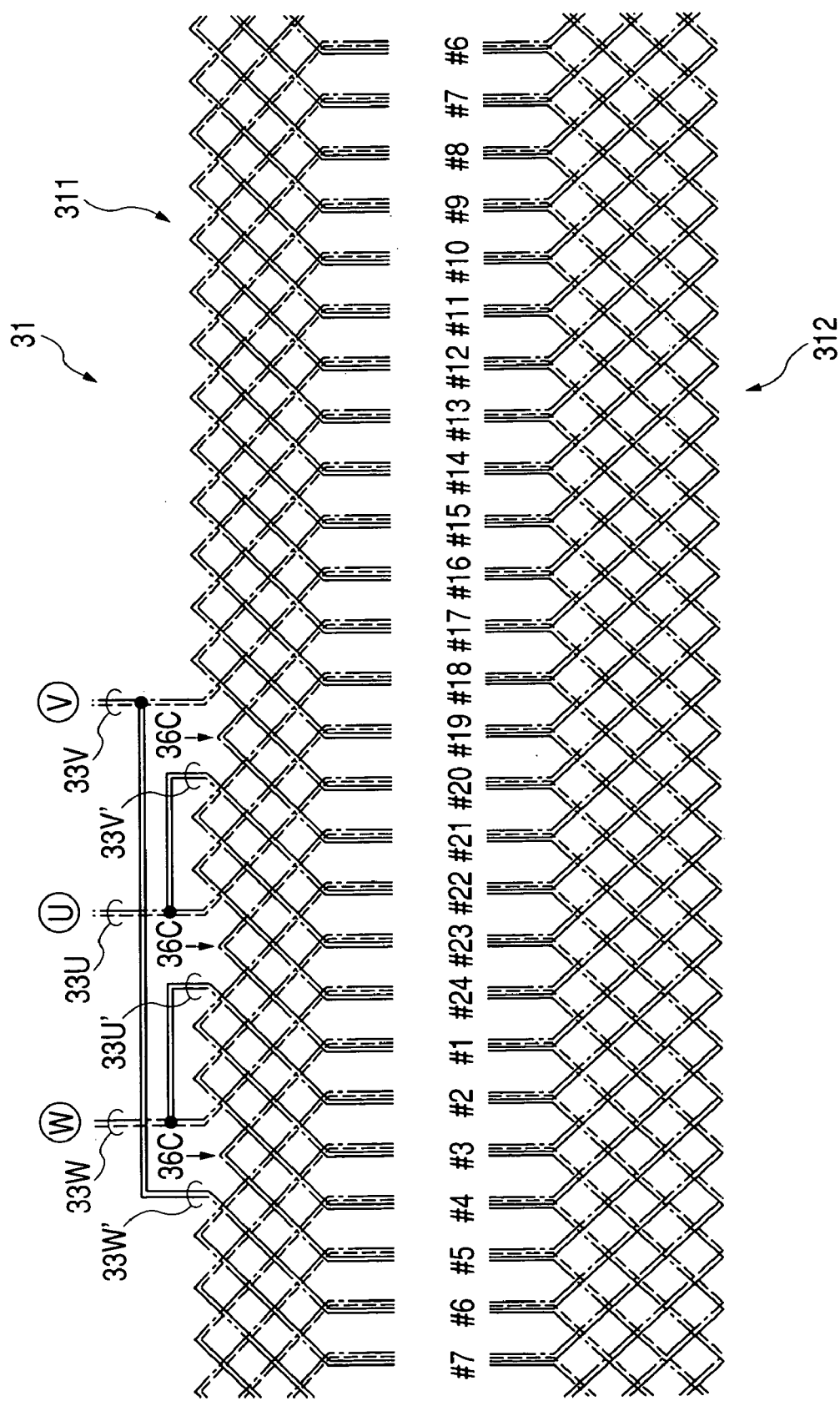
FIG. 9 is a development which shows a stator coil according to the second embodiment of the invention.
Figure 10:
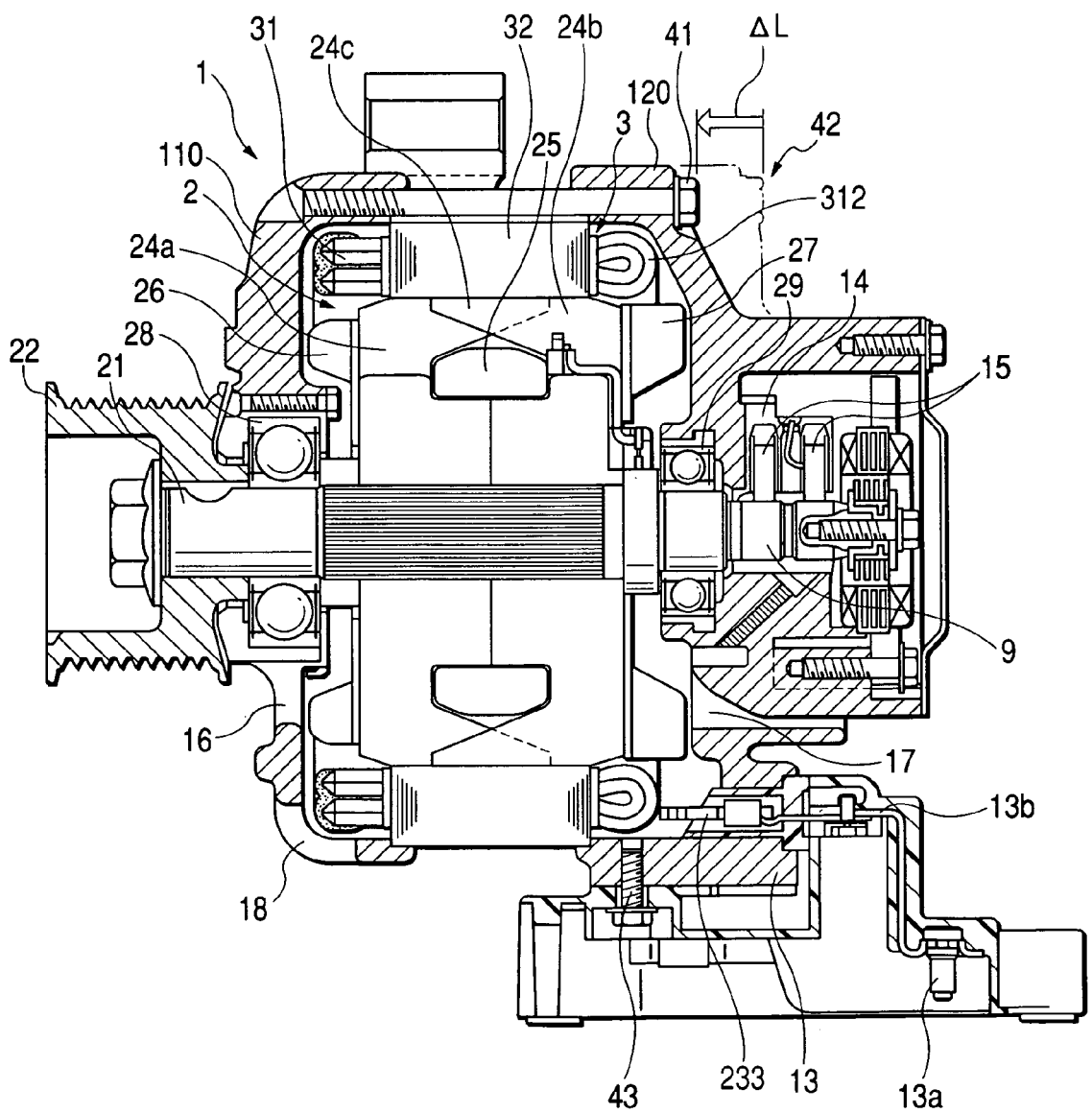
FIG. 10 is a partially longitudinal sectional view which shows an ac machine equipped with a stator coil according to the third embodiment of the invention.

FIG. 9 shows the stator coil 31 according to the second embodiment of the invention which has the U-, V-, and W-phase coils delta-connected.

The arrangements of the slot-inserted portions of the conductor segment sets 330 and locations of the terminal leads 33U, 33V, 33W, 33U', 33V', and 33W' are identical with those in the first embodiment. The terminal leads 33U, 33V, and 33W are joined to the first and second layer conductor portions disposed within the same slots 350, respectively. The terminal leads 33U', 33V', and 33W' are joined to the third and fourth layer conductor portions disposed within the same slots 350, respectively.

The terminal leads 33U, 33V, 33W, 33U', 33V', and 33W' are joined in the illustrated manner, thereby establishing the delta connection of the three-phase stator coil 31 made up of the first phase winding 10 and the second phase winding 11 joined in parallel to each other (see FIG. 1).

The terminal leads 33U, 33V, and 33W may alternatively be joined to the third and fourth layer conductor portions disposed within the same slots 350, respectively. The terminal leads 33U', 33V', and 33W' may alternatively be joined to the first and second layer conductor portions disposed within the same slots 350, respectively.

FIGS. 10 to 13 show the ac machine 1 for use in automotive vehicles according to the third embodiment of the invention which has sixteen (16) poles. The stator coil 31 is identical in structure with that of the first embodiment except for increased slots 350 or conductor segment sets 330. Additionally, the arrangements and connections of the terminal leads 33U, 33V, 33W, 33U', 33V', and 33W' are identical with those in the first embodiment.

The ac machine 1 is equipped with a front frame 110 and a rear frame 120 and has the rotor 2 retained rotatably through bearings 28 and 29. The front frame 110 and the rear frame 120 retain the stator core 32. Through bolts 41 fasten and hold the stator core 32 from rotating.

A terminal table 13 is secured on a circumferential wall of the rear frame 120 through bolts 43. The terminal table 13 has three-phase terminal bolts 13a which establish connections of input/output terminals of the ac machine 1 to three ac terminals of a three-phase inverter (not shown). The length of a first circumferential portion of the rear frame 120 extending in parallel to the rotary shaft 21 on which the terminal table 13 is not attached is shorter than that of a second circumferential portion, as indicated by a dashed line in FIG. 10, of the rear frame 120 to which the terminal table 13 is attached by a distance ΔL. Numeral 42 indicates an end surface of the second circumferential portion to which the terminal table 13 is attached. The decreased length of the first circumferential portion of the rear frame 120 results in a decreased length of the through bolts 41. Specifically, the angular range occupied by the terminal leads 33U, 33V, and 33W is, like the first embodiment, relatively small, thus permitting the length of the rear frame 120 extending parallel to the shaft 21 to be decreased.

The shaft 21 of the rotor 2 extends forwardly of the front frame 110 and has a pulley 22 installed on a front end thereof. The pulley 110 is mechanically connected to a drive pulley of the engine through a belt (not shown). The shaft 21 also has a rear end portion projecting from the rear frame 120 on which a brush unit 14 is installed. The brush unit 14 includes a pair of slip rings 9 installed on the rear end of the shaft 21 and a pair of brushes 15 placed in slidable contact with the slip rings 9. The shaft 21 is press-fit within an axial hole of the rotor core 24.

The rotor core 24 is made up of a front pole core 24a and a rear pole core 24b and has a magnetic pole unit 24c installed on an outer periphery thereof which is equipped with eight pairs of poles. The pole cores 24a and 24b retain a field coil 25 working to excite the rotor core 24. The field coil 25 is connected at ends thereof to the slip rings 9 and supplied with power through the brush unit 14.

The rotor core 24 has a front fan 26 and a rear fan 27 welded to ends thereof. The front and rear fans 26 and 27 work to rotate along with the rotor core 24 to suck fresh air for cooling purposes from air inlets 16 and 17 formed in the front and rear frames 110 and 120. The front and rear frames 110 and 120 also have formed therein air outlets 18 and 19 from which the fresh air entering from the air inlets 16 and 17 is exhausted. Note that the air outlets 19 are omitted in the drawings for the brevity of illustration.

Figure 11:
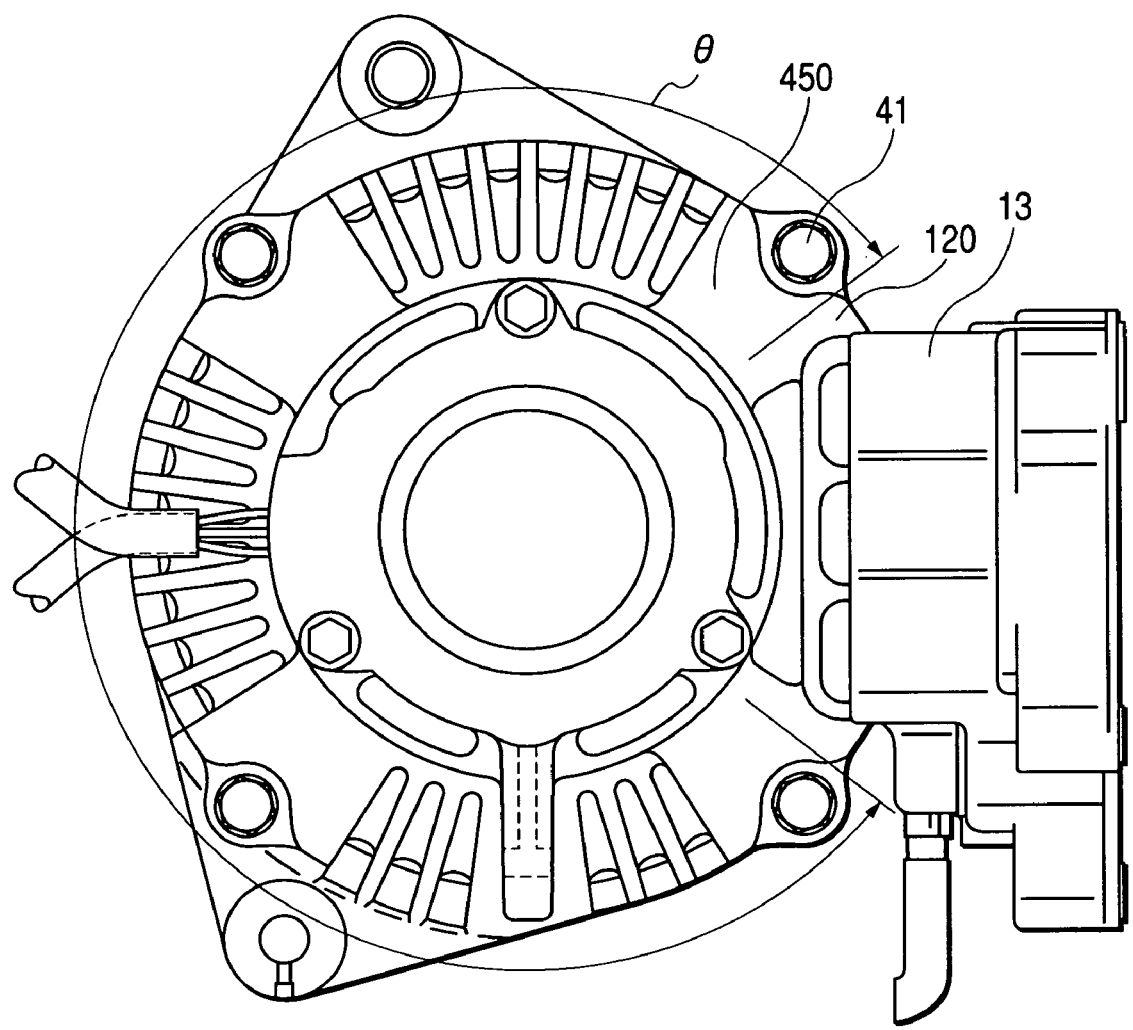
FIG. 11 is a rear view of the ac machine of FIG. 10.

FIG. 11 is a rear elevation of the ac machine 1. The rear frame 120 has end surfaces 450 ranging over θ lying outside the area where the terminal table 13 is installed. The end surfaces 450 form recesses in the rear frame 120, thus allowing the shorter through bolts 41 to be used.

Figure 12:
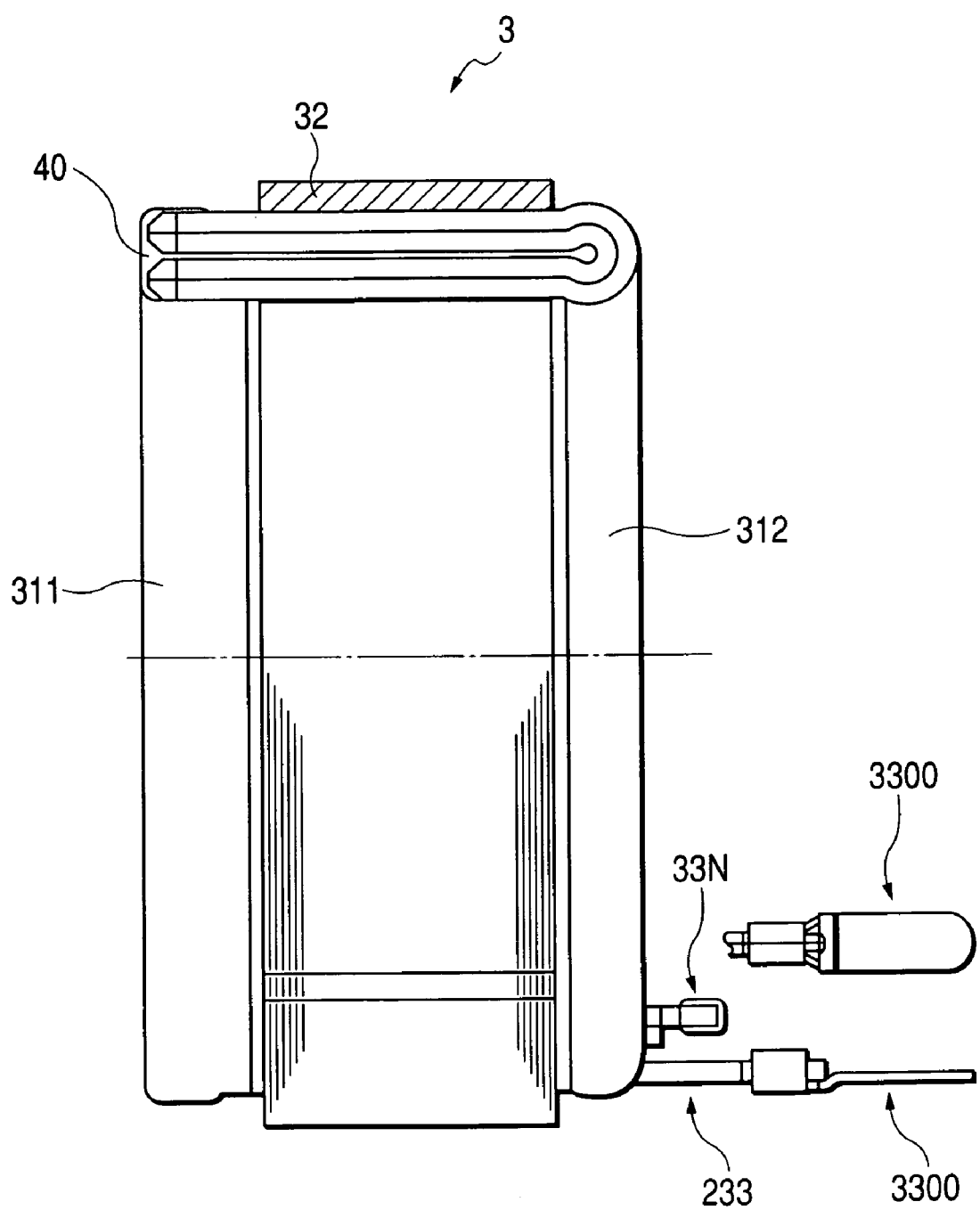
FIG. 12 is a longitudinal sectional view, as taken along the line A—A in FIG. 13, of a 16-pole stator consisting of a stator core and a stator coil in the third embodiment.
Figure 13:
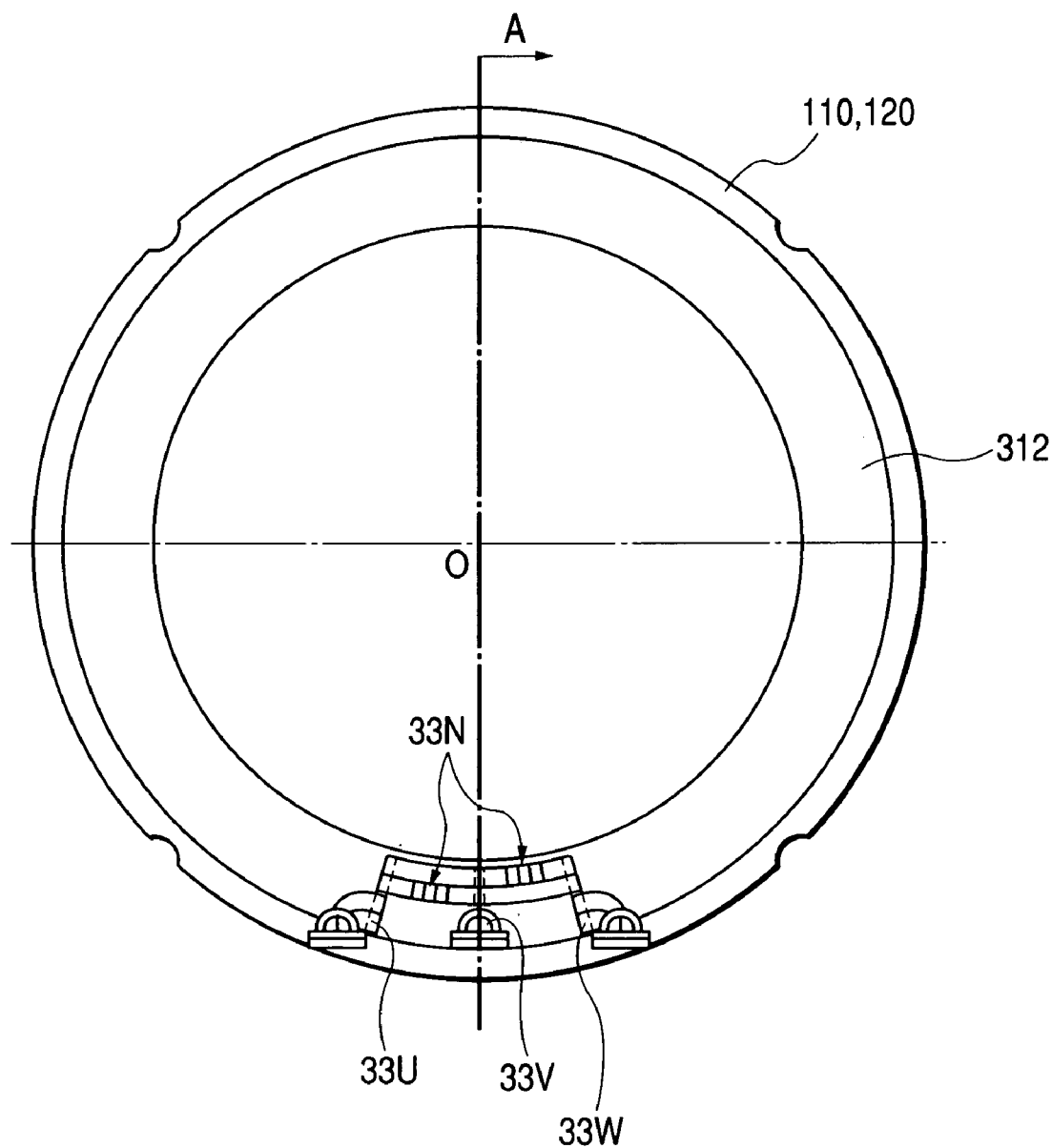
FIG. 13 is a rear elevation of the stator coil as illustrated in FIG. 12.

FIG. 12 is a longitudinal sectional view of the 16-pole stator 3 (i.e., the armature winding) consisting essentially of the stator core 32 and the stator coil 31. FIG. 13 is a rear elevation of the stator 3. The stator core 32 includes a lamination of electromagnetic steel plates. The stator coil 31 includes a three-phase winding which is, like the first embodiment, wound through slots formed in the stator core 32 using insulating sheets.

An input/output line collection 233 made up of the terminal leads 33U, 33V, and 33W extends from the first coil end 312 of the stator coil 31 backward. An electric connection of the stator coil 31 to an inverter (not shown) is, as clearly shown in FIGS. 12 and 13, accomplished by coupling crimp contacts 3300 secured to ends of the terminal leads 33U, 33V, and 33W to metal connectors 13b on the terminal table 13.

The neutral points 33N and the neutral point joint leads 33U', 33V', and 33W' extending circumferentially of the stator coil 31 to the neutral point 33N are located radially inside the input/output line collection 233 and close to the rear of the first coil end 312.

The second coil end 311 of the stator coil 31 is coated with epoxy resin for avoiding electric shorts between pairs of the welds of the conductor segment sets 330.

Figure 14:
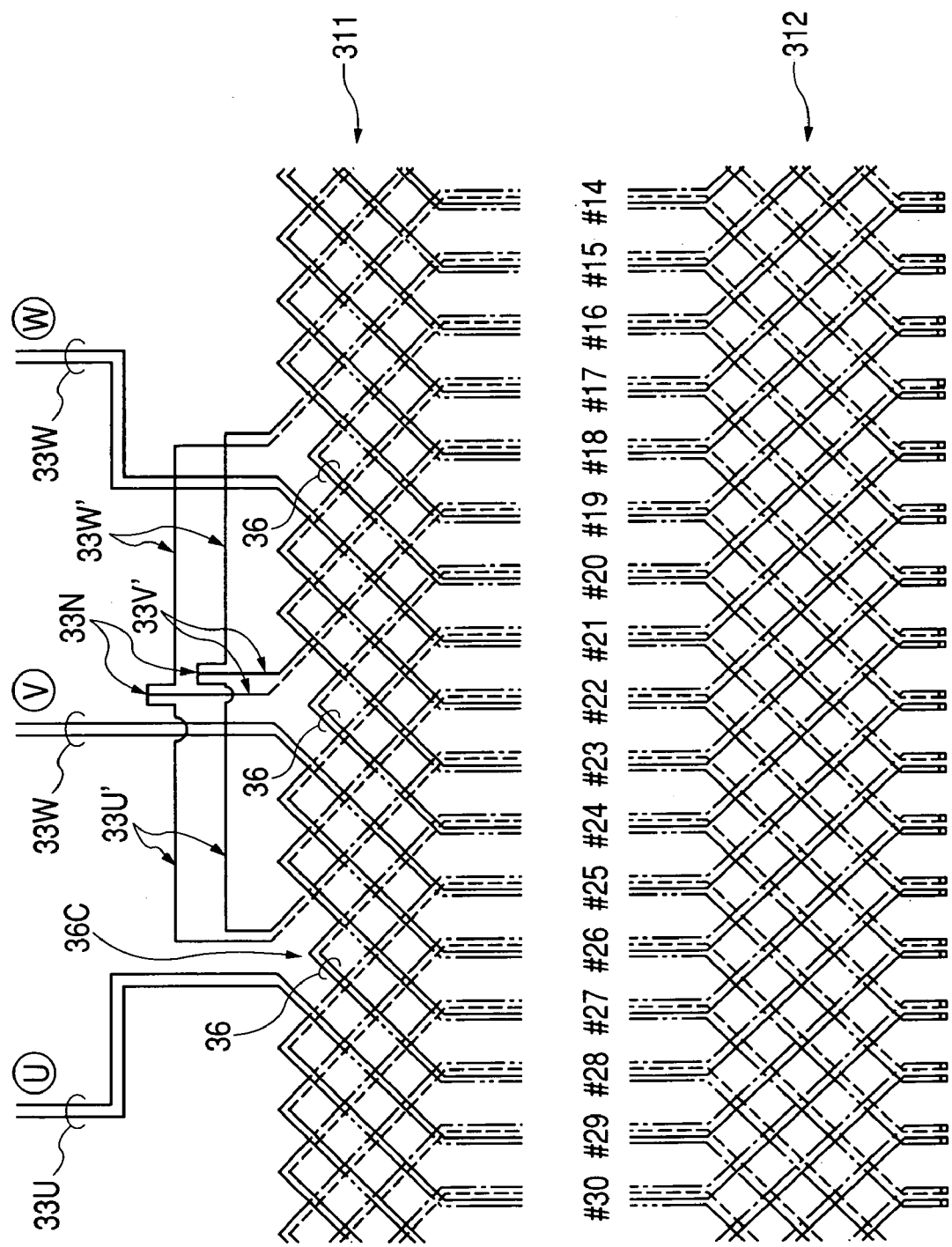
FIG. 14 is a development of a stator coil in the third embodiment of the invention.
Figure 15:
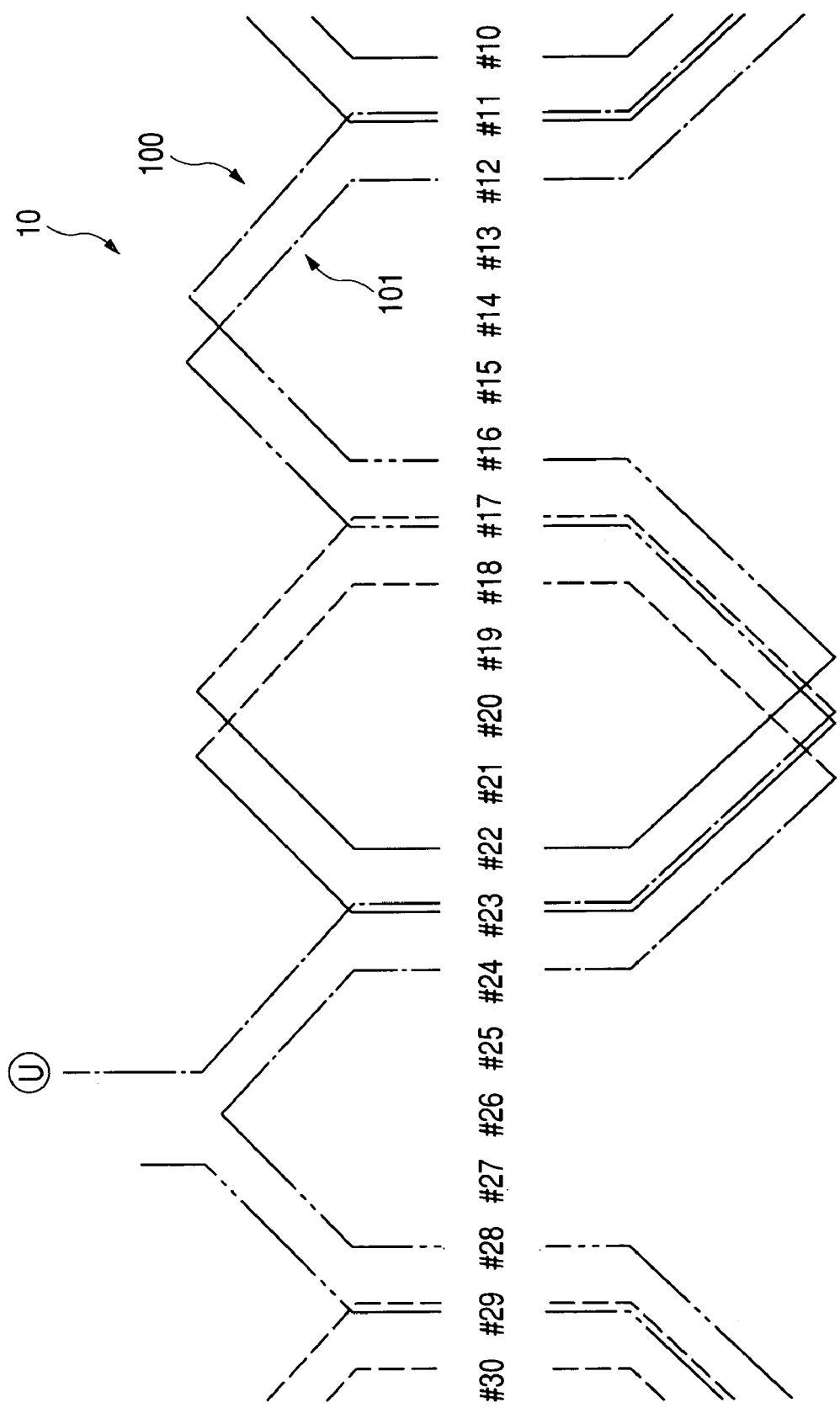
FIG. 15 is a development which shows a first phase winding of the U-phase coil as illustrated in FIG. 14.
Figure 16:
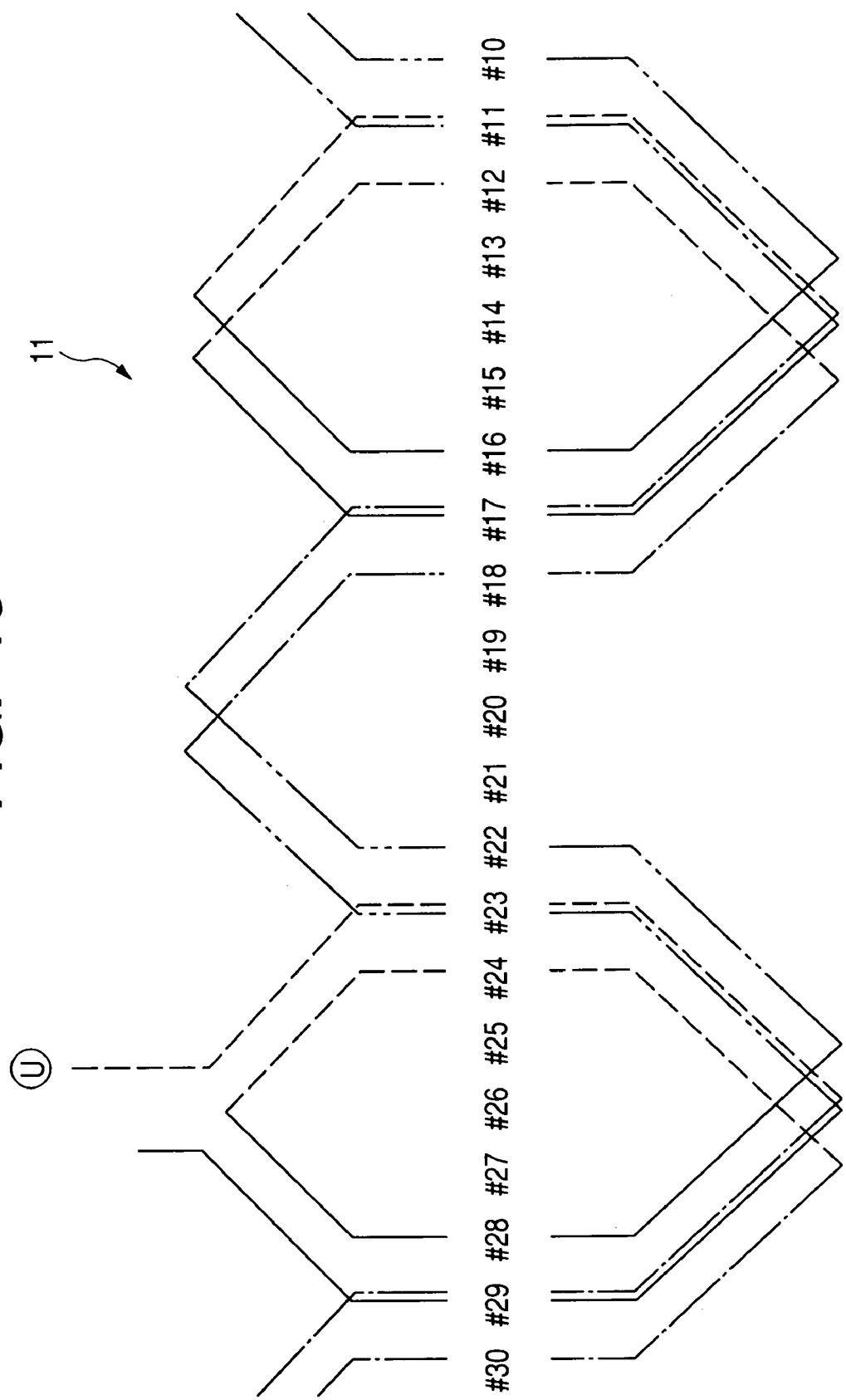
FIG. 16 is a development which shows a second phase winding of the U-phase coil as illustrated in FIG. 14.

FIG. 14 is an enlarged development of the terminal leads 33U, 33V, 33W, 33U', 33V', and 33W' and the first and second coil ends 311 and 312. FIG. 15 is a partial development which shows the first phase winding 10. FIG. 16 is a partial development which shows the second phase winding 11. Specifically, the stator coil 31 of this embodiment is identical with the one in the first embodiment except that the neutral point joint leads 33U', 33V', and 33W' are broken down into two circuits, and the slots 350 are increased.

The terminal leads 33U, 33V, and 33W, one pair for each phase of the stator coil 31, are, like the first embodiment, extend from the third and fourth layer conductor portions disposed within the same slots 350, respectively. The neutral point joint leads 33U', 33V', and 33W', one pair for each phase of the stator coil 31, extend from the first and second layer conductor portions disposed within the same slots 350, respectively, and lead to the neutral points 33N to form a three-phase star-connected winding. This results in, like the first embodiment, simplified arrangements and connections of the terminal leads 33U, 33V, 33W, 33U', 33V', and 33W'.

Use of the two neutral points 33N permits the number of joints to each of the neutral points 33N to be decreased to three, thus resulting in ease of welding the terminal leads 33U', 33V', and 33W' to the neutral points 33N.

The anomaly conductor segments 36a and 36b of the anomaly conductor segment set 36 connecting the first turn coil 100 and the second turn coil 101, as shown in FIG. 15, are identical in back pitch thereof, and the slot-inserted portions thereof are disposed within the same slots 350, respectively, thereby resulting in, like the first embodiment, a decreased time for production processes of the stator coil 31.

Figure 17:
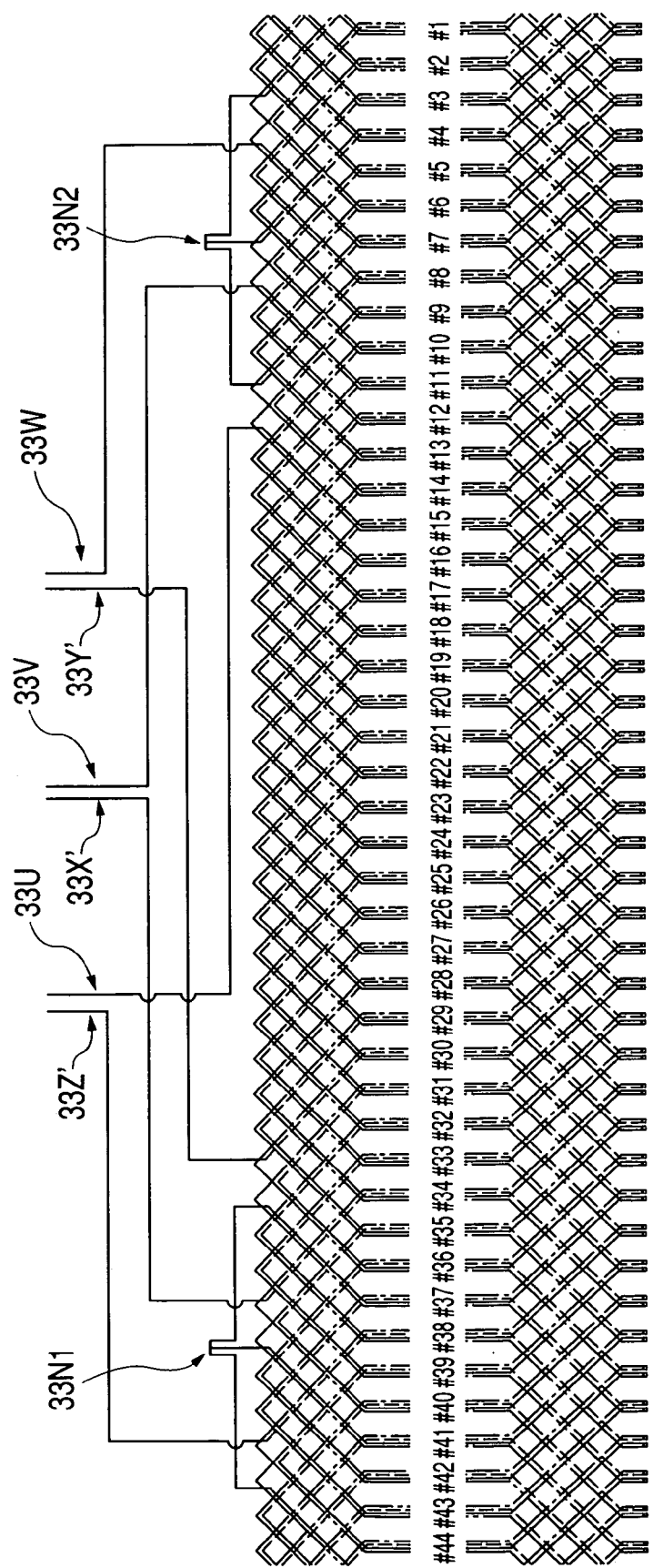
FIG. 17 is a development of a stator coil of a comparative example.
Figure 18:
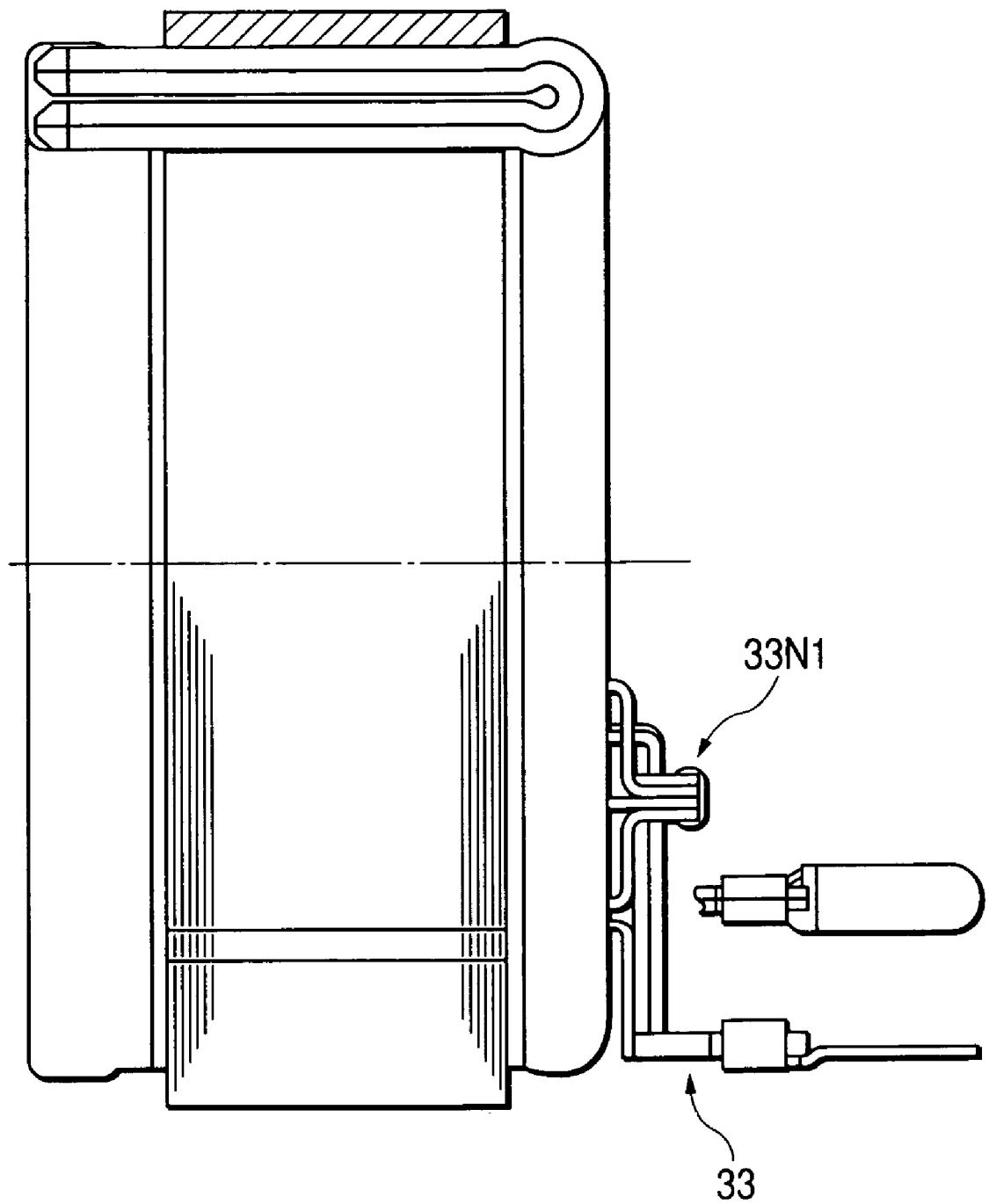
FIG. 18 is a longitudinal sectional view, as taken along the line A—A in FIG. 19.
Figure 19:
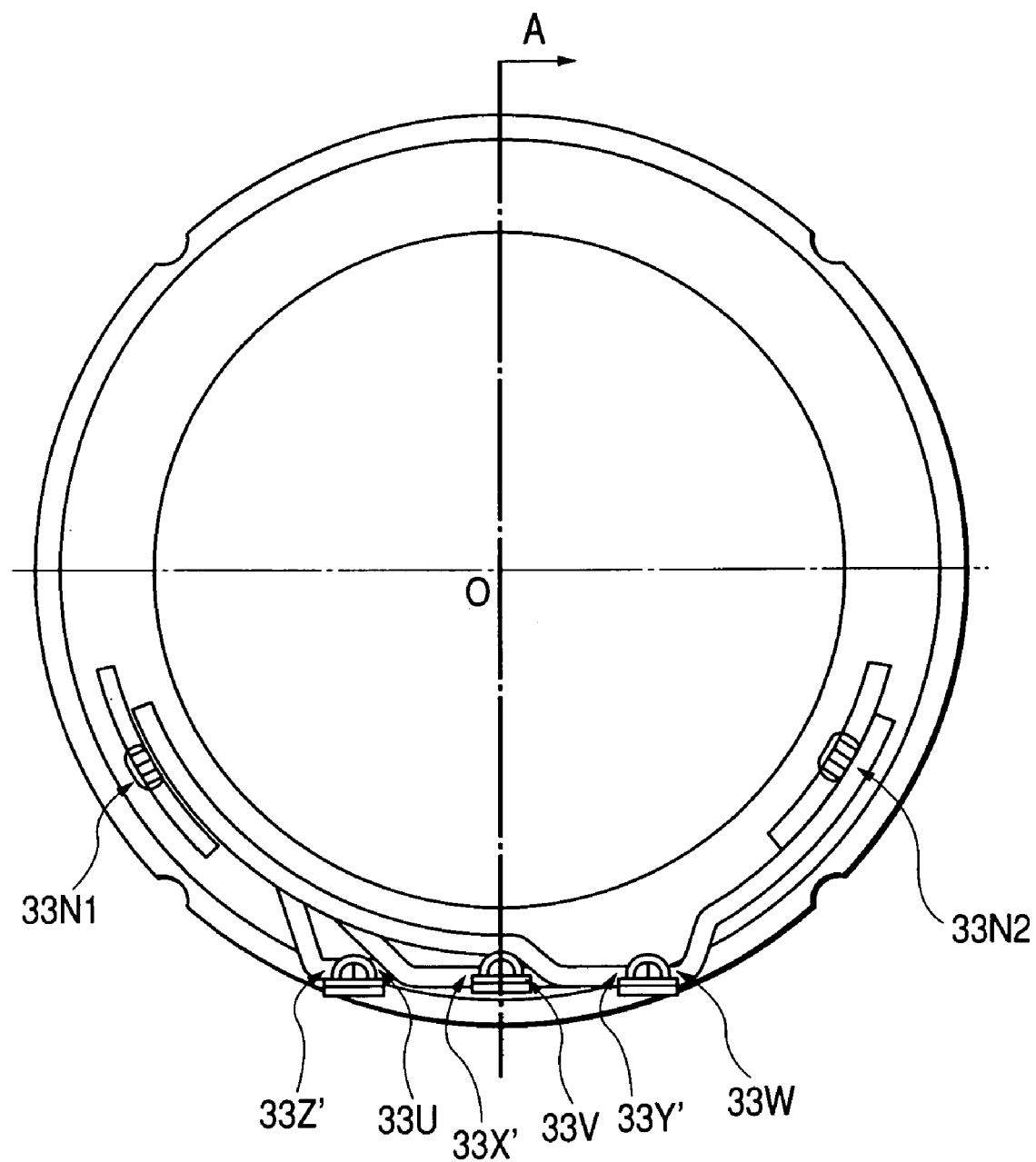
FIG. 19 is a rear elevation of the stator coil as illustrated in FIG. 17.

FIGS. 17 to 19 show a comparative example of a stator coil made of a three-phase star-connection winding consisting of pairs of phase windings connected in parallel, one pair for each phase. Comparison between FIGS. 17 to 19 and FIGS. 12 to 14 shows that use of the fractional pitch winding as the stator coil 31 in the first and third embodiments results in a decreased total size and simplified arrangements of the terminal leads 33U, 33V, 33W, 33U', 33V', and 33W' as compared with a full-pitch winding, as illustrated in FIGS. 17 to 19.

Figure 20:
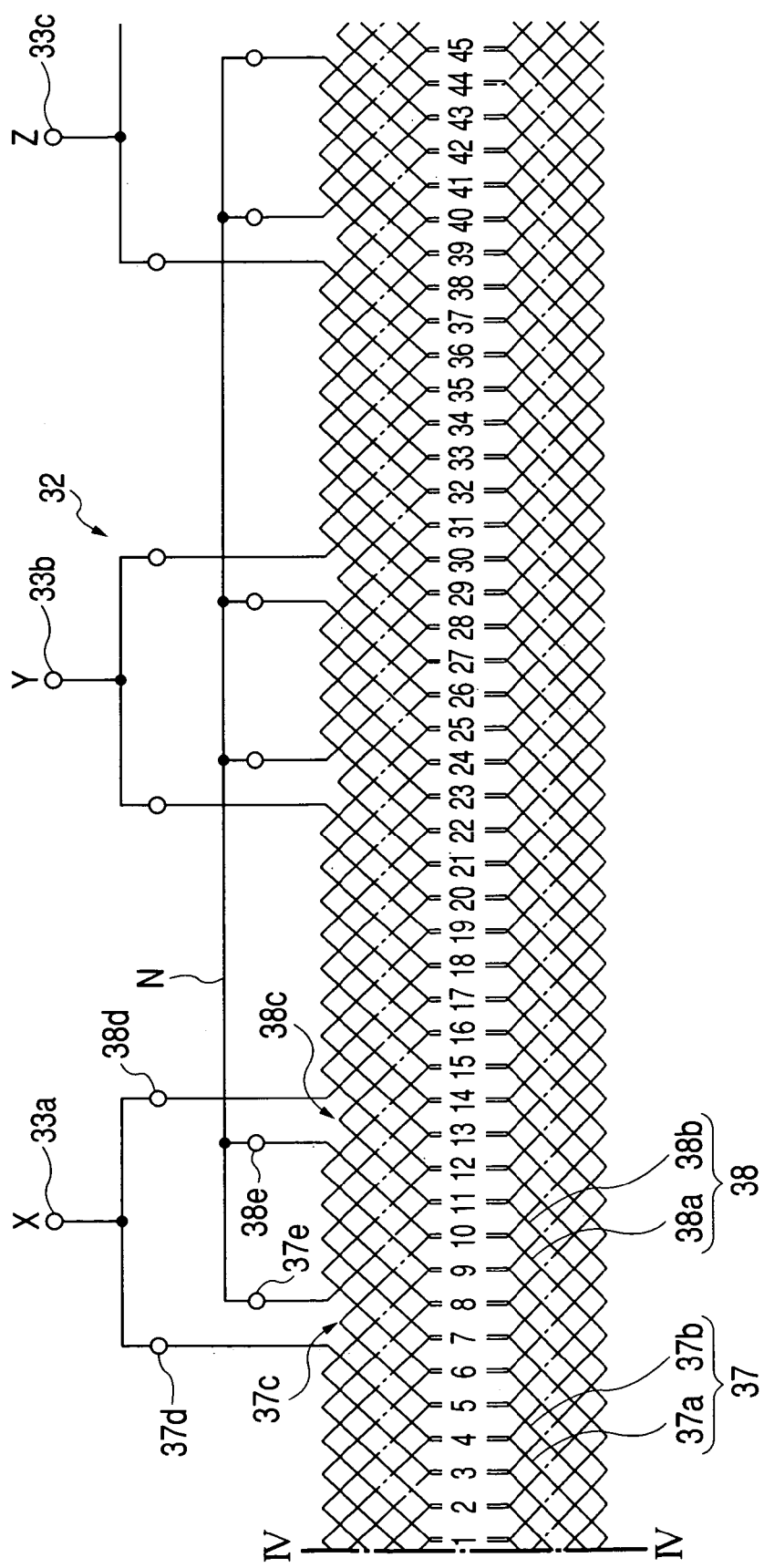
FIG. 20 is a development of a prior art stator coil.

FIG. 20 is a development which shows a stator coil, as taught in U.S. Pat. No. 6,417,592 B2 (corresponding to Japanese Patent First Publication No. 2001-169490), assigned to the same assignee as that of this application. As compared with the shown structure, it is found that the terminal leads 33U, 33V, 33W, 33U', 33V', and 33W' in the above embodiments are greatly reduced in size and simplified in arrangement.

The three conductor segment sets 330 may alternatively be arrayed in the radius direction within each of the slots 350 of the stator core 32 to make a three times turn stator coil. In this case, the conductor segment sets 330 located at innermost layer positions in the slots 350 are joined, like the first and second phase windings 10 and 11 connected in parallel in the first embodiment, to form a phase winding X. The conductor segment sets 330 located at outermost layer positions in the slots 350 are joined, like the first and second phase windings 10 and 11 connected in parallel in the first embodiment, to form a phase winding Y. The conductor segment sets 330 located at middle layer positions in the slots 350 are joined, like the first and second phase windings 10 and 11 connected in parallel in the third embodiment, to form a phase winding Z. The phase windings X, Y, and Z are joined in series to complete the three times turn stator coil.

Figure 21:
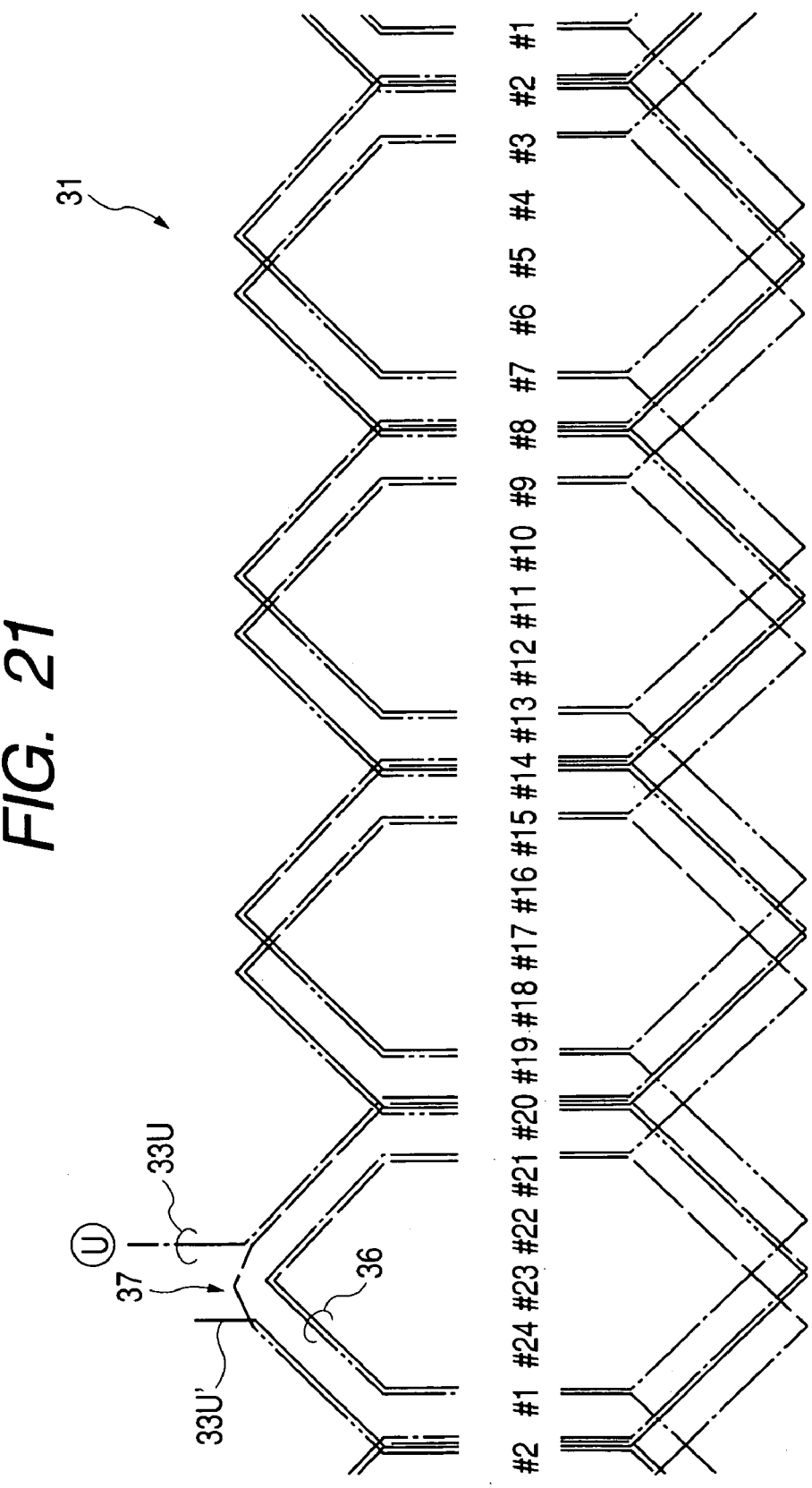
FIG. 21 is a development which shows a U-phase coil of a stator coil according to the fourth embodiment of the invention.
Figure 22:
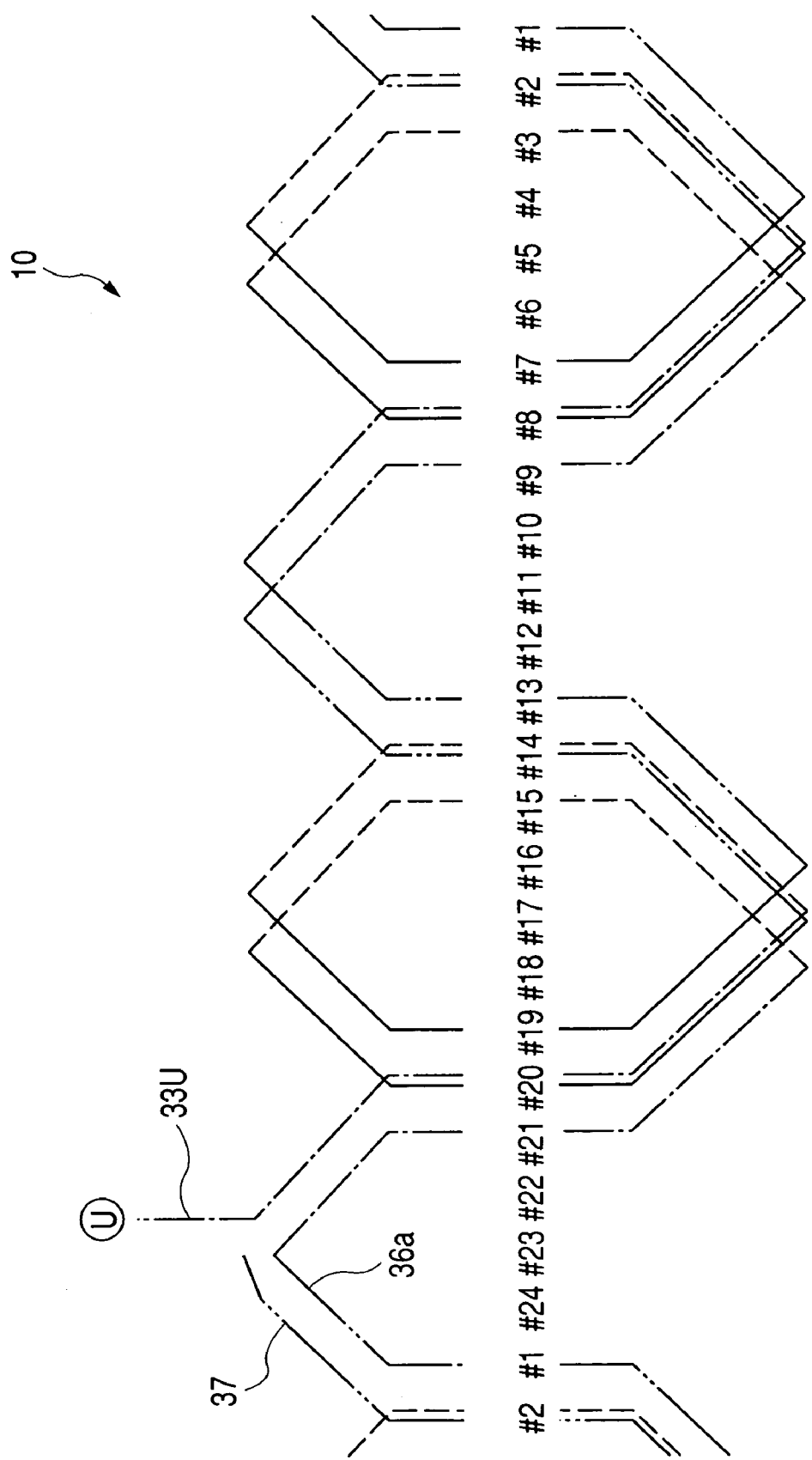
FIG. 22 is a development which shows a first phase winding of the U-phase coil as illustrated in FIG. 21.
Figure 23:
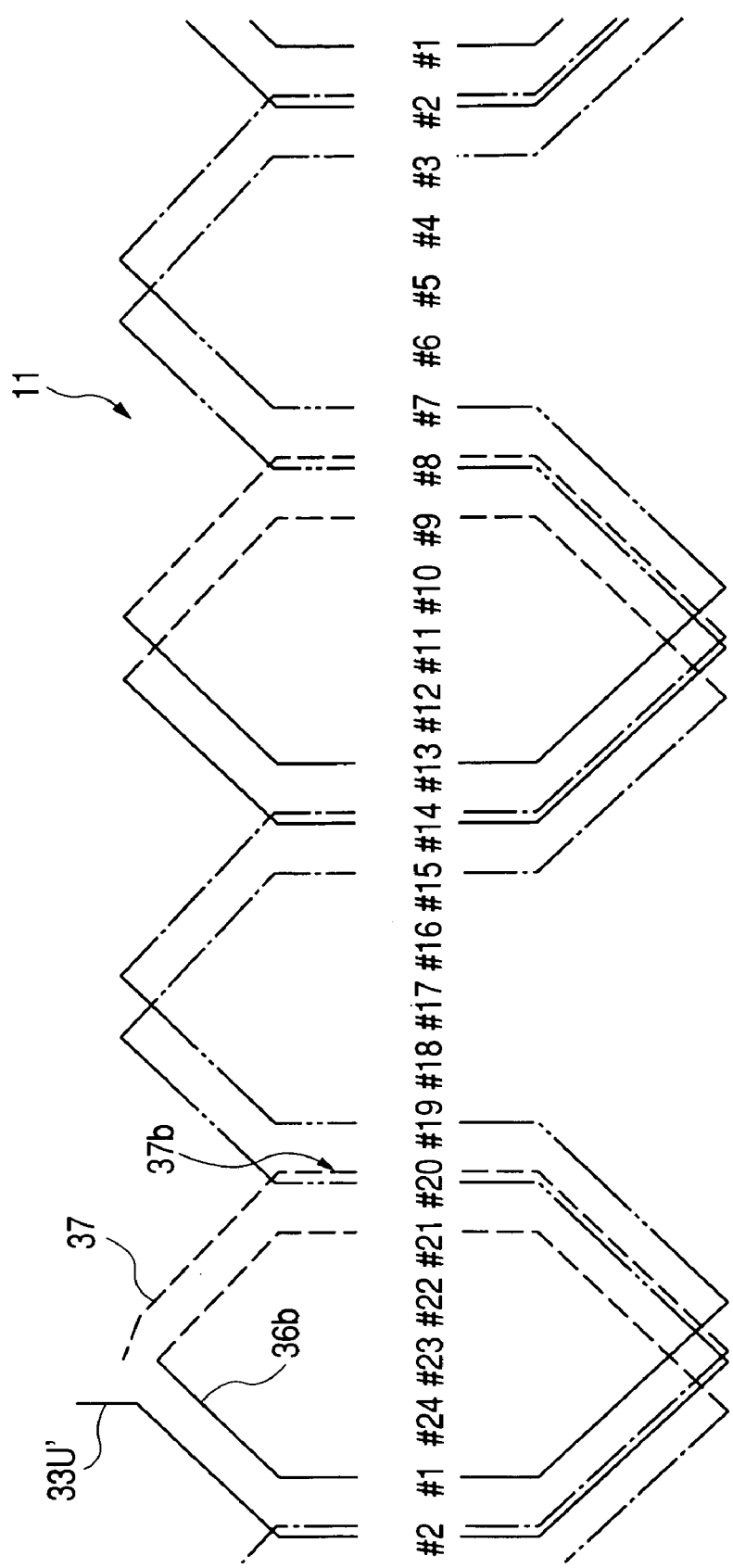
FIG. 23 is a development which shows a second phase winding of the U-phase coil as illustrated in FIG. 21.
Figure 24:
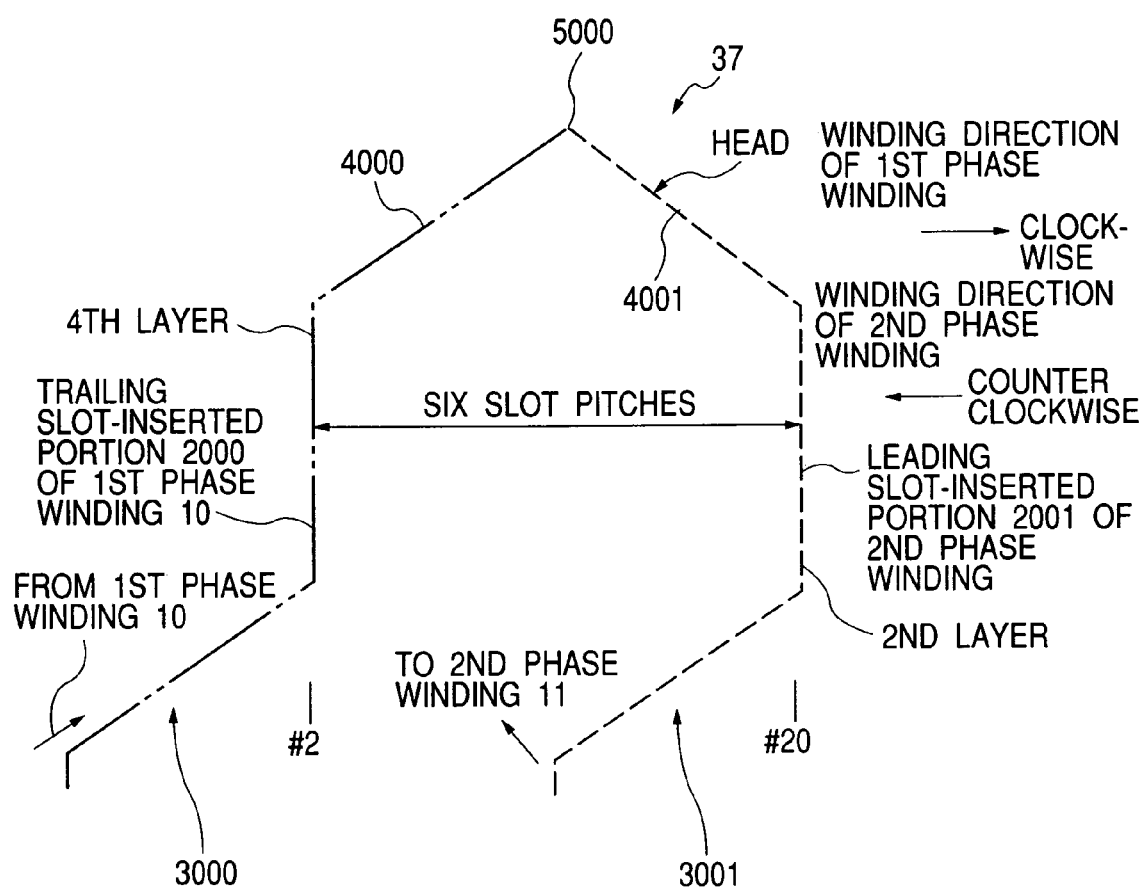
FIG. 24 is a development which shows a bridging conductor segment as illustrated in FIG. 21.

FIGS. 21 to 24 show the stator coil 31 according to the fourth embodiment of the invention. FIG. 21 is a development showing a U-phase coil. FIG. 22 is a development showing the first phase winding 10 of the U-phase coil of FIG. 21. FIG. 23 is a development showing the second phase winding of the U-phase coil of FIG. 21. FIG. 24 is a development showing a bridging conductor segment 37. The V-phase and W-phase coils are, as already described, identical in structure with the U-phase coil, and explanation thereof in detail will be omitted here.

The stator coil 31 of this embodiment is different from that of the first embodiment only in that the U-phase coil is made up of the first and second phase windings 10 and 11 connected in series.

The slot-inserted portion disposed at the first layer position within each of the slots 350 of the stator core 32, the V-shaped head portion, and the joint coil end of the conductor segments 33 are, like the first embodiment, indicated by an alternate long and short dash line. The slot-inserted portion disposed at the second layer position within each of the slots 350, the head portion, and the joint coil end extending therefrom are indicated by a dashed line. The slot-inserted portion disposed at the third layer position within each of the slots 350, the head portion, and the joint coil end extending therefrom are indicated by a solid line. The slot-inserted portion disposed at the fourth layer position within each of the slots 350, the head portion, and the joint coil end extending therefrom are indicated by an alternate long and two short dashes line.

The stator coil 31 is of a four-pole structure, but the number of poles may be more than four. The conductor segment sets 330 disposed within each of the slots 350 may be increased for increasing an output voltage.

The anomaly conductor segment sets 36 are, like the first embodiment, each made up of the anomaly conductor segment 36a of the first phase winding 10, as illustrated in FIG. 22, and the anomaly conductor segment 36b of the second phase winding 11, as illustrated in FIG. 23.

A series-connection of the first and second phase windings 10 and 11 is accomplished by joining the terminal lead 33U' leading to a trailing one of the slot-inserted portions (i.e., the fourth layer conductor portion) of the first phase winding 10 and the terminal lead 33U' leading to a leading one of the slot-inserted portions (i.e., the second layer conductor portion) of the second phase winding 11. Note that the trailing slot-inserted portion, as referred to herein, is one of the slot-inserted portions of the first phase winding 10 or the second phase winding 11 that is the farthest from the terminal lead 33U, 33V, or 33W, and the leading slot-inserted portion is one of the slot-inserted portions of the first phase winding 10 or the second phase winding 11 that is the closest to the terminal lead 33U, 33V, or 33W.

Specifically, the series-connection of the first and second phase windings 10 and 11 is accomplished by disposing two slot-inserted portions 2000 and 2001 of the U-shaped bridging conductor segment 37, as clearly shown in FIG. 24, in the fourth layer position within the No. 2 slot and the second layer position within the No. 20 slot, respectively. The first phase winding 10 extends in a circumferential clockwise direction of the stator coil 31, while the second phase winding 11 extends in a circumferential counterclockwise direction of the stator coil 31, therefore, a joint coil end 3001 of the bridging conductor segment 37, unlike the wave winding segments 34, is bent to the circumferential counterclockwise direction.

The structure of the bridging conductor segment 37 will be described in more detail with reference to FIG. 24.

The bridging conductor segment 37 consists of legs or the slot-inserted portions 2000 and 2001, the first joint coil end 3000 leading to the slot-inserted portion 2000, the tip 5000, the slant head portions 4000 and 4001 continuing from the tip 5000, and the second joint coil end 3001 leading to the slot-inserted portion 2001. The slot-inserted portion 2000, the first joint coil end 3000, and the slant head portion 4000 extend from the fourth layer position within the slot 350. The slot-inserted portion 2001, the second joint coil end 3001, and the slant head portion 4001 extend from the second layer position within the slot 350.

Usually, the joint coil ends (i.e., the end portions 331f, 331g, 332f, and 332g, as illustrated in FIG. 2) of the conductor segments 33 are spread or bent in production processes of the stator coil 31 by rotating adjacent two of four rings with slots into which the conductor segments 33 are inserted in opposite circumferential directions. In the fourth embodiment, the joint coil ends leading to the slot-inserted portions disposed in the second and fourth layer positions within the slot 350 are bent in the circumferential counterclockwise direction of the stator coil 31, thus permitting the first and second joint coil ends 3000 and 3001 to be bent in the same direction simultaneously. This bending process may be implemented in any of several manners as known in the art. The bridging conductor segment 37 may alternatively formed by bending end portions of I-shaped conductors and then welding two of the end portions.

In the manner as described above, the first and second phase windings 10 and 11 are joined in series to form the stator coil 31, thus permitting a two times higher voltage to be applied to or outputted from the ac machine 1.

The three conductor segment sets 330 may alternatively be arrayed in the radius direction within each of the slots 350 of the stator core 32 to make a three times turn stator coil. In this case, the conductor segment sets 330 located at innermost layer positions in the slots 350 are joined, like the first and second phase windings 10 and 11 connected in parallel in the first embodiment, to form a phase winding X. The conductor segment sets 330 located at outermost layer positions in the slots 350 are joined, like the first and second phase windings 10 and 11 connected in parallel in the first embodiment, to form a phase winding Y. The conductor segment sets 330 located at middle layer positions in the slots 350 are joined, like the first and second phase windings 10 and 11 connected in parallel in the third embodiment, to form a phase winding Z. The phase windings X, Y, and Z are joined in series to complete the three times turn stator coil. Alternatively, a total of the six phase windings 10 and 11 may be joined in series in the manner as described in the third embodiment to form a six times turn stator coil.

Figure 25:
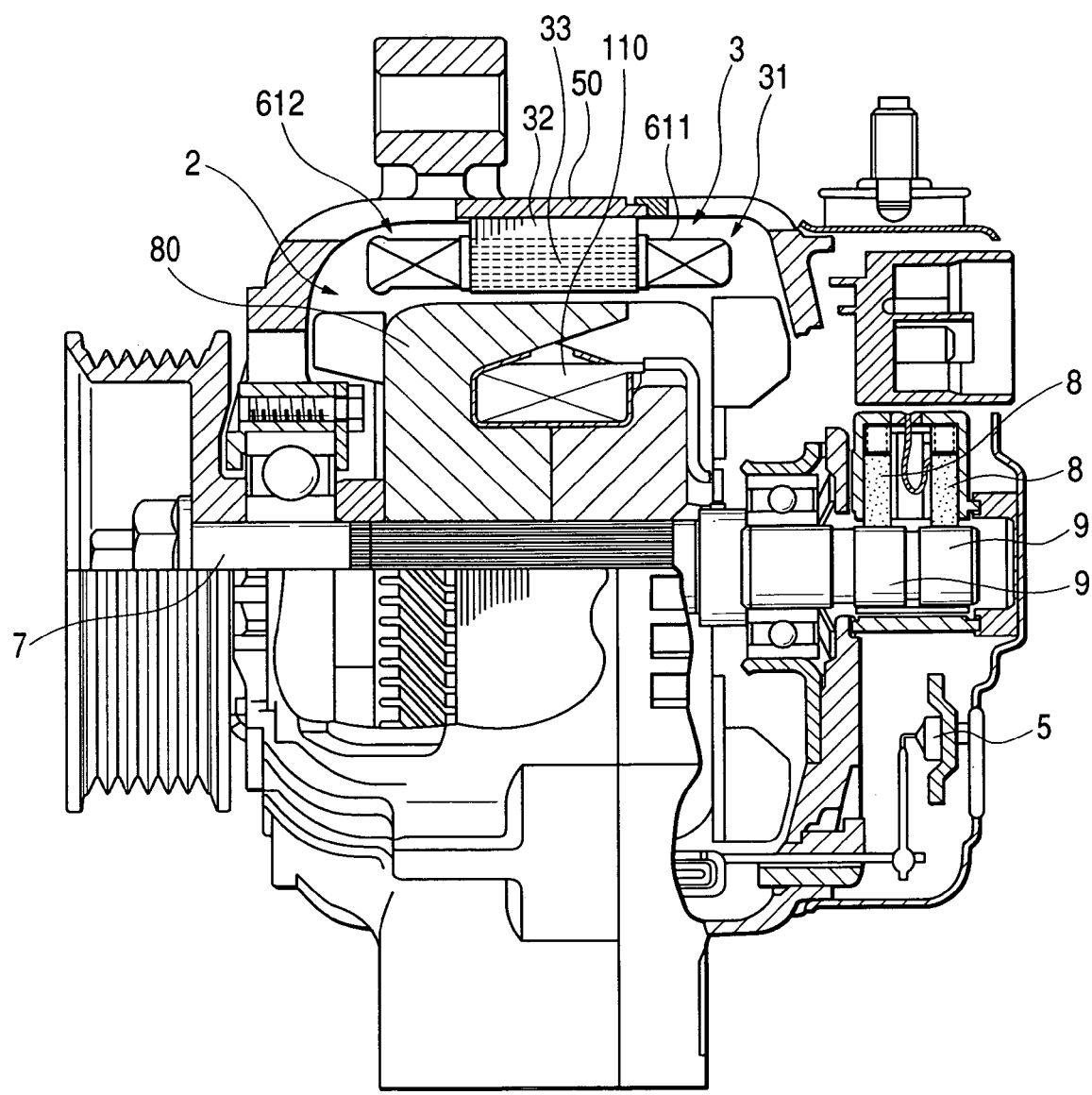
FIG. 25 is a partially longitudinal sectional view which shows an ac machine equipped with a stator coil according to the fifth embodiment of the invention.

FIG. 25 shows the ac machine 1 for use in automotive vehicles according to the fifth embodiment of the invention.

The ac machine 1 consists essentially of the stator 3, the rotor 2, the housing 50, the rotary shaft 7, the rectifier 5, the brushes 8, and the slip rings 9.

The stator 3 is retained by an inner peripheral wall of the housing 50. Specifically, the housing 50 is made up of two separate parts. The retention of the stator 3 is achieved by joining the separate parts together, as clearly shown in the drawing. The rotary shaft 7 has installed thereon the rotor 2 and is rotatably supported by end walls of the housing 50 using a pair of bearings. The rotary shaft 7 is mechanically connected to the engine through a pulley (not shown).

The rotor 2 is made up of a rundel pole type pole core 80 with claw-like magnetic poles and the field coil 110 installed on the pole core 80. The field coil 110 is supplied with power from the brushes 8 through the slip rings 9.

The stator 3 is made up of the stator core 32 and the stator coil 31 implemented by a three-phase star-connected winding. The stator core 32, as clearly shown in FIG. 26, has formed thereon teeth T which define equi-angular spaced slots 350. The stator coil 31 is made up of sequentially joined U-shaped conductor segments 33 inserted into the slots 350. The insulators 340 work to insulate the conductor segments 33 from the stator core 32. Each of the conductor segments 33 consists of a pair of legs or slot-inserted portions 633, the V-shaped coil end 611 extending from the slot-inserted portions 633 outside an end of the stator core 32, a pair of joint coil ends 612 extending from the slot-inserted portions 33 outside the other end of the stator core 32.

The stator core 32 has formed therein the slots 350, two (q=2) for each pole in each phase. A total of p·q·m(p=the number of poles, m=the number of phases) slots 350 are arrayed at regular intervals in the circumferential direction of the stator core 32.

The stator coil 31 is made up of the conductor segments 33 which are partially inserted into the slots 350 from the right to left, as viewed in FIG. 27. Each end of the conductor segments 33 is welded, as denoted at 34, to one of the ends of another conductor segment 33 to form three phase coils (i.e., the U-phase, V-phase, and W-phase coils) which are coupled together to form the so-called three-phase star-connected winding. The U-phase, V-phase, and W-phase coils may alternatively be joined together through the so-called delta connection.

Within each of the slots 350, six of the slot-inserted portions 633 are arrayed in line or aligned in the radius direction of the stator core 32. In the following discussion, the six slot-inserted portions 633 disposed within each of the slots 350 will also be referred to as a first, a second, a third, a fourth, a fifth, and a sixth layer conductor portion, respectively, from inside to outside of the stator core 32. Specifically, the innermost one of the slot-inserted portions 633 disposed in each of the slots 350 forms the first layer conductor portion, the second innermost one forms the second layer conductor portion, the third innermost one forms the third layer conductor portion, the outermost one forms the sixth layer conductor portion, the second outermost one forms the fifth layer conductor portion, and the third outermost one forms the fourth layer conductor portion. The locations of the first to sixth layers in each of the slots 350 will also be referred to as first, second, third, fourth, fifth, and sixth layer positions below. The first to sixth layer conductor portions will also be designated below at reference numerals 731, 732, 733, 734, 735, and 736, respectively. The two slot-inserted portions 633 of each of the conductor segments 33 are inserted into two of the slots 350 spaced from one another at a given interval (e.g., an electrical angle $\pi$), and placed in different layer positions in the slots 350.

Numeral 300 in FIG. 27 indicates a wave winding segment (i.e., the large-sized conductor segment 331) with the slot-inserted portions 633 placed at the first and sixth layer positions. Numeral 301 indicates a lap winding segment (i.e., the small-sized conductor segment 332) with the slot-inserted portions 633 placed at the second and third layer positions. Numeral 302 indicates a lap winding segment (i.e., the small-sized conductor segment 332) with the slot-inserted portions 633 placed at the fourth and fifth layer positions. The wave winding segment 300 extends over the lap winding segments 301 and 302.

The term "wave winding segment", as used herein, represents the conductor segment 33 having the joint coil ends 612 extending in opposite circumferential directions of the stator core 32. The term "lap winding segment" represents the conductor segment 33 having the joint coil ends 612 extending in approaching circumferential direction of the stator core 32.

The stator coil 31 is, as described above, made up of the U-phase, V-phase, and W-phase coils which are star-connected. The U-phase, V-phase, and W-phase coils are identical in structure with each other, and reference will be made only to the U-phase coil below.

Figure 28:
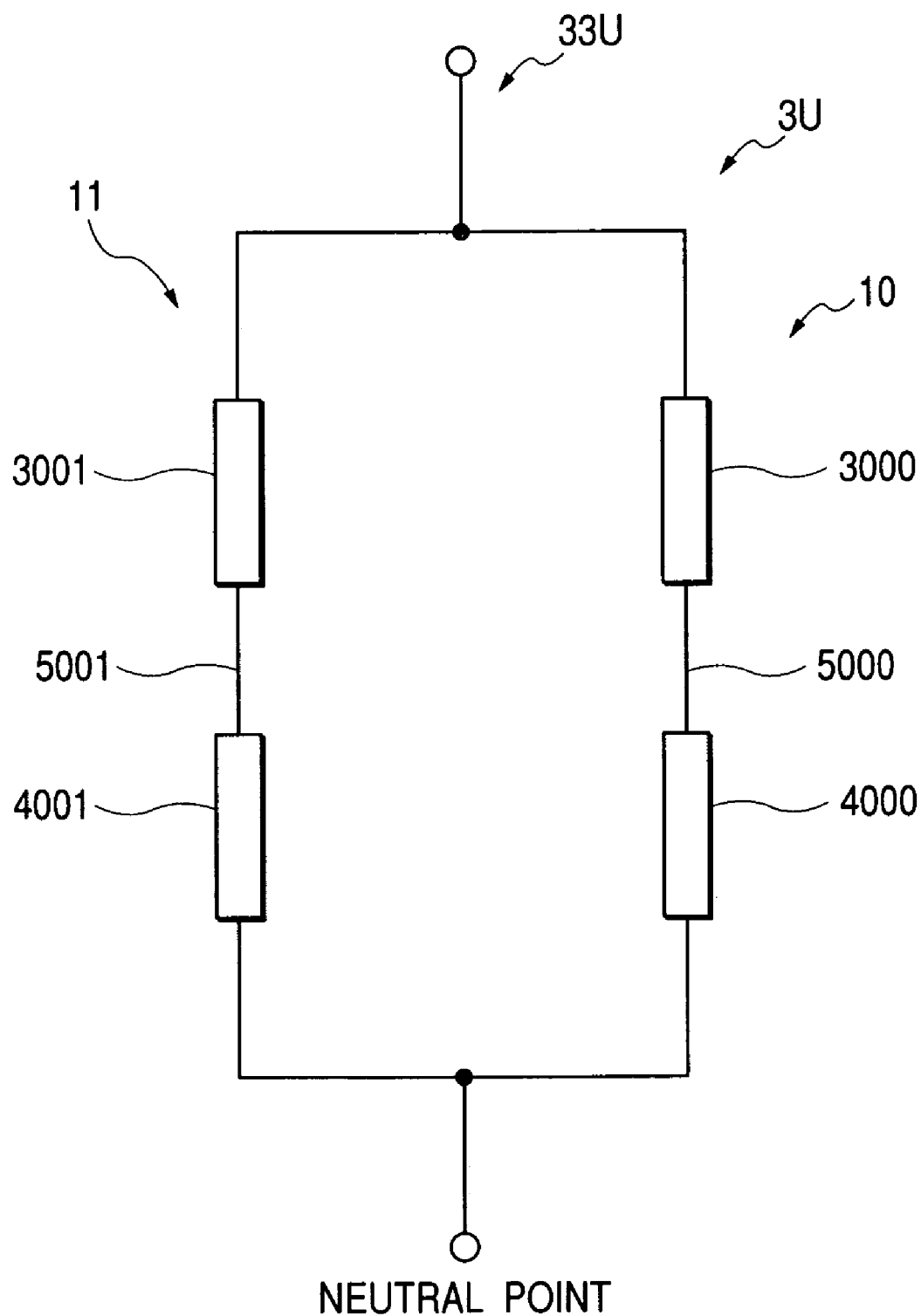
FIG. 28 is a diagram which shows a U-phase coil of the stator coil of FIG. 25.

FIG. 28 shows a circuit diagram of the U-phase coil 3U.

The U-phase coil 3U is made up of the first phase winding 10 and the second phase winding 11 which are joined in parallel. The first phase winding 10 consists of the first turn coil 3000, the second turn coil 4000, and the anomaly conductor segment 5000 connecting them in series. Similarly, the second phase winding 11 consists of the first turn coil 3001, the second turn coil 4001, and the anomaly conductor segment 5001 connecting them in series. The first turn coil 3001 and the second turn coil 4001 may be interchanged with one another. The first turn coil 3000 and the second turn coil 4000 may also be interchanged with one another.

Figure 29:
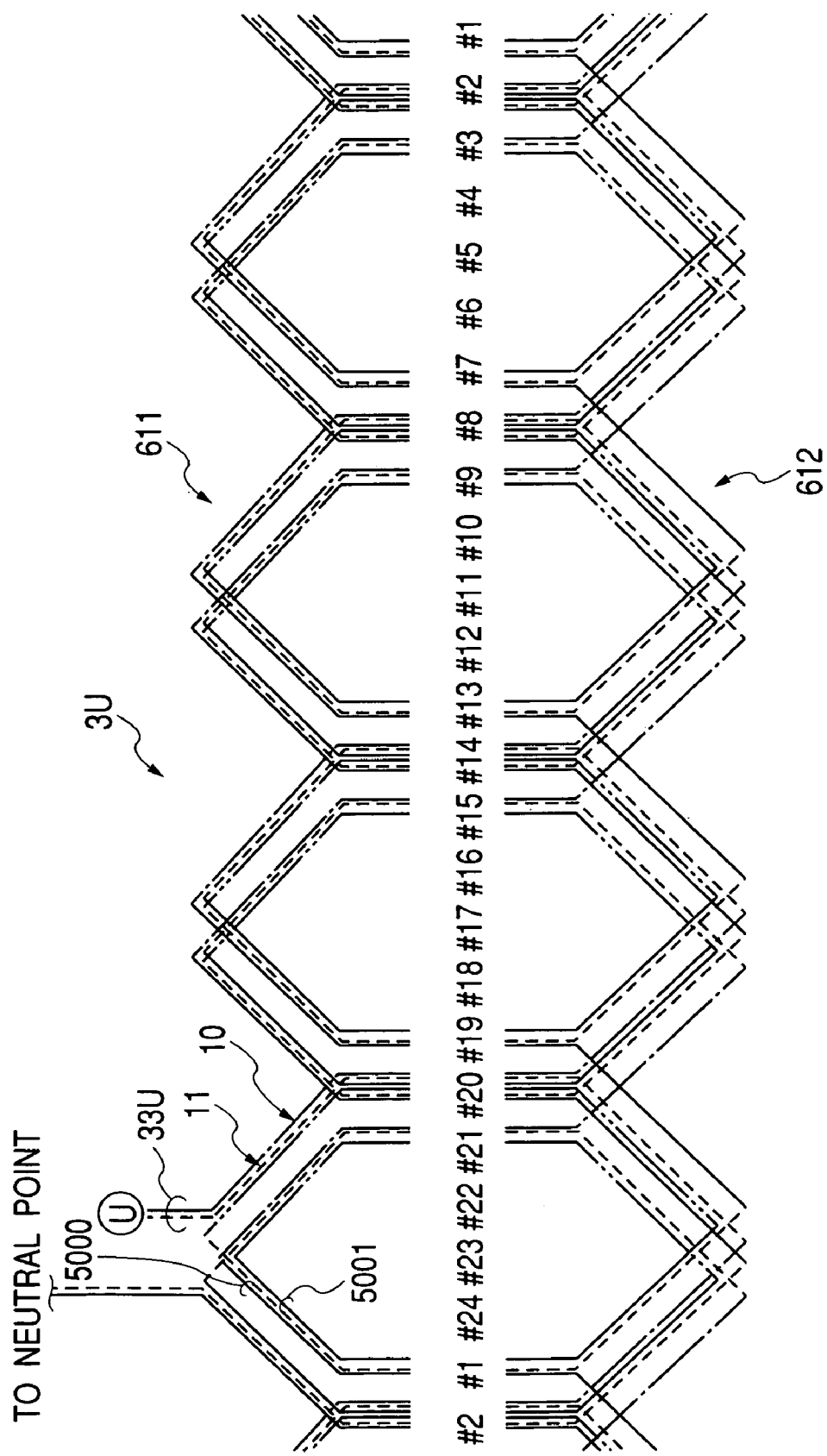
FIG. 29 is a development which shows a U-phase coil of the stator coil as illustrated in FIG. 25.
Figure 30:
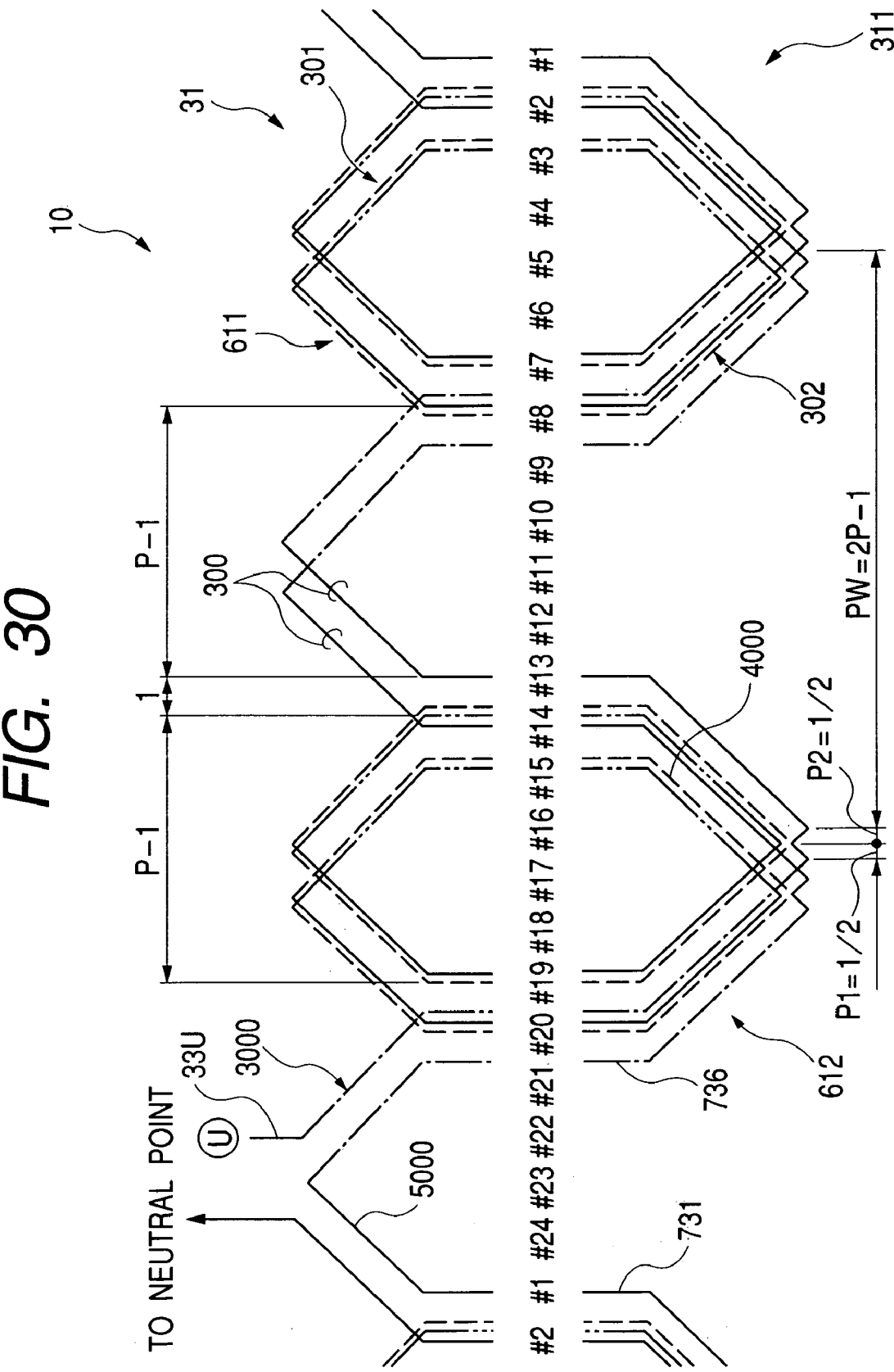
FIG. 30 is a development illustrating a first phase winding of the U-phase coil of FIG. 29.
Figure 31:
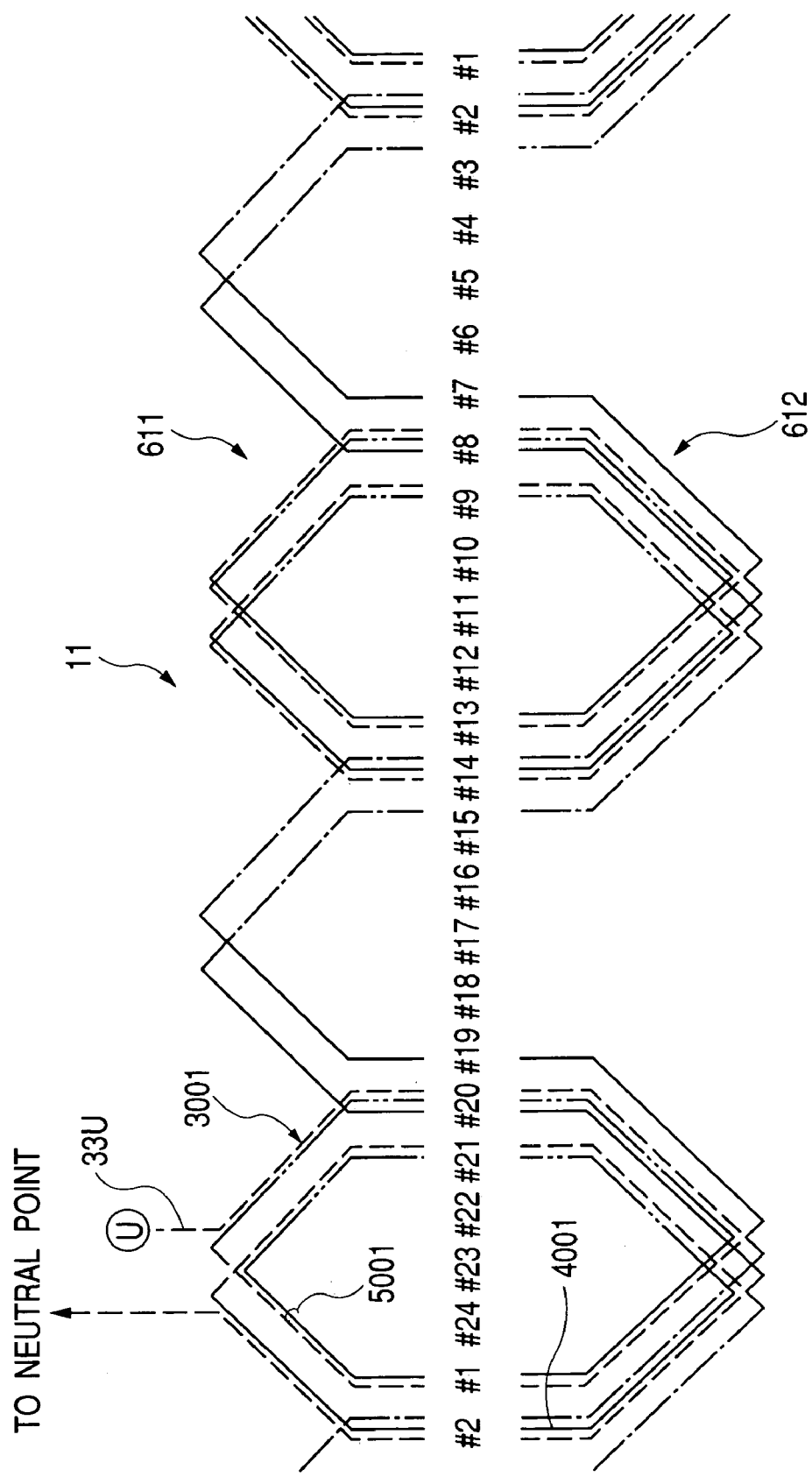
FIG. 31 is a development illustrating a second phase winding of the U-phase coil of FIG. 29.

FIG. 29 is a development illustrating the U-phase coil 3U. FIG. 30 is a development illustrating the first phase winding 10. FIG. 31 is a development illustrating the second phase winding 11.

An alternate long and short dash line represents one of the slot-inserted portions 633 of the conductor segment 33 disposed at the first layer position within each of the slots 350, the V-shaped coil end 311, and the joint coil end 312 extending therefrom. A dashed line on the right side of the alternate long and short dash line represents one of the slot-inserted portions 633 of the conductor segment 33 disposed at the second layer position within each of the slots 350, the V-shaped coil end 311, and the joint coil end 312 extending therefrom. A solid line on the left side of the dashed line represents one of the slot-inserted portions 633 of the conductor segment 33 disposed at the third layer position within each of the slots 350, the V-shaped coil end 311, and the joint coil end 312 extending therefrom. An alternate long and two short dashes line on the left side of the solid line represents one of the slot-inserted portions 633 of the conductor segment 33 disposed at the fourth layer position within each of the slots 350, the V-shaped coil end 311, and the joint coil end 312 extending therefrom. A dashed line on the left side of the alternate long and two dashes line represents one of the slot-inserted portions 633 of the conductor segment 33 disposed at the fifth layer position within each of the slots 350, the V-shaped coil end 311, and the joint coil end 312 extending therefrom. A solid line on the leftmost side within each of the slots 350 represents one of the slot-inserted portions 633 of the conductor segment 33 disposed at the sixth layer position within each of the slots 350, the V-shaped coil end 311, and the joint coil end 312 extending therefrom. For the brevity of illustration, FIGS. 29 to 31 omit halves of the conductor segments 33 and show a four-pole structure. The number of poles may be another value.

The first phase winding 10 is, as described above, made up of the first turn coil 3000, the second turn coil 4000, and the anomaly conductor segment 5000 connecting them in series.

The first turn coil 3000 is formed by joining, in sequence, the wave winding segments 300 with the first and sixth layer conductor portions 731 and 736, the first lap winding segments 301 with the second and third layer conductor portions 732 and 733, and the second lap winding segments 302 with the fourth and fifth layer conductor portions 734 and 735. Specifically, the slot-inserted portions 633 of the conductor segments 33 are joined, in sequence, from the first layer conductor portion 731, to the second layer conductor portion 732, to the third layer conductor portion 733, to the fourth layer conductor portion 734, to the fifth layer conductor portion 735, to the sixth layer conductor portion 736, and to the first layer conductor portion 731.

If the pole pitch is set to P slot pitches (P=6 in this embodiment), that is, the two slots 350 are provided for each pole in each phase, a weld-to-weld pitch PW of the joint coil ends 612 of the wave winding segments 300 is identical with (2P−1) slot pitches. A weld-to-weld pitch P1 of the first lap winding segments 301 is identical with half the slot pitch (½). Similarly, a weld-to-weld pitch P2 of the second lap winding segments 302 is identical with half the slot pitch (½). A weld-to-weld pitch of a combination of the wave winding segment 300 and the first and second lap winding segments 301 and 302 is, therefore, identical with two pole pitch (2P). An interval between the slot-inserted portions 633 of each of the wave winding segments 300 and the first and second lap winding segments 301 and 302, that is, a leg-to-leg pitch is identical with P−1 slot pitches. Specifically, the V-shaped coil ends 611 and the joint coil ends 612 are arrayed at fractional pitches, thus permitting lengths thereof in the circumferential direction of the stator coil 31 to be decreased.

The first turn coil 3000 of the first phase winding 10 extends from the U-phase terminal lead 33U, to half of the wave winding segment 300 (i.e., the first layer conductor portion 731), to the first lap winding segment 301 (i.e., the second and third layer conductor portions 732 and 733), to the second lap winding segment 302 (i.e., the fourth and fifth layer conductor portions 734 and 735), to the wave winding segment 300 (i.e., the sixth and first layer conductor portions 736 and 731), to the first lap winding segment 301 (i.e., the second and third layer conductor portions 732 and 733), and to the second lap winding segment 302 (i.e., the fourth and fifth layer conductor portions 734 and 735) and leads to the second turn coil 4000 through the anomaly conductor segment 5000 (i.e., the sixth and first layer conductor portions 736 and 731).

The anomaly conductor segment 5000 with the slot-inserted portions disposed in the sixth and first layer position of the slots 350 has the leg-to-leg pitch (i.e., back pitch) shorter than that of the wave winding segments 300 by at least one slot pitch. One of the slot-inserted portions 633 of the anomaly conductor segment 5000 forms a trailing one of the slot-inserted portions 633 of the first turn coil 3000, while the other slot-inserted portion 633 forms a leading one of the slot-inserted portions 633 of the second turn coil 4000.

The second turn coil 4000 is different from the first turn coil 3000 in that it is shifted to the left by one slot pitch. The configuration and winding direction are identical. The slot-inserted portion 633 of the anomaly conductor segment 5000 forming a leading one of the slot-inserted portions 633 of the second turn coil 4000 is, however, disposed in the first layer position. Following this, the second turn coil 4000 extends to the second and third layer conductor portions 732 and 733 of the first lap winding segment 301 and to the fourth and fifth layer conductor portions 734 and 735 of the second lap winding segment 302 and leads to the neutral point 33N through the sixth layer conductor portion 736 of the wave winding segment 300.

The second phase winding 11 is, as described above, made up of the first turn coil 3001, the second turn coil 4001, and the anomaly conductor segment 5001 connecting them in series.

The first turn coil 3001 is, as shown in FIG. 31, formed by joining, in sequence, the wave winding segments 300 with the first and sixth layer conductor portions 731 and 736, the first lap winding segments 301 with the second and third layer conductor portions 732 and 733, and the second lap winding segments 302 with the fourth and fifth layer conductor portions 734 and 735. Specifically, the slot-inserted portions 633 of the conductor segments 33 are joined, in sequence, from the second layer conductor portion 732, to the first layer conductor portion 731, to the sixth layer conductor portion 736, to the fifth layer conductor portion 735, to the fourth layer conductor portion 734, to the third layer conductor portion 733, and to the second layer conductor portion 732.

If the pole pitch is set to P slot pitches (P=6 in this embodiment), that is, the two slots 350 are provided for each pole in each phase, the weld-to-weld pitch PW of the joint coil ends 612 of the wave winding segments 300 is identical with (2P−1) slot pitches. The weld-to-weld pitch P1 of the first lap winding segments 301 is identical with half the slot pitch (½). Similarly, the weld-to-weld pitch P2 of the second lap winding segments 302 is identical with half the slot pitch (½). The weld-to-weld pitch of a combination of the wave winding segment 300 and the first and second lap winding segments 301 and 302 is, therefore, identical with two pole pitch (2P). An interval between the slot-inserted portions 633 of each of the wave winding segments 300 and the first and second lap winding segments 301 and 302, that is, a leg-to-leg pitch is identical with P−1 slot pitches. Specifically, the V-shaped coil ends 611 and the joint coil ends 612 are arrayed at fractional pitches, thus permitting lengths thereof in the circumferential direction of the stator coil 31 to be decreased.

The first turn coil 3001 of the second phase winding 11 extends from the U-phase terminal lead 33U, to half of the first lap winding segment 301 (i.e., the second layer conductor portion 732), to the wave winding segment 300 (i.e., the first and sixth layer conductor portions 731 and 736), to the second lap winding segment 302 (i.e., the fifth and fourth layer conductor portions 735 and 734), to the first lap winding segment 301 (i.e., the third and second layer conductor portions 733 and 732), to the second lap winding segment 302 (i.e., the third and second layer conductor portions 733 and 732), and to the wave winding segment 300 (i.e., the first and sixth layer conductor portions 731 and 736) and leads to the second turn coil 4001 through the anomaly conductor segment 5001 (i.e., the third and fourth layer conductor portions 733 and 734).

The anomaly conductor segment 5001 with the slot-inserted portions disposed in the third and fourth layer position of the slots 350 has the leg-to-leg pitch (i.e., back pitch) shorter than that of the first and second lap winding segments 301 and 302 by at least one slot pitch. One of the slot-inserted portions 633 of the anomaly conductor segment 5001 forms a trailing one of the slot-inserted portions 633 of the first turn coil 3001, while the other slot-inserted portion 633 forms a leading one of the slot-inserted portions 633 of the second turn coil 4001.

The second turn coil 4001 is different from the first turn coil 3001 in that it is shifted to the left by one slot pitch. The configuration and winding direction are identical. The slot-inserted portion 633 of the anomaly conductor segment 5001 forming a leading one of the slot-inserted portions 633 of the second turn coil 4001 is, however, disposed in the fourth layer position. Following this, the second turn coil 4001 extends to the third and second layer conductor portions 733 and 732 of the first lap winding segment 301 and to the first and sixth layer conductor portions 731 and 736 of the wave winding segment 300 and leads to the neutral point 33N through the fifth layer conductor portion 735 of the second lap winding segment 302.

Figure 32:
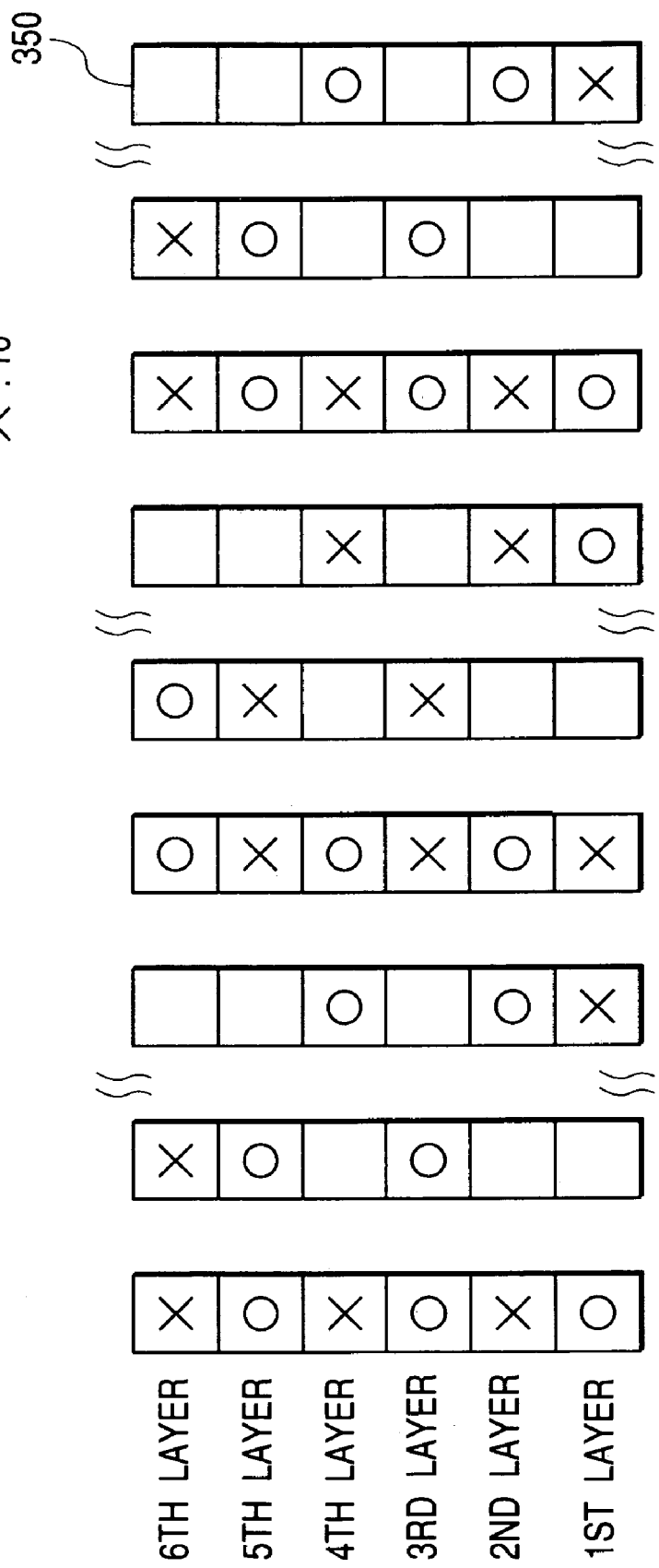
FIG. 32 is a view which shows locations of legs of conductor segments of the U-phase coil of FIG. 29 disposed in slots.

FIG. 32 shows locations of the slot-inserted portions 633 of the first and second phase windings 10 and 11 within the slots 350.

The slot-inserted portions 633 of the U-phase coil 3U are disposed within the slots 350 of numbers #2, #20, and #14. Some of the layer positions of the left slots 350 of numbers #21 and #15 are illustrated as being empty, however, the slot-inserted portions 633 of the W-phase coil are, in practice, disposed therein. Similarly, the slot-inserted portions 633 of the W-phase coil are disposed in some of the layer positions of the slots 350 illustrated as being empty.

The anomaly conductor segments 5000 and 5001 may alternatively have the back pitch longer than those of the wave winding segments 300 and the first and second lap winding segments 301 and 302 by one slot pitch.

Figure 33:
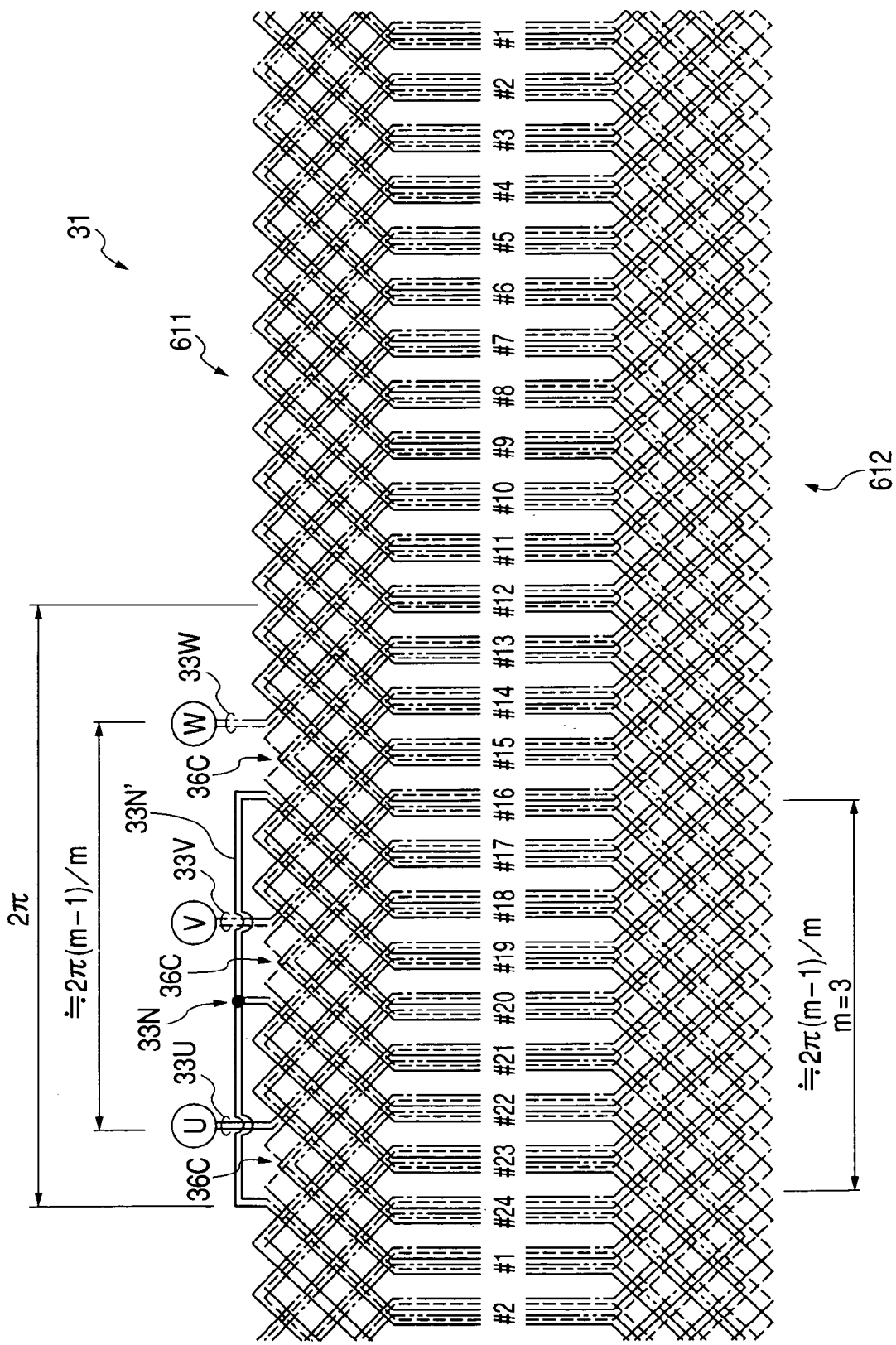
FIG. 33 is a development which shows a stator coil of the fifth embodiment.

FIG. 33 is a development illustrating the stator coil 31 formed by a star-connection of the U-phase coil 3U, the V-phase coil, and the W-phase coil.

The U-phase coil, the V-phase coil, and the W-phase coils have pairs of terminal leads 33U, 33V, and 33W, respectively. The terminal leads 33U lead to adjacent two of the slot-inserted portions 633 disposed within one of the slots 350. The same is true for the terminal leads 33V and 33W.

The U-phase, the V-phase, and the W-phase coils are connected at the neutral point 33N through neutral joint leads 33N'. 36C denotes either of the anomaly conductor segments 5000 and 5001. The neutral terminal leads 33N' are provided, one pair for each phase. The neutral terminal leads 33N' of each pair lead to adjacent two of the slot-inserted portions 633 disposed within one of the slots 350.

Specifically, as shown in FIG. 33, the terminal leads 33U connecting with ends of the first and second phase windings 10 and 11 of the U-phase coil extend from adjacent two of the slot-inserted portions 633 (i.e., the first and second layer conductor portions 731 and 732) disposed within one of the slots 350. The same is true for the terminal leads 33V and 33W of the V-phase and W-phase coils. The neutral point joint leads 33N' connecting with other ends of the first and second phase windings 10 and 11 of the U-phase coil extend from adjacent two of the slot-inserted portions 633 (i.e., the sixth and fifth layer conductor portions 736 and 735) disposed within one of the slots 350. The same is true for the V-phase and W-phase coil. This facilitates ease of arrangement of the terminal leads 33U to 33W and 33N' and connection of the terminal leads 33N' at the neutral point 33N and the terminal leads 33U to 33W with external terminals and also ease of shaping and production of the terminal leads 33U to 33W and 33N'. Alternatively, the terminal leads 33U may extend from the sixth and fifth layer conductor portions 736 and 735, while the neutral point joint leads 33N' may extend from the first and second layer conductor portions 731 and 732.

The intervals or back pitches between the slot-inserted portions 633 of the anomaly conductor segments 5000 and 5001 are identical with each other, thus permitting the anomaly conductor segments 5000 and 5001 to be manufactured simultaneously by inserting a large-sized conductor and a small-sized conductor into slots of rings and rotating the rings in opposite directions to spread or bend end portions of the large-sized and small-sized conductor segments to form the U-shaped anomaly conductor segments 5000 and 5001, respectively.

The neutral point joint leads 33N' extend from the slot-inserted portions 633 (i.e., trailing ones of the slot-inserted portions 633 of the second turn coils 4000 and 4001) disposed outside the slot-inserted portions 633 of the anomaly conductor segments 5000 and 5001. The terminal leads 33U (33V or 33W) extend from the slot-inserted portions 633 (i.e., leading ones of the slot-inserted portions 633 of the first turn coils 3000 and 3001). This permits the heads of the anomaly conductor segments 5000 and 5001, the neutral point joint leads 33N' and the terminal leads 33U, 33V, and 33W to be arranged without any physical interference with each other. This also improves freedom in arranging the leads 33N', 33U, 33V, and 33W.

As apparent from the above discussion, the stator coil 31 is made up of the first and second phase windings 10 and 11 that are electromagnetically equivalent to each other, thus allowing the first and second phase windings 10 and 11 to be changed from a series connection to a parallel connection or vice versa easily, which facilitates use of the ac machine 1 with different voltage batteries.

Two of the slots 350 are provided for each pole in each phase. The six slot-inserted portions 633 are disposed within each of the slots 350. This results in an increase in turn of the stator coil 31 without an increase in poles, which enables use of the ac machine 1 on higher voltages. The interval or pitch between the slot-inserted portions 633 of each of the wave winding segments 300 and the first and second lap winding segments 301 and 302 is shorter than the pole pitch by one slot pitch, thus allowing a projected length of one of the coil ends of the stator coil 31 to be decreased. This eliminates the problem involved in conventional stator coil structures that the length of one of the coil ends projecting from the end surface of the stator core 32 is undesirabley longer than that of the other coil end and results in a decrease in electric resistance of the stator coil 31, which improves an output of the ac machine 1 without increasing magnetic noises.

Figure 34:
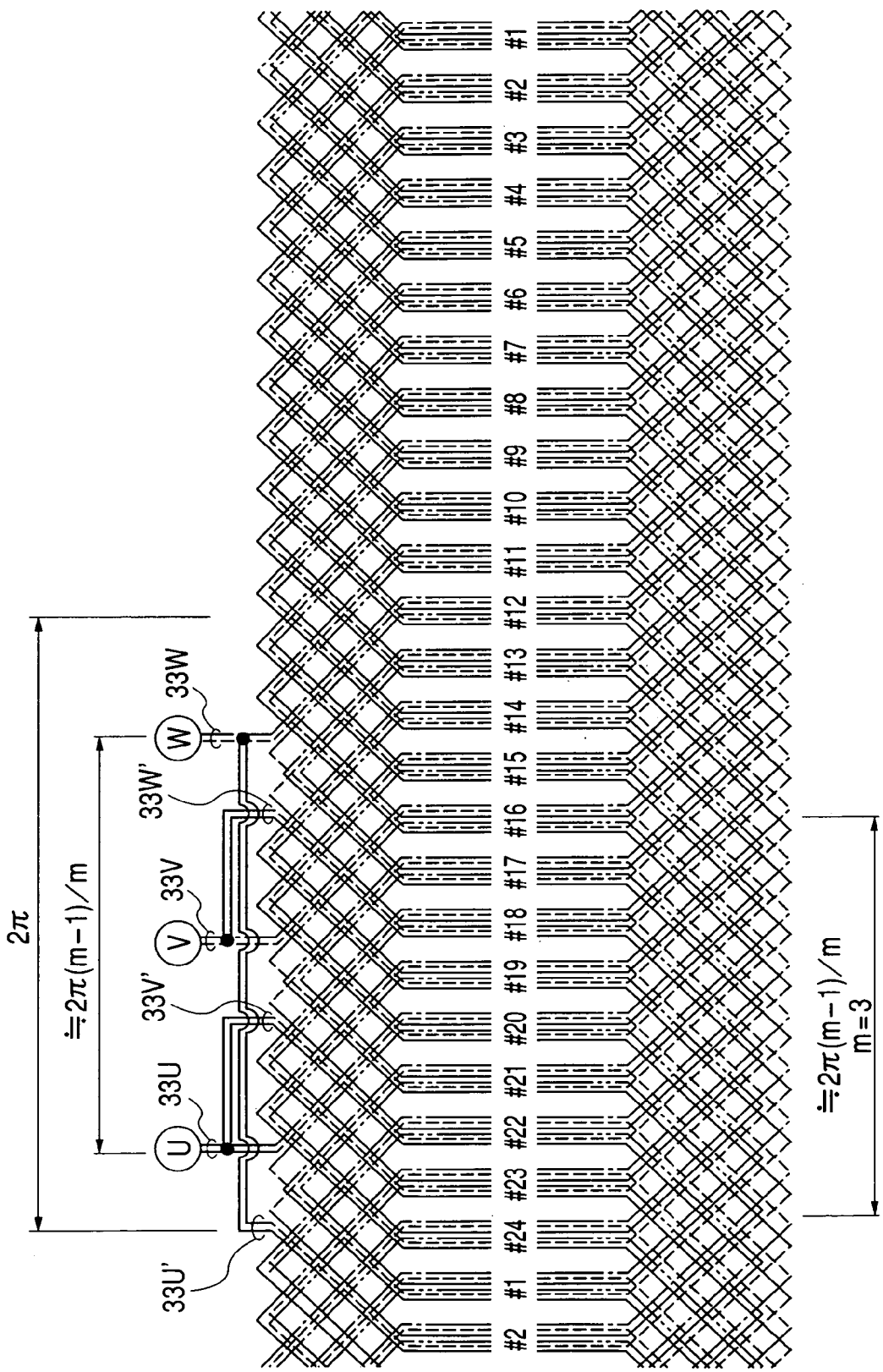
FIG. 34 is a development which shows a modification of a stator coil of the fifth embodiment.

FIG. 34 shows a modification of the stator coil 31 of the fifth embodiment in which the U-phase, V-phase, and W-phase coils are delta-connected.

The neutral point joint leads 33U', 33V', and 33W', like the ones of FIG. 9, are provided which lead to trailing ones of the slot-inserted portions 633 of the second phase coils 4000 and 4001 of the respective U-phase, V-phase, and W-phase coils and coupled with each other through a delta connection.

Figure 35:
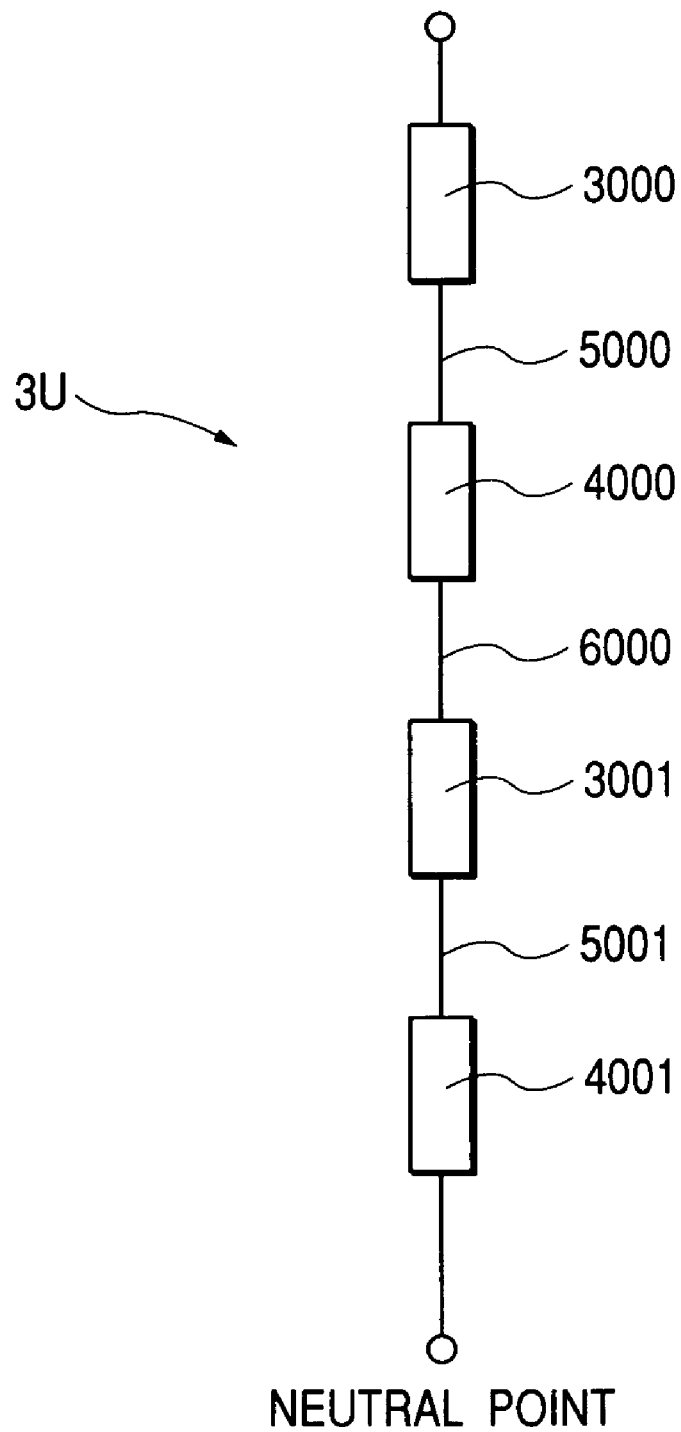
FIG. 35 is a circuit diagram which shows a U-phase coil of a stator coil according to the sixth embodiment of the invention.
Figure 36:
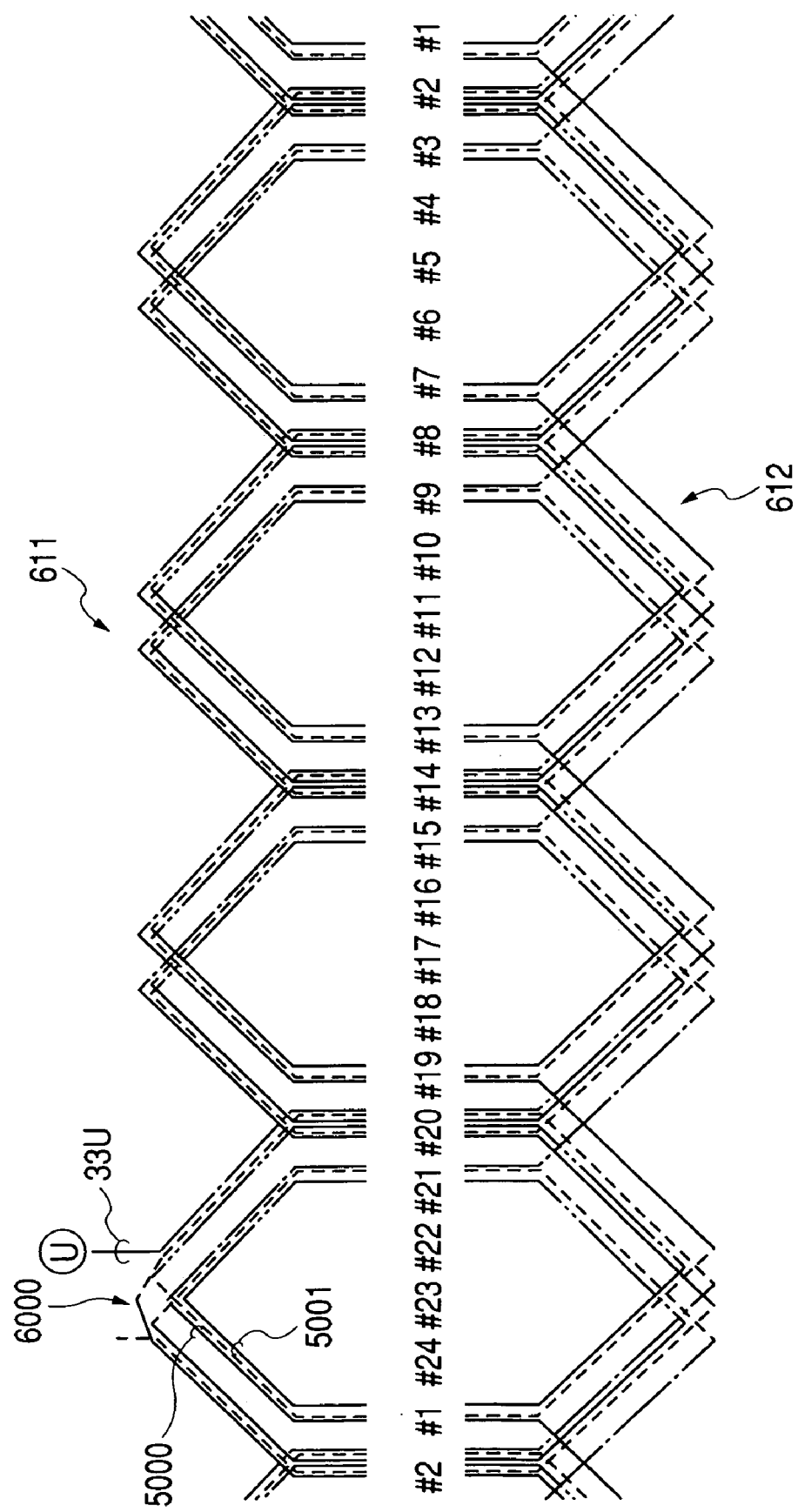
FIG. 36 is a development illustrating a U-phase coil of FIG. 35.
Figure 37:
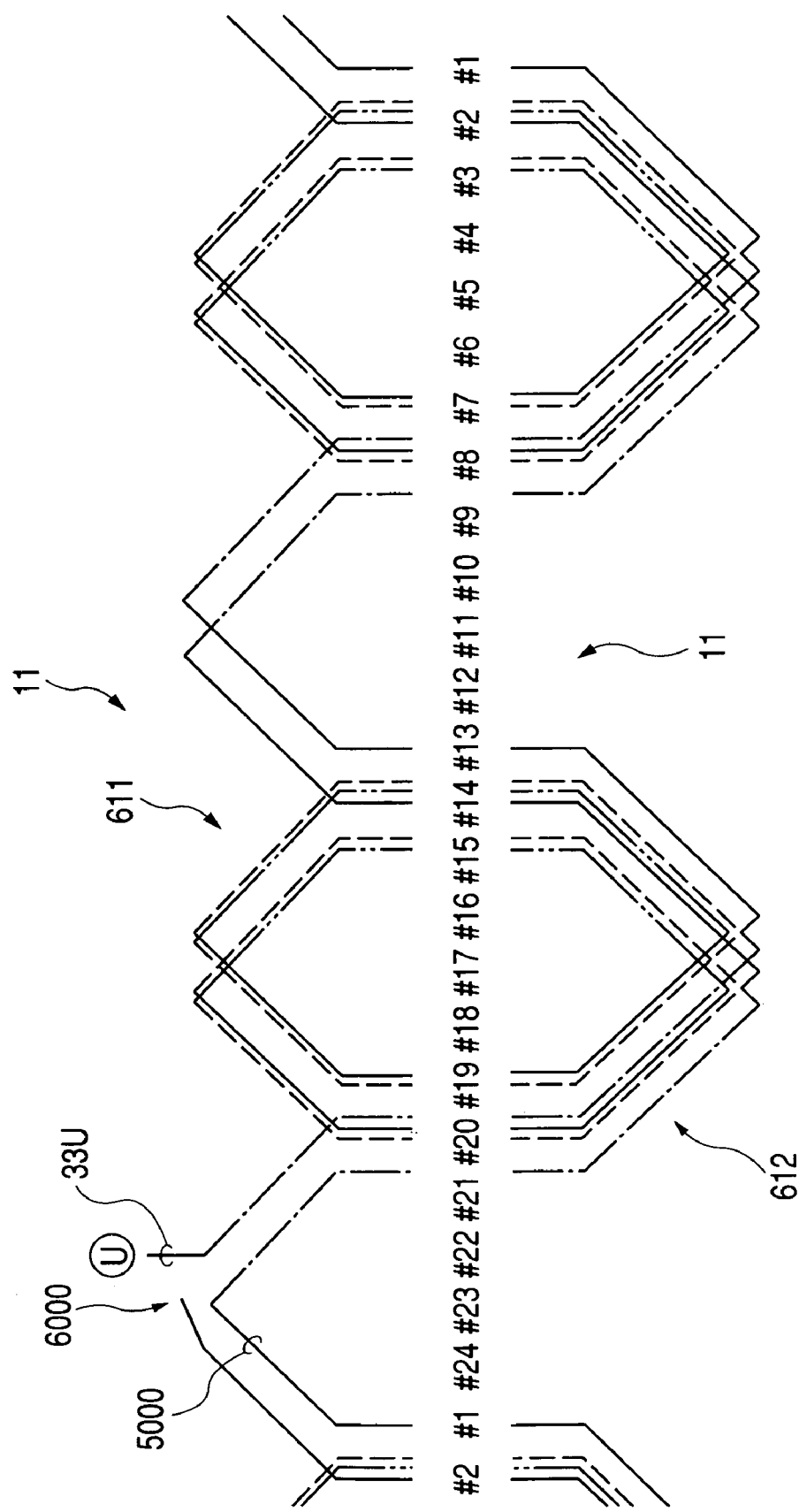
FIG. 37 is a development which shows a first phase winding of the U-phase coil of FIG. 35.
Figure 38:
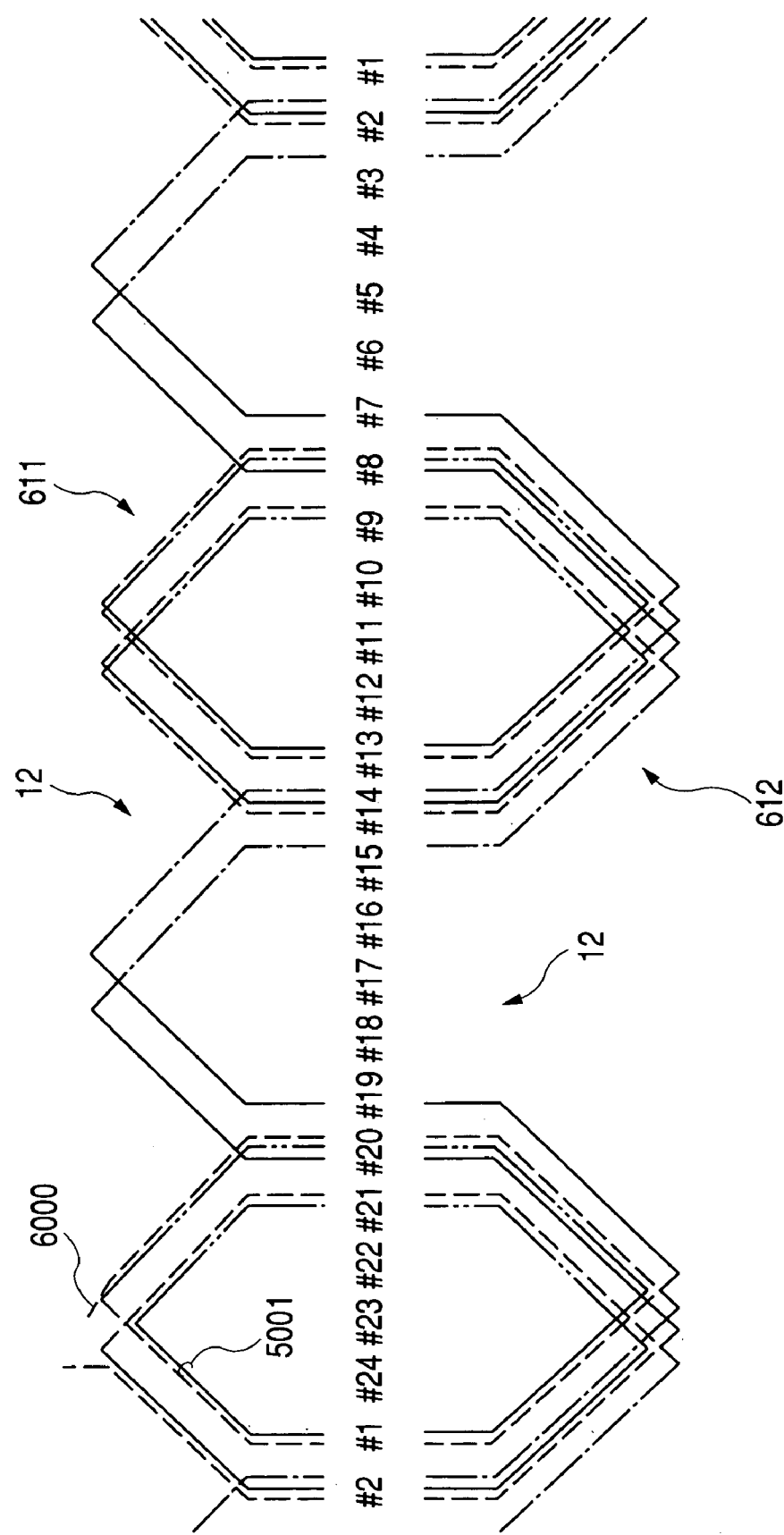
FIG. 38 is a development which shows a second phase winding of the U-phase coil of FIG. 35.

FIG. 35 shows the U-phase coil 3U of the stator coil 31 according to the sixth embodiment of the invention. FIG. 36 is a development illustrating the U-phase coil 3U. FIG. 37 shows the first phase winding 10 of the U-phase coil 3U. FIG. 38 shows the second phase winding 11 of the U-phase coil 3U.

The U-phase coil 3U is, as clearly shown in FIG. 35, made up of the first phase winding 10 and the second phase winding 11, as described in the fifth embodiment, which are joined in series through a bridging conductor segment 6000.

The bridging conductor segment 6000 has the two slot-inserted portions 633, like the ones shown in FIGS. 26 and 27, one is a trailing one of the slot-inserted portions 633 of the second turn coil 4000 of the first phase winding 10 which corresponds to a trailing one of the slot-inserted portions 633 of the second turn coil 4000 of the first phase winding 10 leading to the neutral point joint lead 33N' in the fifth embodiment, and another is a leading one of the slot-inserted portions 633 of the first turn coil 3001 of the second phase winding 11 which corresponds to a leading one of the slot-inserted portions 633 of the first turn coil 3001 of the second phase winding 11 leading to the terminal lead 33U in the fifth embodiment.

The bridging conductor segment 6000, thus, turns a winding direction of the second turn coil 4000 of the first phase winding 10 to that of the first turn coil 3001 of the second phase winding 11. Specifically, the structure of the stator coil 31 of this embodiment is capable of use of the ac machine 1 on different voltages by changing a joint of the first and second phase windings 10 and 11 between the series connection and the parallel connection and/or a joint of the U-phase, V-phase, and W-phase coils between the star connection and the delta connection.

FIGS. 39 to 42 show the ac machine 1 according to the seventh embodiment of the invention.

The ac machine 1 is of a sixteen (16) pole structure and identical in structure of the stator coil 31 with those of the above fifth and sixth embodiments. Within each of the slots 350 of the stator core 32, six of the slot-inserted portions 633 are arrayed in line or aligned in the radius direction of the stator core 32. Unlike the above embodiments, the slot-inserted portions 633 disposed in each of the slots 350 will be referred to as first, second, third, fourth, fifth, and sixth layer conductor portions in the order of radially outward locations. Specifically, the first, second, third, fourth, fifth, and sixth layer conductor portions are arrayed radially from outside to inside the stator core 31. The pair of neutral point joint leads 33N' extend from the fifth and sixth layer conductor portions. The terminal leads 33U, 33V, and 33W extends from first and second layer conductor portions. The stator coil 31 is identical in structure with that of the fifth embodiment. Specifically, the first and second phase windings 10 and 11 of each of the U-phase, V-phase, and W-phase coils are connected in parallel. The U-phase, V-phase, and W-phase coils are star-connected.

Figure 41:
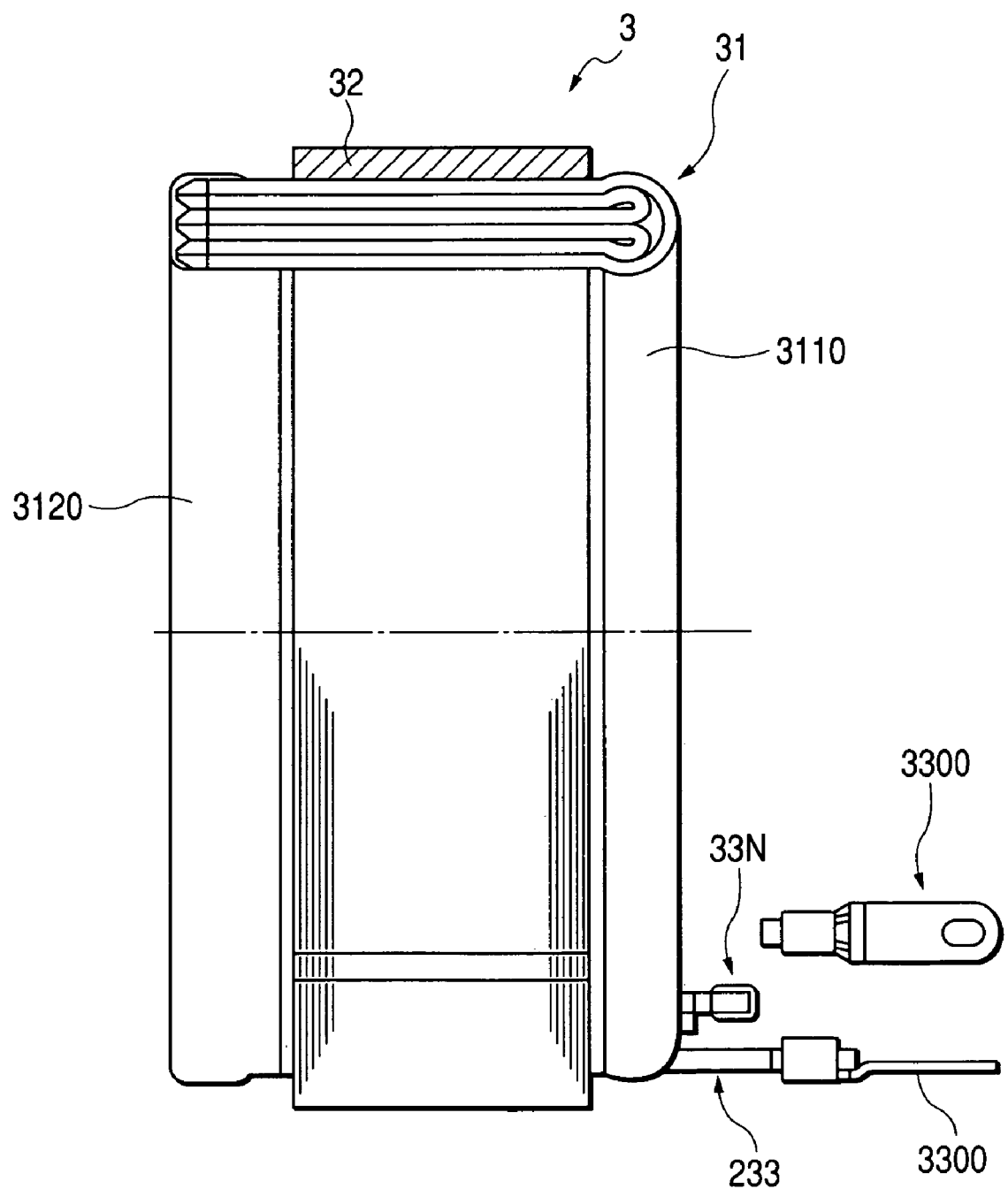
FIG. 41 is a longitudinal sectional view, as taken along the line A—A in FIG. 42.

In FIG. 41, numeral 3110 denotes a coil end of the stator coil 31 made up of the V-shaped coil ends 611 of the conductor segments 33. Numeral 3120 denotes a coil end of the stator coil 31 made up of the joint coil ends 612 of the conductor segments 33.

Referring back to FIG. 39, the ac machine 1 has a front frame 110 and a rear frame 120 which supports therein the rotor 2 rotatably using a pair of bearings. The front frame 110 and the rear frame 120 retain the stator core 32 therebetween and are joined firmly by through bolts 410 to hold the stator core 32 from rotating.

The terminal table 13 is secured on a circumferential wall of the rear frame 120 through bolts 43. The terminal table 13 has three-phase terminal bolts 13a which work to establish connections of input/output terminals of the ac machine 1 to three ac terminals of a three-phase inverter (not shown). The length of a first circumferential portion, as denoted by θ in FIG. 40, of the rear frame 120 extending parallel to the rotary shaft 21 on which the terminal table 13 is not attached is shorter than that of a second circumferential portion, as indicated by a dashed line in FIG. 39, of the rear frame 120 to which the terminal table 13 is attached by the distance ΔL. Numeral 42 indicates an end surface of the second circumferential portion to which the terminal table 13 is attached. The decreased length of the first circumferential portion, as denoted by θ in FIG. 40, of the rear frame 120 results in a decreased length of the through bolts 41. Specifically, the angular range occupied by the terminal leads 33U, 33V, and 33W is, like the first embodiment, relatively small, thus permitting the length of the rear frame 120 extending parallel to the shaft 21 to be decreased.

Specifically, within an angular range equivalent to approximately two pole pitches within which the terminal leads 33U, 33V, and 33W and the neutral point joint leads 33N' are arranged, ends of the leads 33U to 33W and 33N' project in the axial direction of the ac machine 1, thereby permitting the terminal table 13 to be mounted within that angular range. This permits the length of the first circumferential portion of the rear frame 120 ranging over θ on which the terminal table 13 is not installed to be decreased, thus resulting in a decreased weight of the rear frame 120 and improving mountability of the ac machine 1.

Figure 39:
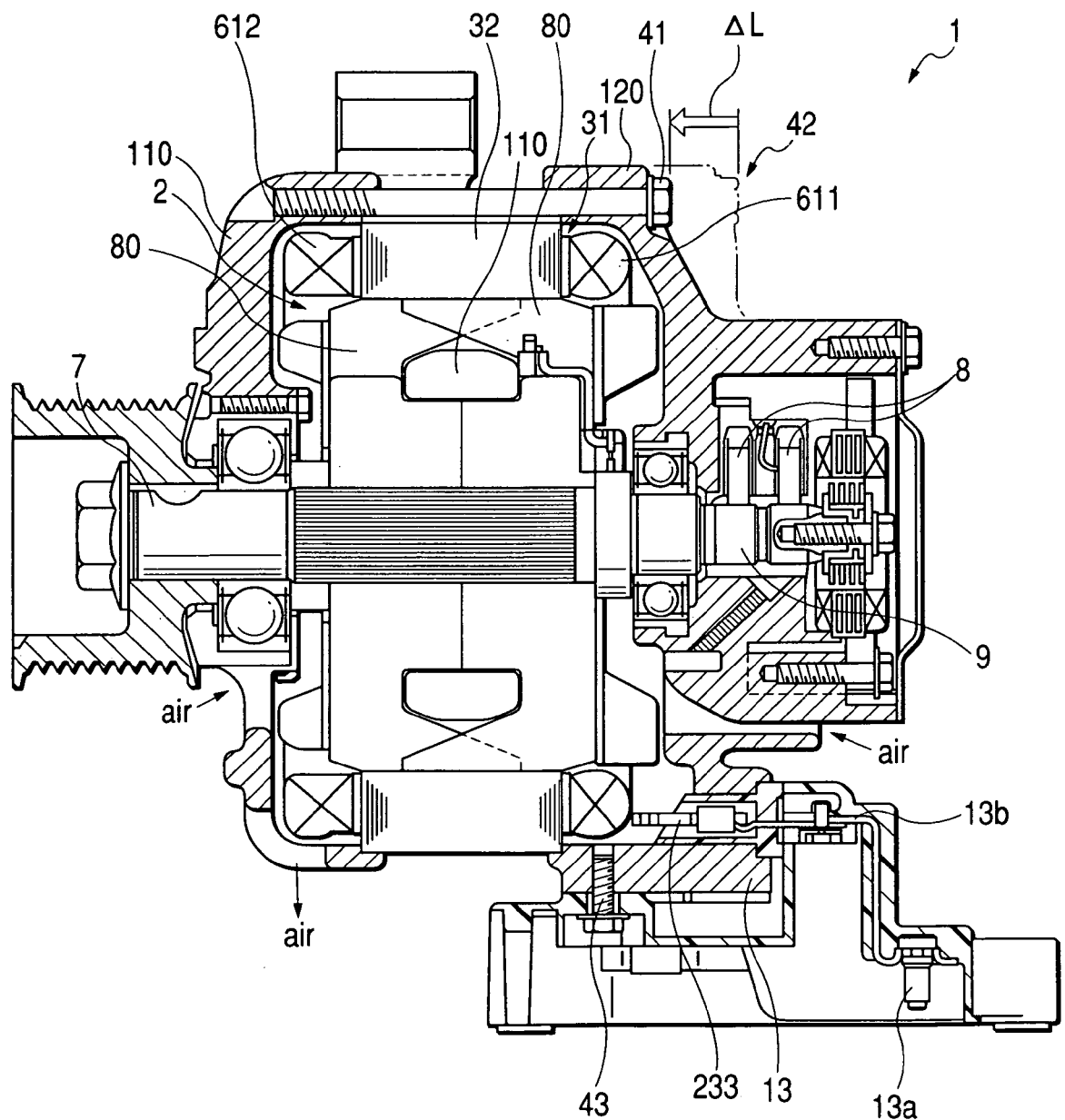
FIG. 39 is a partially longitudinal sectional view which shows an ac machine equipped with a stator coil according to the seventh embodiment of the invention.
Figure 40:
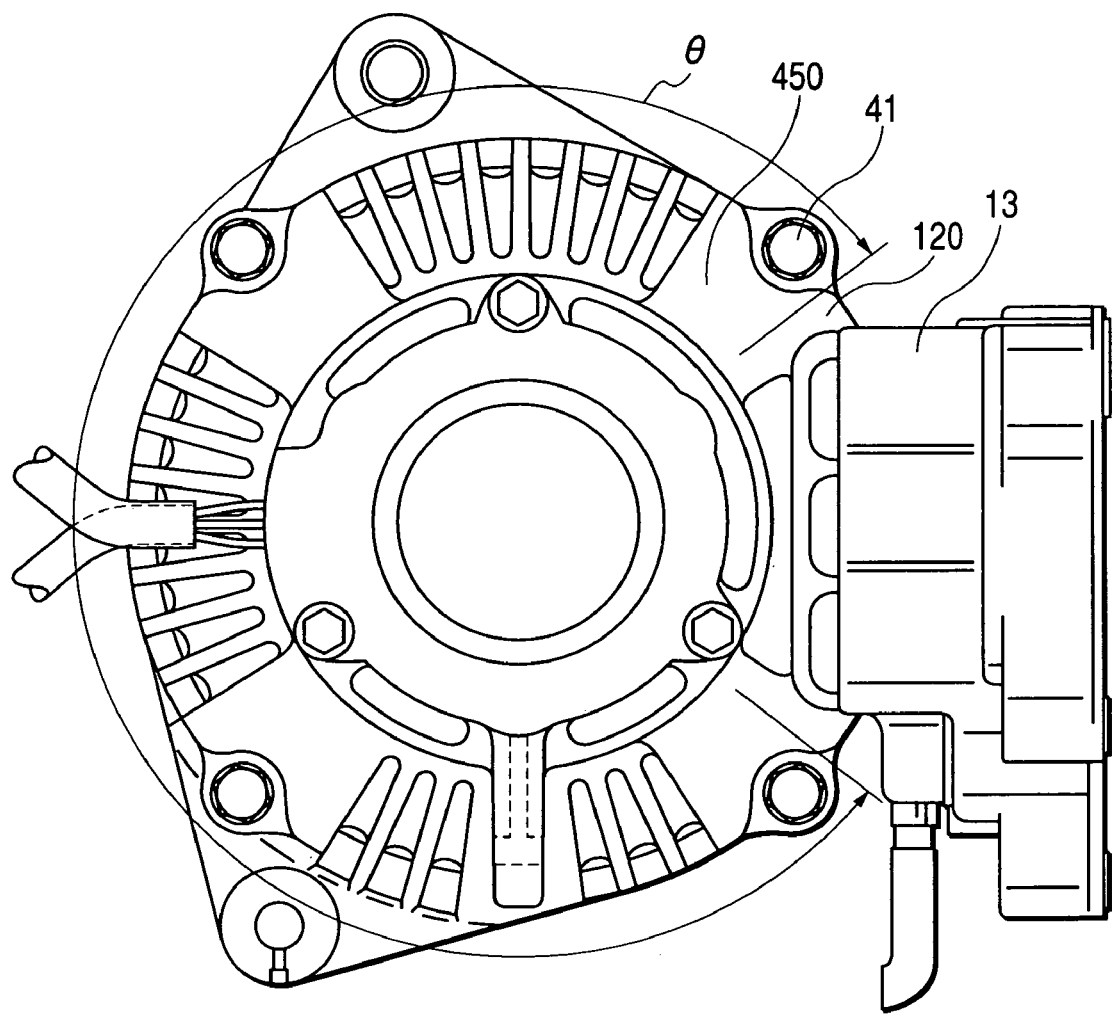
FIG. 40 is a rear view of the ac machine of FIG. 39.
Figure 42:
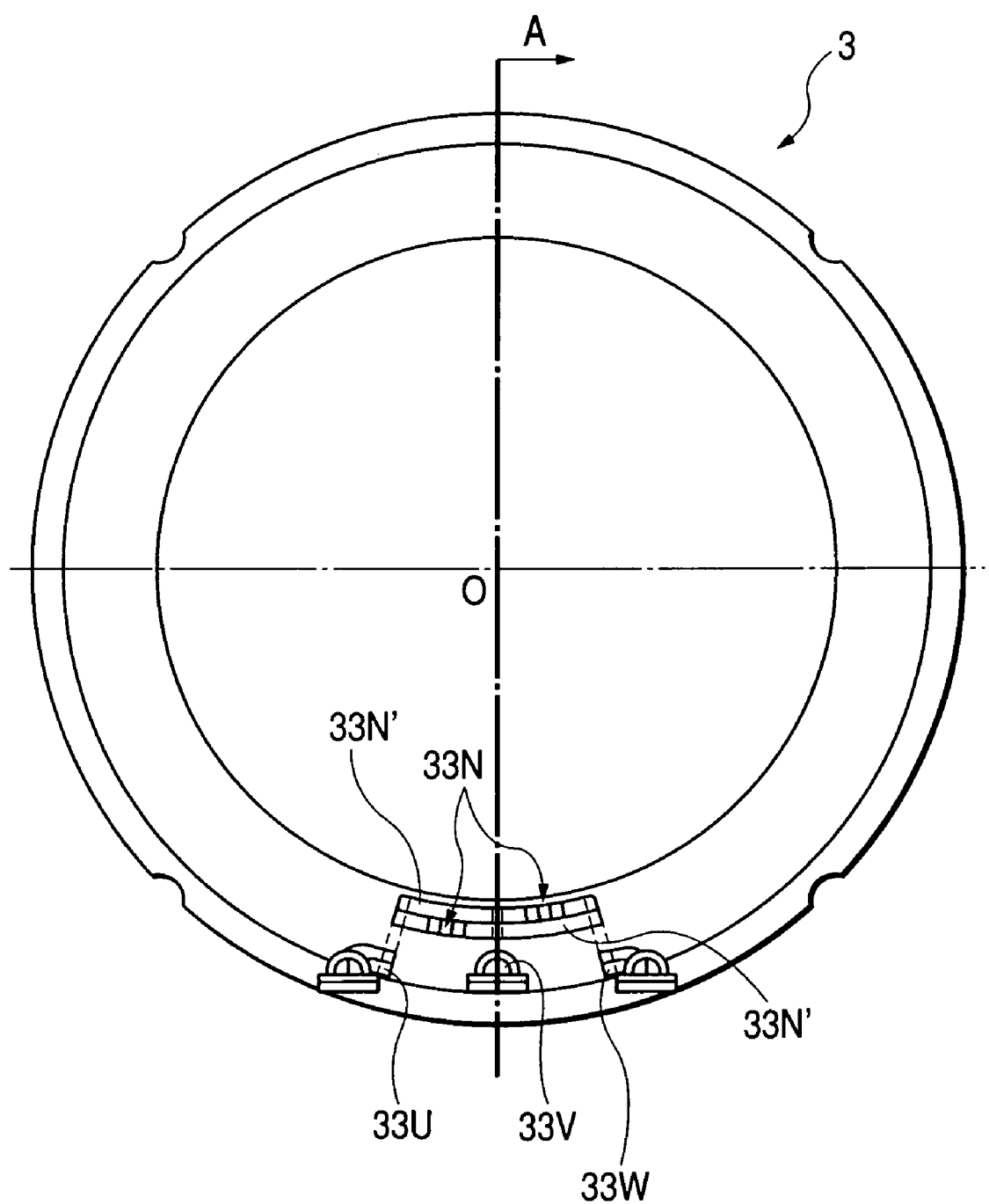
FIG. 42 is a rear elevation of the stator coil as illustrated in FIG. 40.

FIG. 41 is a cross sectional view, as taken along the line A—A in FIG. 42, which shows the 16-pole stator 3 (i.e., armature) consisting essentially of the stator core 32 and the stator coil 31. FIG. 42 is a rear elevation of the stator 3. The stator core 32 includes a lamination of electromagnetic steel plates. The stator coil 31 includes a three-phase winding which is, like the fifth embodiment, wound through slots formed in the stator core 32 using insulating sheets. The input/output line correction 233 made up of the terminal leads 33U, 33V, and 33W extends from the first coil end 312 of the stator coil 31 backward. An electric connection of the stator coil 31 to an inverter (not shown) is accomplished by coupling crimp contacts 3300 secured on ends of the terminal leads 33U, 33V, and 33W to metal connectors 13b on the terminal table 13, as shown in FIG. 39.

One of the two neural points 33N is provided at a location coinciding with the fifth layer position of one of the slot 350 of the stator core 32, while the other neutral point 33N is provided at a location coinciding with the sixth layer position of one of the slot 350 of the stator core 32.

Ends of the first phase windings 10 of the respective U-phase coil, V-phase coil, and W-phase coil extend from the fifth layer conductor portions in the slots 350 and are bent in the circumferential direction of the stator coil 31 as the neutral point joint leads 33N' which are, in turn, welded at one of the neutral point 33N provided between the terminal lead 33U of the U-phase coil and the terminal lead 33V of the V-phase coil. Ends of the second phase windings 11 of the respective U-phase coil, V-phase coil, and W-phase coil extend from the sixth layer conductor portions in the slots 350 and are bent in the circumferential direction of the stator coil 31 as the neutral point joint leads 33N' which are, in turn, joined at the other neutral point 33N provided between the terminal lead 33W of the W-phase coil and the terminal lead 33V of the V-phase coil. The second coil end 3120 of the stator coil 31 is coated with epoxy resin for avoiding electric shorts between pairs of the welds of the conductor segment sets 330. Use of the two neutral points 33N permits the number of joints to each of the neutral points 33N to be decreased to three, thus resulting in ease of welding the terminal leads 33U', 33V', and 33W' to the neutral points 33N.

Each of the slots 350 of the stator core 32 may alternatively be designed to have 6×n (n=integer) layer positions to dispose the n conductor segment sets 330 therein to make n sets of phase windings. The phase windings are joined in series or parallel to increase turns of the stator coil 31.

FIGS. 43 to 46 show stator coil 31 according to the eighth embodiment of the invention which is different from those in the first to third embodiments in that it is made of a full-pitch winding. Specifically, the stator coil 31 has the four slot-inserted portions of the conductor segment sets 330 disposed in each of the slots 350 of the stator core 32. Parts of the ac machine 1 of this embodiment other than the stator coil 31 and leads thereof are identical with those of the first to third embodiment, and explanation thereof in detail will be omitted here.

The stator coil 31 has the U-phase, V-phase, and W-phase coils star-connected, but they may alternatively be delta-connected. The U-phase, V-phase, and W-phase coils may alternatively be connected at a single neutral point.

Figure 43:
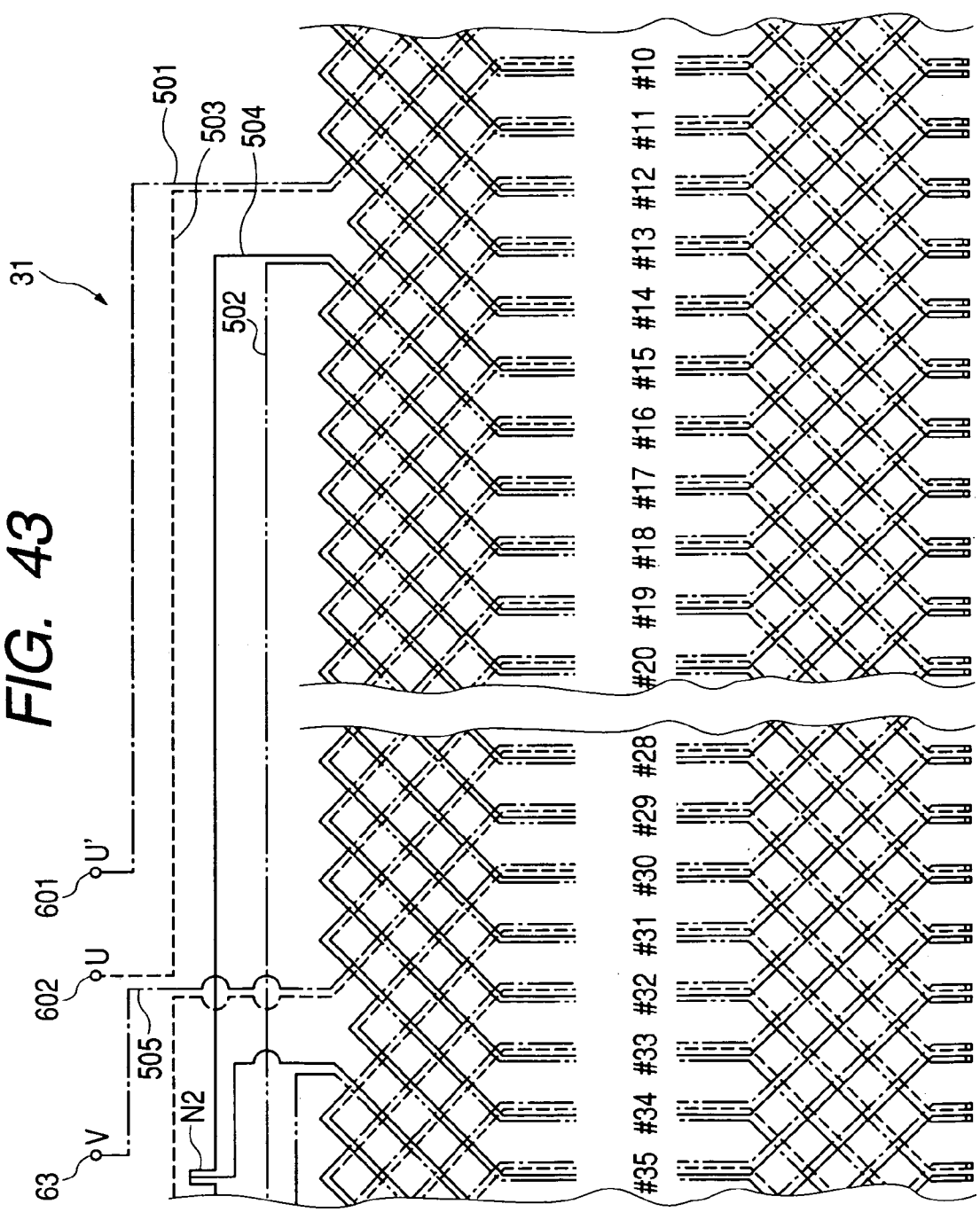
FIG. 43 is a development which illustrates a portion of a stator coil according to the eighth embodiment of the invention.
Figure 44:
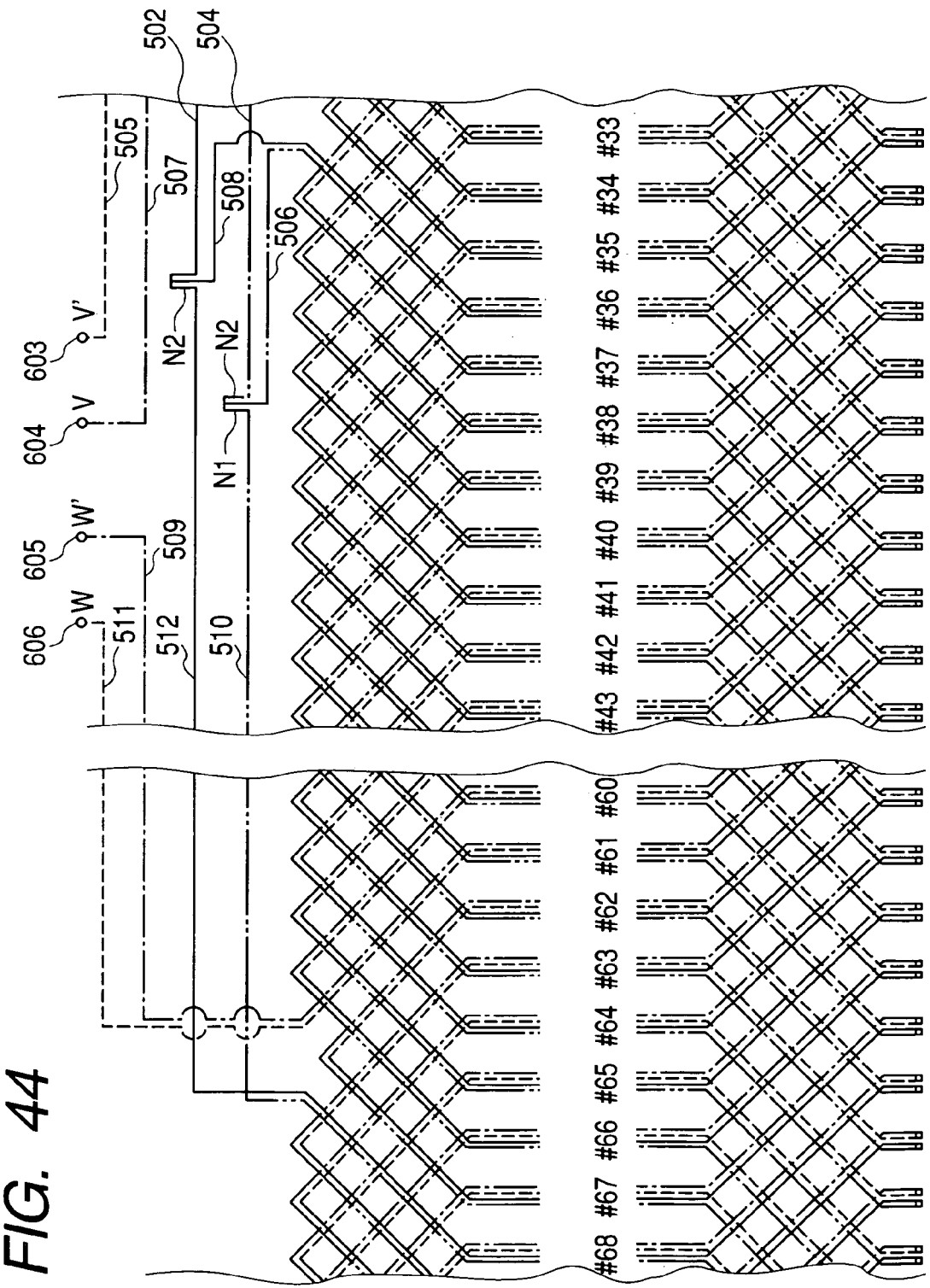
FIG. 44 is a development which illustrates another portion of the stator coil of FIG. 43.

In FIGS. 43 and 44, an alternate long and short dash line, like FIGS. 4 and 5, represents one of the slot-inserted portions of the conductor segment 33 disposed at the first layer position within each of the slots 350 of the stator core 32, the V-shaped coil end 311, and the joint coil end 312 extending therefrom. A dashed line represents one of the slot-inserted portions of the conductor segment 33 disposed at the second layer position within each of the slots 350, the V-shaped coil end 311, and the joint coil end 312 extending therefrom. A solid line represents one of the slot-inserted portions of the conductor segment 33 disposed at the third layer position within each of the slots 350, the V-shaped coil end 311, and the joint coil end 312 extending therefrom. An alternate long and two short dashes line represents one of the slot-inserted portions of the conductor segment 33 disposed at the fourth layer position within each of the slots 350, the V-shaped coil end 311, and the joint coil end 312 extending therefrom. For the brevity of illustration, FIGS. 43 and 44 omit halves of the conductor segments 33.

Like the first embodiment, each of the U-phase coil, the V-phase coil, and the W-phase coil is made up of the first phase winding 10 and the second phase winding 11. The first and second phase windings 10 and 11 are connected in parallel, but may alternatively be connected in series. Each of the first and second phase windings 10 and 11 is, like the first embodiment, made up of the wave winding segments 34 and the lap winding segments 35 joined alternately.

The first phase winding 10 of the U-phase coil starts from the first layer conductor portion disposed within the #9 slot (not shown in FIG. 43) leading to the terminal 601 through the terminal lead 501 and extends circumferentially from the fourth layer conductor portion disposed in the #16 slot to the first neutral point N1 through the terminal lead 502.

The second phase winding 11 of the U-phase coil starts from the second layer conductor portion disposed within the #9 slot (not shown in FIG. 43) leading to the terminal 602 through the terminal lead 503 and extends circumferentially from the third layer conductor portion disposed in the #16 slot to the second neutral point N2 through the terminal lead 504.

The first phase winding 10 of the V-phase coil starts from the first layer conductor portion disposed within the #29 slot leading to the terminal 603 through the terminal lead 505 and extends circumferentially from the fourth layer conductor portion disposed in the #36 slot to the first neutral point N1 through the terminal lead 506.

The second phase winding 11 of the V-phase coil starts from the second layer conductor portion disposed within the #29 slot leading to the terminal 604 through the terminal lead 507 and extends circumferentially from the third layer conductor portion disposed in the #36 slot to the second neutral point N2 through the terminal lead 508.

The first phase winding 10 of the W-phase coil starts from the first layer conductor portion disposed within the #61 slot leading to the terminal 605 through the terminal lead 509 and extends circumferentially from the fourth layer conductor portion disposed in the #68 slot to the first neutral point N1 through the terminal lead 510.

The second phase winding 11 of the W-phase coil starts from the second layer conductor portion disposed within the #61 slot leading to the terminal 606 through the terminal lead 511 and extends circumferentially from the third layer conductor portion disposed in the #68 slot to the second neutral point N2 through the terminal lead 512.

The U-phase, V-phase, and W-phase coils are, as described above, identical in wiring pattern except for locations of the slots through which they pass, and reference will be made below only to the U-phase coil. The stator coil 32 has, like the above embodiments, the two slots 350 for each pole in each phase. Use of bridging conductors allows the stator coil 32 to have even slots more than two.

The first phase winding 10 of the U-phase coil extends from the first layer conductor portion disposed within the #29 slot, to the second layer conductor portion disposed within the #23 slot, to the third layer conductor portion disposed within the #29 slot, to the fourth layer conductor portion disposed within the #23 slot, to the first layer conductor portion disposed within the #17 slot, to the second layer conductor portion disposed within the #11 slot, to the third layer conductor portion disposed within the #23 slot, and to the fourth layer conductor portion disposed within the #11 slot, advances in a similar order, and then reaches the fourth layer conductor portion disposed within the #36 slot finally.

The first layer conductor portion disposed within the #29 slot is made of an I-shaped conductor used for a lead. Each of the second layer position disposed within the #23 slot and the third layer conductor portion disposed within the #29 slot is made of the lap winding segment 35 whose joint coil ends (i.e., welds) are located at the same position in the circumferential direction of the stator coil 31. In other words, the joint coil ends are disposed at a zero pitch. Each of the fourth layer conductor portion disposed within the #23 slot and the first layer conductor portion disposed within the #17 slot is made of the wave winding segment 34 whose joint coil ends are located at an interval away from each other in the circumferential direction which is equivalent to an electrical angle of $2\pi$ (i.e., $2\pi$ slot pitch). The fourth layer conductor portion disposed within the #36 slot is made of an I-shaped conductor used for a lead. Specifically, the first phase winding 10 is made up of the lap winding segments 35 and the wave winding segments 34 joined alternately and has the I-shaped conductors at the ends thereof.

The second phase winding 11 of the U-phase coil extends from the second layer conductor portion disposed within the #29 slot, to the first layer conductor portion disposed within the #35 slot, to the fourth layer conductor portion disposed within the #41 slot, to the third layer conductor portion disposed within the #47 slot, to the second layer conductor portion disposed within the #41 slot, and to the first layer conductor portion disposed within the #47 slot, advances in a similar order, and then reaches the third layer conductor portion disposed within the #36 slot finally.

The second layer conductor portion disposed within the #29 slot is made of an I-shaped conductor used for a lead. Each of the first layer position disposed within the #35 slot and the fourth layer conductor portion disposed within the #41 slot is made of the wave winding segment 34 whose joint coil ends (i.e., welds) are located at an interval away from each other in the circumferential direction which is equivalent to an electrical angle of $2\pi$ (i.e., $2\pi$ slot pitch). Each of the third layer conductor portion disposed within the #47 slot and the second layer conductor portion disposed within the #41 slot is made of the lap winding segment 35 whose joint coil ends (i.e., welds) are located at the same position in the circumferential direction of the stator coil 31. In other words, the joint coil ends are disposed at a zero pitch. The third layer conductor portion disposed within the #36 slot is made of an I-shaped conductor used for a lead. Specifically, the second phase winding 11 is made up of the lap winding segments 35 and the wave winding segments 34 joined alternately and has the I-shaped conductors at the ends thereof.

As apparent from the above discussion, the first and second phase windings 10 and 11 extend in opposite winding directions and have the ends disposed adjacent to each other within the same slots. The three-phase star-connected winding (i.e., the stator coil 31) is, thus, made by connecting the first and second phase windings 10 and 11 in parallel to form each of the U-phase, V-phase, and W-phase coils. The first and second phase windings 10 and 11 may alternatively be connected in series to make either of a star-connection and a delta-connection of the U-phase, V-phase, and W-phase coils.

Figure 45:
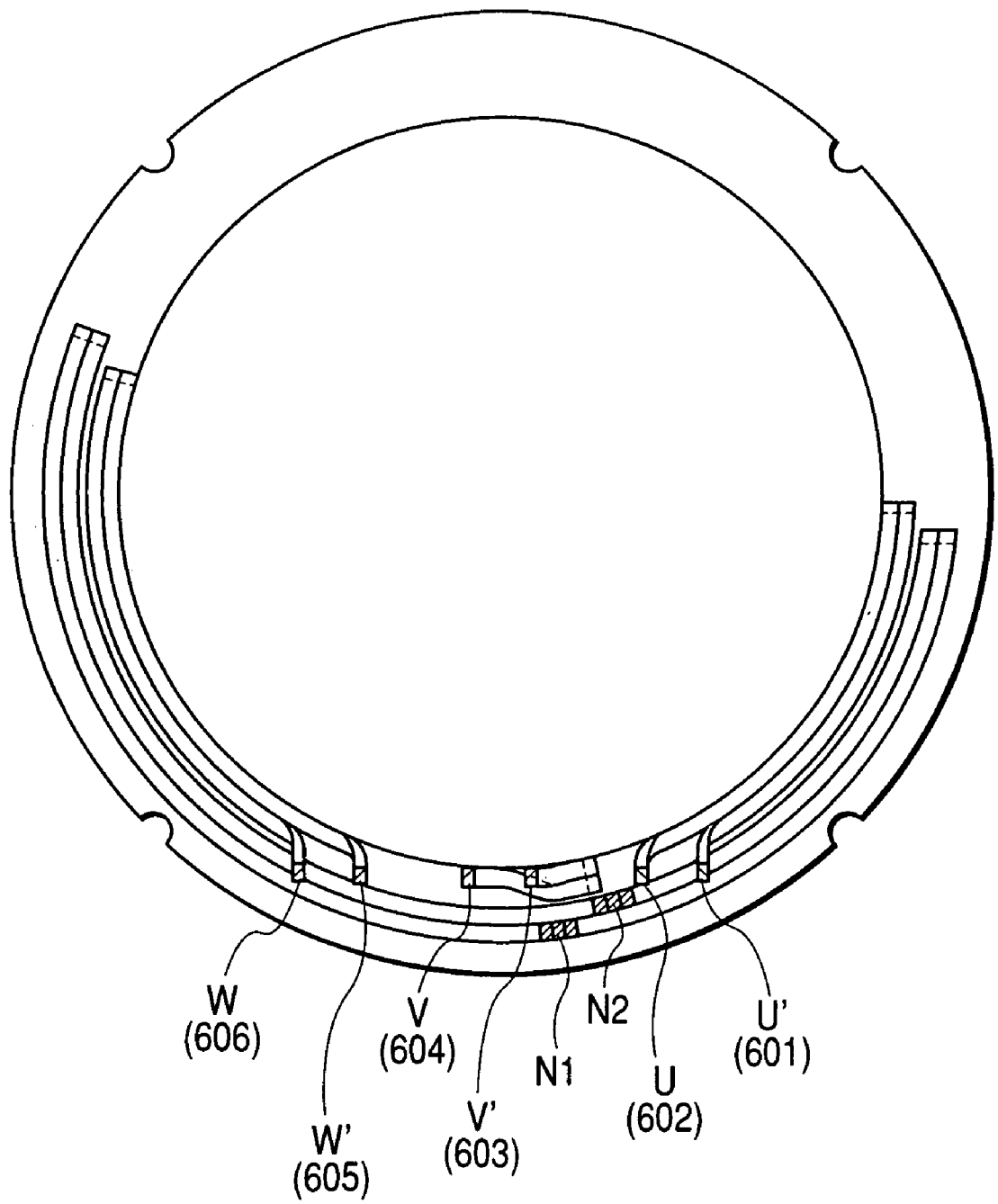
FIG. 45 is a view which shows an end of the stator coil of the eighth embodiment from which lead wires extend.
Figure 46:
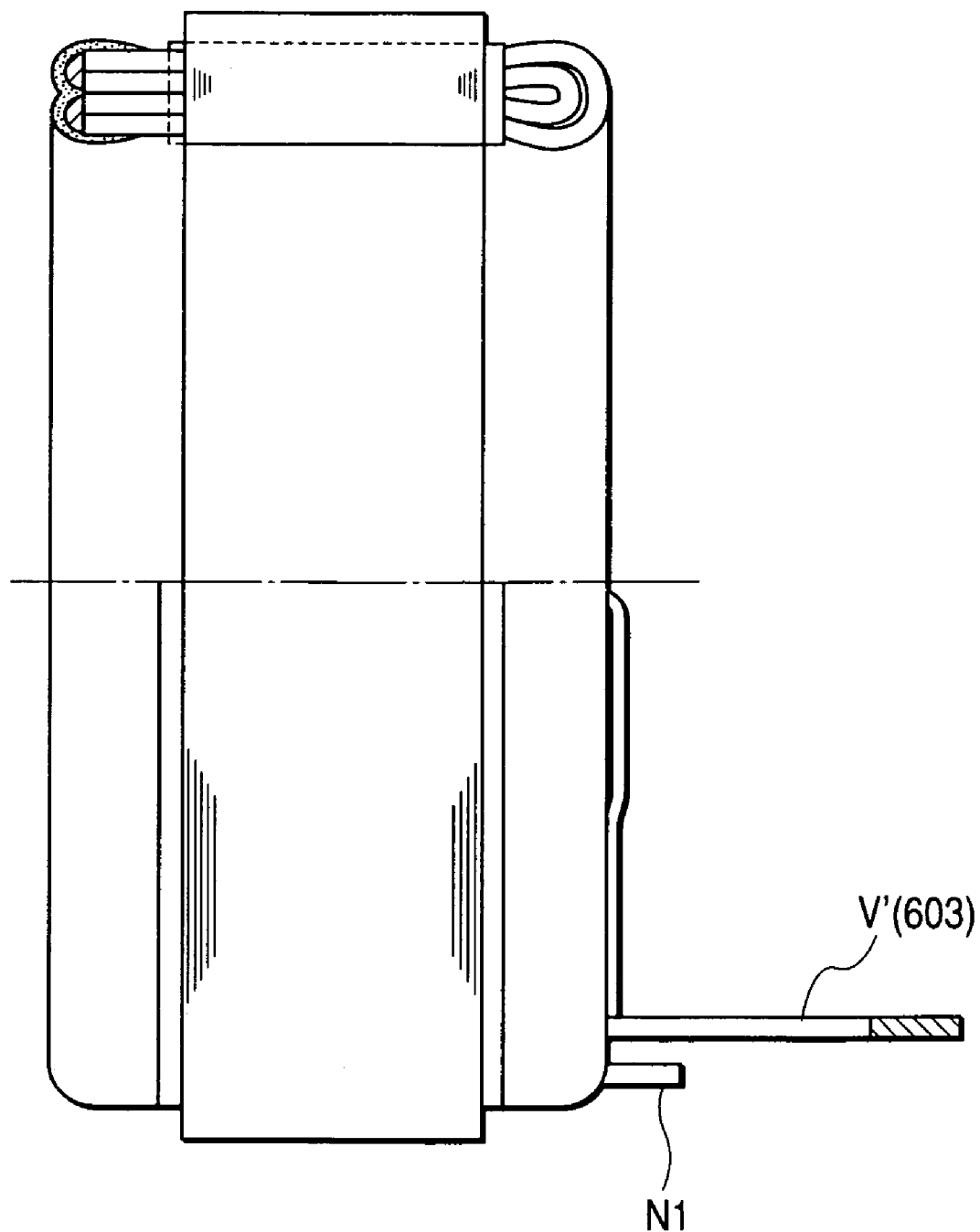
FIG. 46 is a sectional view of the stator coil of the eighth embodiment.

Arrangements of the terminal leads 501 to 512, the terminals 601 to 606, and the neutral points N1 and N2 are illustrated in FIGS. 45 and 46. The terminals of the same phase are located at a given interval away from each other for facilitating ease of connections with external terminals, however, may alternatively be located close to each other.

As apparent from the above discussion, each of the U-phase, V-phase, and W-phase coils is, like the above embodiments, made up of the first and second phase windings 10 and 11 whose pairs of terminal leads extend from the same slots, respectively, thus permitting conductors used to make windings 10 and 11 to be thinned. This facilitates ease of machining of such conductors and allows all the terminal leads to be bent simultaneously. Additionally, use of the two first and second windings 10 and 11 to make each of the U-phase, V-phase, and W-phase coils facilitates ease of switching between the serial and parallel connections thereof.

The stator coil 31 of the fifth embodiment in which the six slot-inserted portions 633 of the conductor segments 33 are disposed within each of the slots 350 to make the fractional pitch winding as the stator coil 31 may also be implemented, like the eighth embodiment, by a full-pitch winding.

A combination (s) of the first type of stator coil 31 in which the six slot-inserted portions of the conductor segments 33 are disposed within each of the slots 350 of the stator core 32 and the second type of stator coil 31 in which the four slot-inserted portions of the conductor segments 33 are disposed within each of the slots 350 of the stator core 32 may be provided on the stator core 31 to make the stator 3. Alternatively, a plurality of either of the first type stator coils 31 and the second type stator coils 331 may be provided on the stator core 31 to make the stator 3.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A segment joined armature for a multi-phase ac machine comprising:

an armature core having slots, q(=integer greater than or equal to two) for each pole in each phase, the slots being arrayed in a circumferential direction of said armature core; and an armature winding made up of m(=integer greater than or equal to three) phase coils, each of the phase coils being made up of a first phase winding and a second phase winding which are identical in number of turns and extending in opposite winding directions, wherein each of the first and second phase windings is made up of at least one wave winding segment and lap winding segments joined alternately, the wave winding segment and the lap winding segments being formed by sequentially joined-conductor segments, each of the conductor segments including a substantially V-shaped head portion, a pair of leg portions extending from ends of the head portion, disposed in two of the slots of said armature core located at a given interval away from each other, and a pair of joint end portions extending from ends of the leg portions, s(=integer greater than or equal to four) of the leg portions being arrayed within each of the slots of said armature core in a radius direction of said armature core, each of the joint end portions of each of the conductor segments being joined to one of the joint end portions of another of the conductor segments to make each of the first and second phase windings, wherein the wave winding segment is made up of the conductor segment having the joint end portions located at ends thereof at an interval away from each other which is greater than one pole pitch, each of the lap winding segments being made up of the conductor segment having the joint end portions located at ends thereof at an interval away from each other which is less than one pole pitch, and wherein an end of the first phase winding and an end of the second phase winding are formed by two of the leg portions of the conductor segments which are disposed adjacent to each other in the radius direction within the same one of the slots of said armature core and which lead to two first terminal leads, and the other end of the first phase winding and the other end of the second phase winding are formed by two of the leg portions of the conductor segments which are disposed adjacent to each other in the radius direction within the same one of the slots of said armature core and which lead to two second terminal leads.

2. A segment joined armature for a multi-phase ac machine as set forth in claim 1, wherein four of the leg portions of the conductor segments are arrayed within each of the slots of said armature core as a first, a second, a third, and a fourth layer conductors from inside to outside said armature core in the radius direction of said armature core, wherein each of the first and second phase windings are broken down into a first and a second group, the first group being made up of the conductor segments having the first and fourth layer conductors separated from each other at a given slot pitch, the second group being made up of the conductor segments having the second and third layer conductors separated from each other at a given slot pitch, wherein tips of the joint end portions leading to the first layer conductors are joined to tips of the joint end portions leading to the second layer conductors, and tips of the joint end portions leading to the third layer conductors are joined to tips of the joint end portions leading to the fourth layer conductors, wherein the wave winding segment is made up of the conductor segment having the tips of the joint end portions separated from each other at an approximately two pole pitch, and each of the lap winding segments is made up of the conductor segment having the joint end portions separated from each other at an approximately zero slot pitch, and wherein the first and second layer conductors or the third and fourth layer conductors defining ends of the first and second phase windings of each of the phase coils disposed within the same one of the slots lead to paired first terminal leads, respectively, and the third and fourth layer conductors or the first and second layer conductors defining other ends of the first and second phase windings of each of the phase coils disposed within the same one of the slots lead to paired second terminal leads, respectively.

3. A segment joined armature for a multi-phase ac machine as set forth in claim 2, wherein the pairs of the first terminal leads of the phase coils are located at an interval away from each other which is equivalent to an electrical angle of $2\pi/m$ within an electrical angle range of approximately $2\pi(m-1)/m$, and wherein the pairs of the second terminal leads of the phase coils are located at an interval away from each other which is equivalent to an electrical angle of 2π/m within an electrical angle range of approximately 2π(m−1)/m.

4. A segment joined armature for a multi-phase ac machine as set forth in claim 3, wherein the pairs of the second terminal leads form neutral point joint leads which are connected at a neutral point to establish a star-connection of the phase coils.

5. A segment joined armature for a multi-phase ac machine as set forth in claim 2, wherein the first terminal leads of the first and second phase windings of one of the phase coils form input/output lines of a first phase, the first terminal leads of the first and second phase windings of a second one of the phase coils form input/output lines of a second phase, wherein the second terminal leads of the first and second phase windings of the one of the phase coils are connected to the input/output lines of the second phase, and wherein the first and second phase windings of each of the phase coils are connected in parallel to each other, and the phase coils are connected in a delta form.

6. A segment joined armature for a multi-phase ac machine as set forth in claim 2, wherein each of the first and second phase windings of each of the phase coils includes a first turn coil made up of the wave winding segment and the lap winding segments to form turns around said armature core, a second turn coil made up of the wave winding segment and the lap winding segments to form turns around said armature core, and an anomaly conductor segment connecting the first and second turn coils in series, and wherein the first and second phase windings of each of the phase coils extend in opposite winding directions and are identical electromagnetically with each other.

7. A segment joined armature for a multi-phase ac machine as set forth in claim 6, wherein the anomaly conductor segments of each of the phase coils are disposed adjacent to each other within two of the slots separated from each other at a slot pitch shorter than said slot pitch of the wave winding segments and the lap winding segments by at least one slot pitch.

8. A segment joined armature for a multi-phase ac machine set forth in claim 2, wherein locations of interfaces between the first and second terminal leads of each of the phase coils and the conductor segments are defined across the V-shaped head portion of the anomaly conductor segment in a circumferential direction of said armature core.

9. A segment joined armature for a multi-phase ac machine as set forth in claim 1, wherein four of the leg portions of the conductor segments are arrayed within each of the slots of said armature core as a first, a second, a third, and a fourth layer conductors from inside to outside said armature core in the radius direction of said armature core, wherein each of the first and second phase windings are broken down into a first and a second group, the first group being made up of the conductor segments having the first and fourth layer conductors separated from each other at a given slot pitch which is shorter than a pole pitch by one slot pitch or more, the second group being made up of the conductor segments having the second and third layer conductors separated from each other at a given slot pitch which is shorter than the pole pitch by one slot pitch or more, wherein tips of the joint end portions leading to the first layer conductors are joined to tips of the joint end portions leading to the second layer conductors, and tips of the joint end portions leading to the third layer conductors are joined to tips of the joint end portions leading to the fourth layer conductors, wherein each of the first and second phase windings includes a first turn coil, a second turn coil, and an anomaly conductor segment, the first turn coil being made up of the wave winding segment formed by the conductor segment having tips of the joint end portions separated from each other at approximately two pole pitch and the lap winding segment formed by the conductor segment having tips of the joint end portions separated from each other at approximately one slot pitch, the wave winding segments and the lap winding segments being connected alternately to make turns, the second turn coil made up of the wave winding segment and the lap winding segments connected alternately to make turns extending in the same winding direction as that of the first turn coil, the anomaly conductor segment having legs disposed in two of the slots separated from each other at a pitch different from that of the wave winding segment and the lap winding segments to connect the first turn coil and the second turn coil in series, and wherein the first and second phase windings of each of the phase coils are identical with each other electromagnetically and extend in opposite winding directions.

10. A segment joined armature for a multi-phase ac machine as set forth in claim 9, wherein the anomaly conductor segments of each of the phase coils are disposed adjacent to each other within two of the slots separated from each other at a slot pitch shorter than said slot pitch of the wave winding segment and the lap winding segments by at least one slot pitch.

11. A segment joined armature for a multi-phase ac machine as set forth in claim 9, wherein the first and second layer conductors or the third and fourth layer conductors defining ends of the first and second phase windings of each of the phase coils disposed within the same one of the slots lead to paired first terminal leads, respectively, and the third and fourth layer conductors or the first and second layer conductors defining other ends of the first and second phase windings of each of the phase coils disposed within the same one of the slots lead to paired second terminal leads, respectively, and wherein the first terminal leads form input/output lines, and the second terminal leads form neutral point joint leads are connected at a neutral point to make a star-connection of the phase coils.

12. A segment joined armature for a multi-phase ac machine as set forth in claim 9, wherein the first terminal leads of the first and second phase windings of one of the phase coils form input/output lines of a first phase, the first terminal leads of the first and second phase windings of a second one of the phase coils form input/output lines of a second phase, wherein the second terminal leads of the first and second phase windings of the one of the phase coils are connected to the input/output lines of the second phase, and wherein the first and second phase windings of each of the phase coils are connected in parallel to each other, and the phase coils are connected in a delta form.

13. A segment joined armature for a multi-phase ac machine as set forth in claim 11, wherein locations of interfaces between the first and second terminal leads of each of the phase coils and the conductor segments are defined across the V-shaped head portion of the anomaly conductor segment in a circumferential direction of said armature winding.

14. A segment joined armature for a multi-phase ac machine as set forth in claim 9, wherein each of the phase coils has a bridging conductor segment extending over the anomaly conductor segment to establish a series connection of the first and second phase windings, the bridging conductor segment including leg portions disposed within the slots which are defined by the first and third layer conductors or the second and fourth layer conductors, wherein leg portions of the bridging conductor segment form a trailing one of the leg portions of the conductor segments of the first phase winding and a leading one of the leg portions of the conductor segments of the second phase winding, and wherein the leg portions of each of the bridging conductor segments are disposed within two of the slots which are the same as those within which the leg portions of the first and second phase windings of a corresponding one of the phase coils leading to the first and second terminal leads are disposed.

15. A segment joined armature for a multi-phase ac machine as set forth in claim 1, wherein four of the leg portions of the conductor segments are arrayed within each of the slots of said armature core as a first, a second, a third, and a fourth layer conductors from inside to outside said armature core in the radius direction of said armature core, wherein each of the first and second phase windings includes a first turn coil, a second turn coil, and an anomaly conductor segment, the first turn coil including first lap winding segments, second lap winding segments, and the wave winding segments which are joined alternately to make turns, the first lap winding segments being made up of ones of the lap winding segments formed by the conductor segments having the joint end portions separated at a joint pitch of approximately ½ slot pitch and the second and third layer conductors separated at a first slot pitch shorter than the pole pitch by one slot pitch or more, the second lap winding segments being made up of ones of the lap winding segments formed by the conductor segments having the joint end portions separated at a joint pitch of approximately ½ slot pitch and the fourth and fifth layer conductors separated at the first slot pitch, and the wave winding segments having the joint end portions separated at a joint pitch that is identical with two pole pitches minus sum of the joint pitches of the first and second lap winding segments and the first and sixth layer conductors separated at the first slot pitch, the second turn coil being made up of winding segments identical with the first lap winding segments and winding segments identical with the second lap winding segments which are connected alternately to make turns oriented in the same winding direction as that of the first turn coil, the anomaly conductor segment having leg portions disposed within two of the slots separated at a slot pitch different from the first slot pitch to establish a series connection of the first and second turn coils, and wherein the first and second phase windings of each of the phase coils are identical with each other electromagnetically and extend in opposite winding directions.

16. A segment joined armature for a multi-phase ac machine as set forth in claim 15, wherein the first and second layer conductors disposed adjacent to each other within a same one of the slots belong to the first and second phase windings connected in parallel, respectively, and wherein the fifth and sixth layer conductors disposed adjacent to each other within a same one of the slots belong to the first and second phase windings connected in parallel, respectively.

17. A segment joined armature for a multi-phase ac machine as set forth in claim 16, wherein the first and second layer conductors disposed adjacent to each other within a preselected one of the slots lead to an end of each of the phase coils, wherein the fifth and sixth layer conductors disposed adjacent to each other within a preselected one of the slots lead to the other end of each of the phase coils, and wherein the phase coils are connected to make a star connection winding.

18. A segment joined armature for a multi-phase ac machine as set forth in claim 16, wherein the first and second layer conductors disposed adjacent to each other within a preselected one of the slots lead to an end of each of the phase coils, wherein the fifth and sixth layer conductors disposed adjacent to each other within a preselected one of the slots lead to the other end of each of the phase coils, and wherein the phase coils are connected to make a delta connection winding.

19. A segment joined armature for a multi-phase ac machine as set forth in claim 15, wherein each of the phase coils has a bridging conductor segment extending over the anomaly conductor segment to establish a series connection of the first and second phase windings thereof, the bridging conductor segment including the leg portions one of which is disposed within the slot in which the leg portion of one of the conductor segments leading to one of a pair of terminal leads of the each of the phase coils and forms a leading one of the leg portions of one of the first and second phase windings, and other of which is disposed within the slot in which the leg portion of one of the conductor segments leading to the other of the pair of terminal leads of the each of the phase coils and forms a trailing one of the leg portions of the one of the first and second phase windings, and wherein tip portions of the leg portions of each of the bridging conductor segments are bent in the same circumferential direction of said armature winding.

20. A segment joined armature for a multi-phase ac machine as set forth in claim 19, wherein the leg portions of the anomaly conductor segment of the first phase winding are disposed, respectively, within two of the slots in which the leg portions of the anomaly conductor segment of the second phase winding are disposed, and wherein a leg pitch of the leg portions of the anomaly conductor segment of the first phase winding is identical with that of the second phase winding.

21. A segment joined armature for a multi-phase ac machine as set forth in claim 15, further comprising a pair of terminal leads defining ends of each of the phase coils which extends from an outside location in the slot within which the anomaly conductor segment is disposed, and wherein the phase coils are connected in one of a star and a delta form.

22. A segment joined armature for a multi-phase ac machine as set forth in claim 15, wherein each of the slots has 6n(=integer) of the leg portions of the conductor segments disposed.

23. A segment joined armature for a multi-phase ac machine as set forth in claim 17, further comprising a first terminal lead pair and a second terminal lead pair, the first terminal lead pair being made up of terminal leads forming ends of the first and second phase windings of each of the phase coils and leading to the first and second layer conductors disposed within one of the slots, respectively, the second terminal lead pair being made up of terminal leads forming the other ends of the first and second phase windings of each of the phase coils and leading to the fifth and sixth layer conductors disposed within one of the slots, respectively and wherein m is an odd number greater or equal to three, the first terminal lead pairs of the phase coils being located at an interval away from each other which is equivalent to an electrical angle of $2\pi$, wherein the first terminal lead pairs of the phase coils form a first group, the second terminal lead pairs of the phase coils form a second group, and a first angular range occupied by the first group overlap with a second angular range occupied by the second group, wherein each of the first and second angular ranges is an electrical angle of 2π(m−1)/m, and wherein portions of the first terminal lead pair extending from the conductor segments are shifted from those of the second terminal lead pair by one slot pitch or more.

24. A segment joined armature for a multi-phase ac machine as set forth in claim 23, wherein one of the terminal leads of the first terminal lead pair and one of the terminal leads of the second terminal lead pair are connected at a neutral point, the other terminal lead of the first terminal lead pair and the other terminal lead of the second terminal lead pair are connected to phase terminals, respectively, and the phase coils are star-connected to make said armature winding.

25. A segment joined armature for a multi-phase ac machine as set forth in claim 24, wherein the neutral point is located at an interval away from a junction of each of the first and second terminal lead pairs to the phase terminal by one slot pitch or more and defined intermediate between the junctions of the first and second terminal lead pairs in the circumferential direction of said armature core.

26. A segment joined armature for a multi-phase ac machine as set forth in claim 25, wherein ones of the terminal leads of the first and second terminal lead pairs which extend from the first layer conductors are connected together to define a first neutral point, and ones of the terminal leads of the first and second terminal lead pairs which extend from the second layer conductors are connected together to define a second neutral point, and wherein the first and second neutral points are separated from each other by given slot pitches in the circumferential direction of said armature core.

27. A segment joined armature for a multi-phase ac machine as set forth in claim 23, wherein ones of the terminal leads of the first terminal lead pairs and ones of the terminal leads of the second terminal lead pairs are connected sequentially and lead to phase terminals, wherein the first and second phase windings of each of the phase coils are connected in parallel, and wherein the phase coils are joined together to establish a delta-connection to make said armature winding.

28. A multi-phase ac machine comprising:
an armature core having slots, q(=integer greater than or equal to two) for each pole in each phase, the slots being arrayed in a circumferential direction of said armature core; and
an armature winding made up of m(=integer greater than or equal to three) phase coils, each of the phase coils being made up of a first phase winding and a second phase winding which are identical in number of turns and extending in opposite winding directions,
wherein each of the first and second phase windings is made up of at least one wave winding segment and lap winding segments joined alternately, the wave winding segment and the lap winding segments being formed by sequentially joined-conductor segments, each of the conductor segments including a substantially V-shaped head portion, a pair of leg portions extending from ends of the head portion, disposed in two of the slots of said armature core located at a given interval away from each other, and a pair of joint end portions extending from ends of the leg portions, s(=integer greater than or equal to four) of the leg portions being arrayed within each of the slots of said armature core in a radius direction of said armature core, each of the joint end portions of each of the conductor segments being joined to one of the joint end portions of another of the conductor segments to make each of the first and second phase windings,
wherein the wave winding segment is made up of the conductor segments having the leg portions located at an interval away from each other which is greater than or equal to one pole pitch, each of the lap winding segments being made up of the conductor segments having the leg portions located at an interval away from each other which is less than one pole pitch, and
wherein an end of the first phase winding and an end of the second phase winding are formed by two of the leg portions of the conductor segments which are disposed adjacent to each other in the radius direction within the same one of the slots of said armature core and which lead to two first terminal leads, and the other end of the first phase winding and the other end of the second phase winding are formed by two of the leg portions of the conductor segments which are disposed adjacent to each other in the radius direction within the same one of the slots of said armature core and which lead to two second terminal leads.

29. A multi-phase ac machine as set forth in claim 28, wherein four of the leg portions of the conductor segments are arrayed within each of the slots of said armature core as a first, a second, a third, and a fourth layer conductors from inside to outside said armature core in the radius direction of said armature core, wherein each of the first and second phase windings are broken down into a first and a second group, the first group being made up of the conductor segments having the first and fourth layer conductors separated from each other at a given slot pitch, the second group being made up of the conductor segments having the second and third layer conductors separated from each other at a given slot pitch, wherein tips of the joint end portions leading to the first layer conductors are joined to tips of the joint end portions leading to the second layer conductors, and tips of the joint end portions leading to the third layer conductors are joined to tips of the joint end portions leading to the fourth layer conductors, wherein the wave winding segment is made up of the conductor segments each having the tips of the joint end portions separated from each other at an approximately two pole pitch, and each of the lap winding segments is made up of the conductor segments each having the joint end portions separated from each other at an approximately zero slot pitch, and wherein the first and second layer conductors or the third and fourth layer conductors defining ends of the first and second phase windings of each of the phase coils disposed within the same one of the slots lead to paired first terminal leads, respectively, and the third and fourth layer conductors or the first and second layer conductors defining other ends of the first and second phase windings of each of the phase coils disposed within the same one of the slots lead to paired second terminal leads, respectively.

30. A multi-phase ac machine as set forth in claim 29, wherein the pairs of the first terminal leads of the phase coils are located at an interval away from each other which is equivalent to an electrical angle of 2π/m within an electrical angle range of approximately 2π(m−1), and wherein the pairs of the second terminal leads of the phase coils are located at an interval away from each other which is equivalent to an electrical angle of 2π/m within an electrical angle range of approximately 2π(m−1).

31. A multi-phase ac machine as set forth in claim 30, wherein the pairs of the second terminal leads form neutral point joint leads which are connected at a neutral point to establish a star-connection of the phase coils.

32. A multi-phase ac machine as set forth in claim 29, wherein the first terminal leads of the first and second phase windings of one of the phase coils form input/output lines of a first phase, the first terminal leads of the first and second phase windings of a second one of the phase coils form input/output lines of a second phase, wherein the second terminal leads of the first and second phase windings of the one of the phase coils are connected to the input/output lines of the second phase, and wherein the first and second phase windings of each of the phase coils are connected in parallel to each other, and the phase coils are connected in a delta form.

33. A multi-phase ac machine as set forth in claim 29, wherein each of the first and second phase windings of each of the phase coils includes a first turn coil made up of the wave winding segment and the lap winding segments to form turns around said armature core, a second turn coil made up of the wave winding segment and the lap winding segments to form turns around said armature core, and an anomaly conductor segment connecting the first and second turn coils in series, and wherein the first and second phase windings of each of the phase coils extend in opposite winding directions and are identical electromagnetically with each other.

34. A multi-phase ac machine as set forth in claim 33, wherein the anomaly conductor segments of each of the phase coils are disposed adjacent to each other within two of the slots separated from each other at a slot pitch shorter than said slot pitch of the wave winding segment and the lap winding segments by at least one slot pitch.

35. A multi-phase ac machine as set forth in claim 29, wherein locations of interfaces between the first and second terminal leads of each of the phase coils and the conductor segments are defined across the V-shaped head portion of the anomaly conductor segment in a circumferential direction of said armature core.

36. A multi-phase ac machine as set forth in claim 28, wherein four of the leg portions of the conductor segments are arrayed within each of the slots of said armature core as a first, a second, a third, and a fourth layer conductors from inside to outside said armature core in the radius direction of said armature core, wherein each of the first and second phase windings are broken down into a first and a second group, the first group being made up of the conductor segments having the first and fourth layer conductors separated from each other at a given slot pitch which is shorter than a pole pitch by one slot pitch or more, the second group being made up of the conductor segments having the second and third layer conductors separated from each other at a given slot pitch which is shorter than the pole pitch by one slot pitch or more, wherein tips of the joint end portions leading to the first layer conductors are joined to tips of the joint end portions leading to the second layer conductors, and tips of the joint end portions leading to the third layer conductors are joined to tips of the joint end portions leading to the fourth layer conductors, wherein each of the first and second phase windings includes a first turn coil, a second turn coil, and an anomaly conductor segment, the first turn coil being made up of the wave winding segment formed by the conductor segment having tips of the joint end portions separated from each other at approximately two pole pitch and the lap winding segment formed by the conductor segments each having tips of the joint end portions separated from each other at approximately one slot pitch, the wave winding segment and the lap winding segments being connected alternately to make turns, the second turn coil made up of the wave winding segment and the lap winding segments connected alternately to make turns extending in the same winding direction as that of the first turn coil, the anomaly conductor segment having legs disposed in two of the slots separated from each other at a pitch different from that of the wave winding segment and the lap winding segments to connect the first turn coil and the second turn coil in series, and wherein the first and second phase windings of each of the phase coils are identical with each other electromagnetically and extend in opposite winding directions.

37. A multi-phase ac machine as set forth in claim 36, wherein the anomaly conductor segments of each of the phase coils are disposed adjacent to each other within two of the slots separated from each other at a slot pitch shorter than said slot pitch of the wave winding segment and the lap winding segments by at least one slot pitch.

38. A multi-phase ac machine as set forth in claim 36, wherein the first and second layer conductors or the third and fourth layer conductors defining ends of the first and second phase windings of each of the phase coils disposed within the same one of the slots lead to paired first terminal leads, respectively, and the third and fourth layer conductors or the first and second layer conductors defining other ends of the first and second phase windings of each of the phase coils disposed within the same one of the slots lead to paired second terminal leads, respectively, and wherein the first terminal leads form input/output lines, and the second terminal leads form neutral point joint leads are connected at a neutral point to make a star-connection of the phase coils.

39. A multi-phase ac machine as set forth in claim 36, wherein the first terminal leads of the first and second phase windings of one of the phase coils form input/output lines of a first phase, the first terminal leads of the first and second phase windings of a second one of the phase coils form input/output lines of a second phase, wherein the second terminal leads of the first and second phase windings of the one of the phase coils are connected to the input/output lines of the second phase, and wherein the first and second phase windings of each of the phase coils are connected in parallel to each other, and the phase coils are connected in a delta form.

40. A multi-phase ac machine as set forth in claim 38, wherein locations of interfaces between the first and second terminal leads of each of the phase coils and the conductor segments are defined across the V-shaped head portion of the anomaly conductor segment in a circumferential direction of said armature winding.

41. A multi-phase ac machine as set forth in claim 36, wherein each of the phase coils has a bridging conductor segment bridging over the anomaly conductor segment to establish a series connection of the first and second phase windings, the bridging conductor segment including leg portions disposed within the slots which are defined by the first and third layer conductors or the second and fourth layer conductors, wherein leg portions of the bridging conductor segment form a trailing one of the leg portions of the conductor segments of the first phase winding and a leading one of the leg portions of the conductor segments of the second phase winding, and wherein the leg portions of each of the bridging conductor segments are disposed within two of the slots which are the same as those within which the leg portions of the first and second phase windings of a corresponding one of the phase coils leading to the first and second terminal leads are disposed.

42. A multi-phase ac machine as set forth in claim 28, wherein four of the leg portions of the conductor segments are arrayed within each of the slots of said armature core as a first, a second, a third, and a fourth layer conductors from inside to outside said armature core in the radius direction of said armature core, wherein each of the first and second phase windings includes a first turn coil, a second turn coil, and an anomaly conductor segment, the first turn coil including first lap winding segments, second lap winding segments, and the wave winding segment which are joined alternately to make turns, the first lap winding segments being made up of ones of the lap winding segments formed by the conductor segments having the joint end portions separated at a joint pitch of approximately ½ slot pitch and the second and third layer conductors separated at a first slot pitch shorter than the pole pitch by one slot pitch or more, the second lap winding segments being made up of ones of the lap winding segments formed by the conductor segments having the joint end portions separated at a joint pitch of approximately ½ slot pitch and the fourth and fifth layer conductors separated at the first slot pitch, and the wave winding segments having the joint end portions separated at a joint pitch that is identical with two pole pitches minus sum of the joint pitches of the first and second lap winding segments and the first and sixth layer conductors separated at the first slot pitch, the second turn coil being made up of winding segments identical with the first lap winding segments and winding segments identical with the second lap winding segments which are connected alternately to make turns oriented in the same winding direction as that of the first turn coil, the anomaly conductor segment having leg portions disposed within two of the slots separated at a slot pitch different from the first slot pitch to establish a series connection of the first and second turn coils, and wherein the first and second phase windings of each of the phase coils are identical with each other electromagnetically and extend in opposite winding directions.

43. A multi-phase ac machine as set forth in claim 42, wherein the first and second layer conductors disposed adjacent to each other within a same one of the slots belong to the first and second phase windings connected in parallel, respectively, and wherein the fifth and sixth layer conductors disposed adjacent to each other within a same one of the slots belong to the first and second phase windings connected in parallel, respectively.

44. A multi-phase ac machine as set forth in claim 43, wherein the first and second layer conductors disposed adjacent to each other within a preselected one of the slots lead to an end of each of the phase coils, wherein the fifth and sixth layer conductors disposed adjacent to each other within a preselected one of the slots lead to the other end of each of the phase coils, and wherein the phase coils are connected to make a star connection winding.

45. A multi-phase ac machine as set forth in claim 43, wherein the first and second layer conductors disposed adjacent to each other within a preselected one of the slots lead to an end of each of the phase coils, wherein the fifth and sixth layer conductors disposed adjacent to each other within a preselected one of the slots lead to the other end of each of the phase coils, and wherein the phase coils are connected to make a delta connection winding.

46. A multi-phase ac machine as set forth in claim 42, wherein each of the phase coils has a bridging conductor segment bridging over the anomaly conductor segment to establish a series connection of the first and second phase windings thereof, the bridging conductor segment including the leg portions one of which is disposed within the slot in which the leg portion of one of the conductor segments leading to one of a pair of terminal leads of the each of the phase coils and forms a leading one of the leg portions of one of the first and second phase windings, and other of which is disposed within the slot in which the leg portion of one of the conductor segments leading to the other of the pair of terminal leads of the each of the phase coils and forms a trailing one of the leg portions of the one of the first and second phase windings, and wherein tip portions of the leg portions of each of the bridging conductor segments are bent in the same circumferential direction of said armature winding.

47. A multi-phase ac machine as set forth in claim 46, wherein the leg portions of the anomaly conductor segment of the first phase winding are disposed, respectively, within two of the slots in which the leg portions of the anomaly conductor segment of the second phase winding are disposed, and wherein a leg pitch of the leg portions of the anomaly conductor segment of the first phase winding is identical with that of the second phase winding.

48. A multi-phase ac machine as set forth in claim 42, further comprising a pair of terminal leads defining ends of each of the phase coils which extends from an outside location in the slot within which the anomaly conductor segment is disposed, and wherein the phase coils are connected in one of a star and a delta form.

49. A multi-phase ac machine as set forth in claim 42, wherein each of the slots has 6n(=integer) of the leg portions of the conductor segments disposed.

50. A multi-phase ac machine as set forth in claim 44, further comprising a first terminal lead pair and a second terminal lead pair, the first terminal lead pair being made up of terminal leads forming ends of the first and second phase windings of each of the phase coils and leading to the first and second layer conductors disposed within one of the slots, respectively, the second terminal lead pair being made up of terminal leads forming the other ends of the first and second phase windings of each of the phase coils and leading to the fifth and sixth layer conductors disposed within one of the slots, respectively and wherein m is an odd number greater or equal to three, the first terminal lead pairs of the phase coils being located at an interval away from each other which is equivalent to an electrical angle of $2\pi$, wherein the first terminal lead pairs of the phase coils form a first group, the second terminal lead pairs of the phase coils form a second group, and a first angular range occupied by the first group overlap with a second angular range occupied by the second group, wherein each of the first and second angular ranges is an electrical angle of $2\pi(m-1)/m$, and wherein portions of the first terminal lead pair extending from the conductor segments are shifted from those of the second terminal lead pair by one slot pitch or more.

51. A multi-phase ac machine as set forth in claim 50, wherein one of the terminal leads of the first terminal lead pair and one of the terminal leads of the second terminal lead pair are connected at a neutral point, the other terminal lead of the first terminal lead pair and the other terminal lead of the second terminal lead pair are connected to phase terminals, respectively, and the phase coils are star-connected to make said armature winding.

52. A multi-phase ac machine as set forth in claim 51, wherein the neutral point is located at an interval away from a junction of each of the first and second terminal lead pairs to the phase terminal by one slot pitch or more and defined intermediate between the junctions of the first and second terminal lead pairs in the circumferential direction of said armature core.

53. A multi-phase ac machine as set forth in claim 52, wherein ones of the terminal leads of the first and second terminal lead pairs which extend from the first layer conductors are connected together to define a first neutral point, and ones of the terminal leads of the first and second terminal lead pairs which extend from the second layer conductors are connected together to define a second neutral point, and wherein the first and second neutral points are separated from each other by given slot pitches in the circumferential direction of said armature core.

54. A multi-phase ac machine as set forth in claim 50, wherein ones of the terminal leads of the first terminal lead pairs and ones of the terminal leads of the second terminal lead pairs are connected sequentially and lead to phase terminals, wherein the first and second phase windings of each of the phase coils are connected in parallel, and wherein the phase coils are joined together to establish a delta-connection to make said armature winding.

* * * * *